United States Patent
Reichenberger et al.

(10) Patent No.: US 12,472,160 B2
(45) Date of Patent: Nov. 18, 2025

(54) MODIFIED-RELEASE TIOPRONIN COMPOSITIONS, KITS AND METHODS FOR TREATING CYSTINURIA AND RELATED DISORDERS

(71) Applicant: ALTIBIO, INC., Half Moon Bay, CA (US)

(72) Inventors: Patrick Reichenberger, Half Moon Bay, CA (US); Artem Zykovich, Novato, CA (US)

(73) Assignee: Altibio, Inc., Half Moon Bay, CA (US)

( * ) Notice: Subject to any disclaimer, the term of this patent is extended or adjusted under 35 U.S.C. 154(b) by 0 days.

(21) Appl. No.: 16/623,251

(22) PCT Filed: Jun. 18, 2018

(86) PCT No.: PCT/US2018/038097
§ 371 (c)(1),
(2) Date: Dec. 16, 2019

(87) PCT Pub. No.: WO2018/232407
PCT Pub. Date: Dec. 20, 2018

(65) Prior Publication Data
US 2021/0145777 A1      May 20, 2021

Related U.S. Application Data

(60) Provisional application No. 62/521,328, filed on Jun. 16, 2017.

(51) Int. Cl.
| | | |
|---|---|---|
| *A61K 31/198* | (2006.01) | |
| *A61K 9/00* | (2006.01) | |
| *A61K 9/48* | (2006.01) | |
| *A61K 9/50* | (2006.01) | |
| *A61K 9/70* | (2006.01) | |
| *A61K 47/26* | (2006.01) | |
| *A61K 47/30* | (2006.01) | |
| *A61K 47/38* | (2006.01) | |
| *A61P 13/02* | (2006.01) | |
| *A61P 13/04* | (2006.01) | |

(52) U.S. Cl.
CPC .......... *A61K 31/198* (2013.01); *A61K 9/0004* (2013.01); *A61K 9/0053* (2013.01); *A61K 9/4891* (2013.01); *A61K 9/50* (2013.01); *A61K 9/7023* (2013.01); *A61K 47/26* (2013.01); *A61K 47/30* (2013.01); *A61K 47/38* (2013.01); *A61P 13/02* (2018.01); *A61P 13/04* (2018.01)

(58) Field of Classification Search
None
See application file for complete search history.

(56) References Cited

U.S. PATENT DOCUMENTS

| | | | |
|---|---|---|---|
| 2007/0243252 A1* | 10/2007 | Heinicke | A61K 9/2866 424/468 |
| 2013/0236545 A1* | 9/2013 | Guittet | A61P 13/02 424/468 |
| 2016/0354315 A1* | 12/2016 | Li | A61K 9/2027 |
| 2017/0129867 A1* | 5/2017 | Nguyen | C07D 413/12 |
| 2017/0172960 A1* | 6/2017 | Saadeh | A61K 47/38 |

FOREIGN PATENT DOCUMENTS

| | | |
|---|---|---|
| CN | 1698594 A | 11/2005 |
| CN | 102697750 A | 10/2012 |

OTHER PUBLICATIONS

National Organization for Rare Disorders (NORD) Cystinuria. wayback machine Feb. 19, 2017.*
Frassetto et al. "Treatment and Prevention of Kidney Stones: An Update". Dec. 2011.*
Wang et al. "Stereoselective Analysis of Tiopronin Enantiomers in Rat Plasma Using High-Performance Liquid Chromatography-Electrospray Ionization Mass Spectrometry After Chiral Derivatization" 2008.*

\* cited by examiner

*Primary Examiner* — Danah Al-Awadi
(74) *Attorney, Agent, or Firm* — Ballard Spahr LLP

(57) ABSTRACT

The present invention provides methods, compositions, devices, and kits for treating cystinuria or related disorders, in which tiopronin is administered to a patient according to a modified-release strategy that releases tiopronin in critically-spaced, repeated pulses over time, to provide lower peak plasma levels but consistently higher urine levels of the drug for binding cystine. In particular, use of the present modified-release formulations and systems reduce side effects of tiopronin, thereby increasing patient compliance and quality of life, as well as achieving efficacy with less frequent administrations and/or lower total dosages.

21 Claims, 16 Drawing Sheets

MODIFIED-RELEASE TIOPRONIN COMPOSITIONS, KITS AND METHODS FOR TREATING CYSTINURIA AND RELATED DISORDERS

CROSS-REFERENCE TO RELATED APPLICATIONS

This application claims the benefit of U.S. Provisional Application No. 62/521,328, filed Jun. 16, 2017, incorporated in its entirety by reference.

RELATED FIELDS

The compositions, kits, and methods described herein generally relate to the fields of medical treatment involving tiopronin. More specifically, methods, systems, and kits are provided for administration of compositions comprising tiopronin for modified release with reduced peak blood levels, but increased urine levels, thereby reducing side effects, increasing efficacy, and improving patient quality of life. The extended duration of effect compositions, systems, kits, and methods are especially applicable to the treatment of cystinuria and related disorders.

BACKGROUND

Cystinuria is an inherited autosomal recessive disease that is characterized by high concentration of the amino acid cysteine in the urine, leading to formation of cystine stones in the kidneys, ureter, and bladder. As the kidneys filter blood to create urine, cystine normally is transported back into the blood. In cystinuria patients, the proximal renal tubules fail to reabsorb filtered cystine, as well as other dibasic amino acids, such as lysine, arginine, and ornithine, leading to accumulation and subsequent precipitation of debilitating cystine stones in the urinary tract. Some patients even accumulate several stones each month. The disorder has a profoundly negative impact on the patient's quality of life. It is estimated that in the United States, about 30,000 people suffer from cystinuria; worldwide, about 1 in 7,000 may people have the disorder. It also is a common disorder in certain dog breeds, in particular, Bulldogs, Newfoundlands, and Labrador Retrievers, and affects a considerable percentage of dogs in the US.

While approaches to reduce kidney concentrations of cystine provide a number of treatment options, they may be ineffective in about 85% of cystinuria cases and can have severe side effects. Examples of medications used include immediate-release tiopronin and D-penicillamine (sold under the tradename CUPRIMINE®). Common side effects of D-penicillamine include rashes, arthralgia, leukopenia, gastrointestinal intolerance, nephritic syndrome, and vitamin B6 deficiency, which can be so severe that as many as 50-70% of patients cannot tolerate the drug. In 1988, the FDA approved the use of tiopronin as an alternative that provides lower toxicity; nonetheless, current tiopronin medications are discontinued by about 30% of patients, due to adverse reactions, the need for frequent dosing, and poor efficacy. In addition, the short duration of effect, with current therapies, means frequent dosing and leaves nighttime cystine levels uncontrolled. Ongoing formation and repeated passage of stones may cause serious damage to the kidneys, requiring surgery to remove the stones and, in severe cases, renal transplant.

Accordingly, there is a need in the art for more effective compositions and methods for administering tiopronin, as well as more effective methods of treating and/or preventing cystinuria and related disorders, particularly with fewer side effects. The present invention meets these and other needs.

SUMMARY

The present invention provides methods, compositions, systems, and kits for administering tiopronin in a modified-release strategy that produces lower peak but more consistent levels of free tiopronin in the blood, along with higher and more consistent levels of the drug in the urine, compared to other strategies. This allows tiopronin to more effectively reduce cystine concentrations in the urine and thus stone formation in the renal tract, a hallmark of cystinuria. Use of the present modified-release formulations, systems, kits, and methods reduces side effects of tiopronin and enhances efficacy, allowing for less frequent dosing and/or lower total daily dosage, thereby improving patient compliance and overall quality of life.

The modified-release strategy of the present invention comprises delivery of multiple pulses (bolus doses) of tiopronin over time, e.g., following a given administration of a modified-release formulation of the invention, where the pulses are released at critically-spaced intervals that provide lower and more consistently lower urinary cystine concentrations, compared to approaches with longer or shorter intervals between doses. An effective amount of tiopronin is administered or released in fractions at intervals of about two to about six hours, preferably about three to about five hours, or more preferably about four hours apart, to provide greater efficacy and fewer side effects. The modified-release strategy finds use in cystinuria and other disorders sharing pharmacokinetic characteristics of cystinuria ("cystinuria-related disorders"), e.g., other kidney, bladder, and/or ureter stone disorders, where high urine excretion and/or low blood levels of a therapeutic agent result in improved efficacy and/or reduced toxicity. For example, the present approaches may be useful for disorders where is it desirable to remove a metabolite or other substance, such as a different amino acid, present in the blood through urinary excretion to reduce or correct excess accumulation of the metabolite or substance from the blood.

One aspect of the invention thus provides a composition comprising a therapeutic agent and a pharmaceutically acceptable modified-release component for releasing the therapeutic in repeated pulses over time, wherein a first fraction is released at a first time point and a second fraction is released at a second time point about two to about six hours after the first time point. Preferably, the modified-release component allows for more than two repeat boluses, wherein a subsequent ($n^{th}$) fraction is released at a subsequent ($n^{th}$) time point about two to about six hours after a preceding ($n-1^{th}$) time point. In particular embodiments, the therapeutic agent comprises tiopronin. The tiopronin may be a racemic or non-racemic mixture of tiopronin enantiomers; or substantially one or other of the (+) or (−) enantiomer of tiopronin. In some embodiments, the tiopronin is released in repeated pulses for about 12 to about 24 hours. In preferred embodiments, the composition comprises a daily dose of tiopronin, fractions of which are delivered in repeated boluses, more preferably about every four hours over a period of about 24 hours. In some embodiments, the modified-release components are arranged in a device or system that is applied to the subject to deliver the therapeutic.

In some embodiments, the composition is formulated for oral administration. The oral formulations generally comprise a pharmaceutically acceptable modified-release component to achieve pulsed release upon passage through the gastrointestinal tract. In some embodiments, the modified-release component comprises layers of coatings, where the different coatings dissolve in different areas of the gastrointestinal tract, and/or at step-wise, staggered times, to release repeated pulses of tiopronin over time. For example, the layers of coatings may include a coating that dissolves or disintegrates when exposed to conditions in the stomach (a "stomach-dissolving coating"), and/or with one or more coatings that dissolve along different parts of the tract past the stomach, e.g., using an enteric coating, in particular, a duodenum-dissolving coating, a jejunum-dissolving coating, an ileum-dissolving coating, a small-intestine-dissolving coating (that dissolves or disintegrates in any part of the small intestine), and a colon-dissolving coating. The modified-release component with these coatings can release a first amount of the therapeutic when the composition reaches the stomach, a second amount as the composition travels through the duodenum, a third amount as the composition travels through the jejunum, a fourth amount as the composition travels through the ileum, and/or a fifth amount of the therapeutic agent as the composition travels through the colon. In some embodiments, the coatings dissolve sequentially over time, preferably independent of location in the gastrointestinal tract, to release an $n^{th}$ fraction of tiopronin at an $n^{th}$ time point about two to about six hours after a preceding $(n-1)^{th}$ time point.

The different coatings may be arranged so as to provide immediate and subsequent repeated release of the therapeutic. Delaying release of fractions of tiopronin past the stomach allows increased uptake in the small intestine, which increases bioavailability and distribution of tiopronin to the kidneys and urine. Release, for example, over the course of the small intestine, allows for extended duration of effect of smaller tiopronin amounts, reducing peak blood levels while increasing urinary levels of the therapeutic, and maintaining those levels more evenly throughout the day and night, which results in fewer adverse side effects and greater therapeutic efficacy.

In some embodiments, the modified-release component comprises a matrix comprising differently-dissolving segments, where the different segments dissolve in different areas of the gastrointestinal tract and/or at step-wise, staggered times, to release repeated pulses of tiopronin over time in accordance with the invention. In some embodiments, the modified-release component comprises differently-coated beads, where the different bead coatings dissolve in different areas of the gastrointestinal tract and/or at step-wise, staggered times. In some embodiments, the modified-release component comprises a capsule of differently-dissolving bands, where the different bands dissolve in different areas of the gastrointestinal tract and/or at step-wise, staggered times. In some embodiments, the modified-release component comprises a capsule of differently-releasing plugs, where the different plugs dissolve and release contents of a plugged compartment in different areas of the gastrointestinal tract and/or at step-wise, staggered times. In some embodiments, the modified-release component comprises a capsule of differently-expanding osmotic-push compartments, where the different compartments first expand in different areas of the gastrointestinal tract due to osmolality differences, and/or first expand at step-wise, staggered times. In some embodiments, the modified-release component comprises a matrix comprising differently-releasing polymers, where the different polymers release tiopronin in different areas of the gastrointestinal tract and/or at step-wise, staggered times. In some embodiments, the modified-release component comprises a matrix comprising differently-adhering polymers, where the different polymers adhere to, and release tiopronin in, different areas of the gastrointestinal tract and/or at step-wise, staggered times. In some embodiments, the modified-release component comprises a timed microprocessor, timed to release repeated pulses of tiopronin at step-wise, staggered times in accordance with the invention.

In some embodiments, the composition is formulated for topical administration, such as in transdermal or transmucosal formulations. The transdermal formulations generally comprise a pharmaceutically acceptable modified-release component to achieve pulsed release through the skin, and may further comprise one or more skin penetration enhancers. In some embodiments, the transdermal formulation is provided in a skin patch, preferably a skin patch with differently-dissolving microneedles, where the different microneedles dissolve at step-wise, staggered times, to release repeated pulses of tiopronin over time in accordance with the invention.

Another aspect of the present invention relates to methods of preparing modified-release formulations and pharmaceutical compositions described herein, as well as preparing dosage forms and delivery systems comprising the compositions. In particular embodiments, the oral dosage form is a tablet or a capsule, comprising a therapeutic agent, such as tiopronin, and a pharmaceutically acceptable modified-release component, as well as one or more excipients suitable for use in oral formulations, such as suitable binders, diluents, disintegrants, lubricants, and stabilizers. In more preferred embodiments, the dosage form is a tablet or capsule for oral administration that provides a therapeutically effective amount of tiopronin for use in methods of the present invention. In a particular embodiment, the tiopronin is formulated into differently-coated beads, e.g., differently-coated microbeads that are filled into a capsule.

Still another aspect of the invention provides methods of using a pharmaceutical composition or delivery system disclosed herein, in oral or other formulations, to deliver a therapeutically effective amount of tiopronin for achieving an extended duration therapeutic effect in a subject in need thereof, such as a patient with cystinuria or a cystinuria-related disorder. In preferred embodiments, the pharmaceutical composition is delivered so as to provide a total daily dose of about 1,200 mg or less, or about 15 mg/kg/day or less; or an average total daily dose of about 1,200 mg or 15 mg/kg/day or less, where the dosage indicates the amount of active ingredient (tiopronin), and the tiopronin in released in repeated, critically-spaced pulses, according to the invention. In particular embodiments, the composition comprises tiopronin in a first treatment dose that achieves an extended duration therapeutic effect, such as reduced urinary cystine concentration effectively below about 250 mg/L, lasting at least about 8 hours, preferably before a second or subsequent treatment dose is administered, thereby extending the interval between doses for the patient.

In preferred embodiments, use of the modified-release formulation or system achieves therapeutic effect for a duration of at least about 10 hours, at least about 14 hours, or at least about 18 hours; and/or the treatment dose is administered no more than twice a day. In more preferred embodiments, the total daily dose used is less than about 1,200 mg/day, such as treatment doses of about 500 mg or less administered twice a day; or, even more preferably, treatment doses of about 300 mg or less administered twice a day. In particular embodiments, the total daily dose may range from about 500 mg to about 1,200 mg, with individual doses ranging from about 250 mg to about 600 mg for twice daily dosing, or from about 500 mg to about 1,200 mg for once daily dosing. In some preferred embodiments, the total daily dose used is less than about 15 mg/kg/day, such as treatment doses of about 6 mg/kg or less administered twice a day; or, even more preferably, treatment doses of about 4 mg/kg or less administered twice a day. In particular embodiments, the total daily dose may range from about 6 mg/kg/day to about 15 mg/kg/day, with individual doses ranging from about 3 mg/kg to about 7.5 mg/kg for twice daily dosing, or from about 6 mg/kg to about 15 mg/kg for once daily dosing.

In some embodiments, the methods, compositions, and systems of the present invention achieve lower peak blood levels of tiopronin compared to immediate-release formulations (or delayed-release formulations), such as achieving peak blood levels of no more than about 10 µmol/L, preferably no more than about 5 µmol/L. In some embodiments, the methods, compositions, and systems of the present invention achieve lower, and more consistently lower, urinary cystine concentrations compared to immediate-release (or delayed-release) formulations, such as keeping urinary cystine effectively below about 250 mg/L for the at least about 8 hours, at least about 10 hours, or preferably for at least about 12 hours of extended duration of effect; preferably effectively below about 200 mg/L for the at least about 8 hours, at least about 10 hours, or for at least about 12 hours of extended duration of effect; more preferably effectively below about 150 mg/L for the at least about 8 hours, at least about 10 hours, or for at least about 12 hours of extended duration of effect; and even more preferably at or effectively below about 100 mg/L for the at least about 8 hours, at least about 10 hours, or for at least about 12 hours of extended duration of effect. The methods, compositions, and systems disclosed herein can thus provide better control of cystine concentration in the urine, including controlling urinary cystine levels overnight, thereby more effectively reducing stone formation for cystinuria patients.

Yet still another aspect of the invention provides methods of using a pharmaceutical composition to achieve a therapeutic effect in a subject in need thereof, such as a patient with cystinuria or a cystinuria-related disorder, where the pharmaceutical composition comprises a pharmaceutically acceptable carrier and tiopronin in a treatment dose for repeated administration to the subject, in about two to about six hour intervals, to provide a total daily dose of about 1,200 mg or less, or about 15 mg/kg/day or less; or an average total daily dose of about 1,200 mg or less, or about 15 mg/kg/day or less, where the dosage indicates the amount of active ingredient (tiopronin). In some embodiments, the composition is an immediate-release composition for oral administration. In some embodiments, the composition is provided as a transdermal or transmucosal formulation. Generally, the composition is administered no more frequently than every three hours, that is no more than about eight times a day, so that the interval is no less than about three hours. In a preferred embodiment, the interval is about four hours and the composition is administered about six times a day.

Yet another aspect of the invention provides kits for use with the compositions, systems, and methods described herein. In some embodiments, kits provide dosage forms, grouped by doses to be taken at a given time and/or organized to aid compliance with a particular dosing regimen.

BRIEF DESCRIPTION OF THE DRAWINGS

FIG. 8B is a blown-up view of one packet.

FIG. 10A depicts the systems before release; FIG. 10B depicts the systems during and after release of tiopronin.

Figure 1:
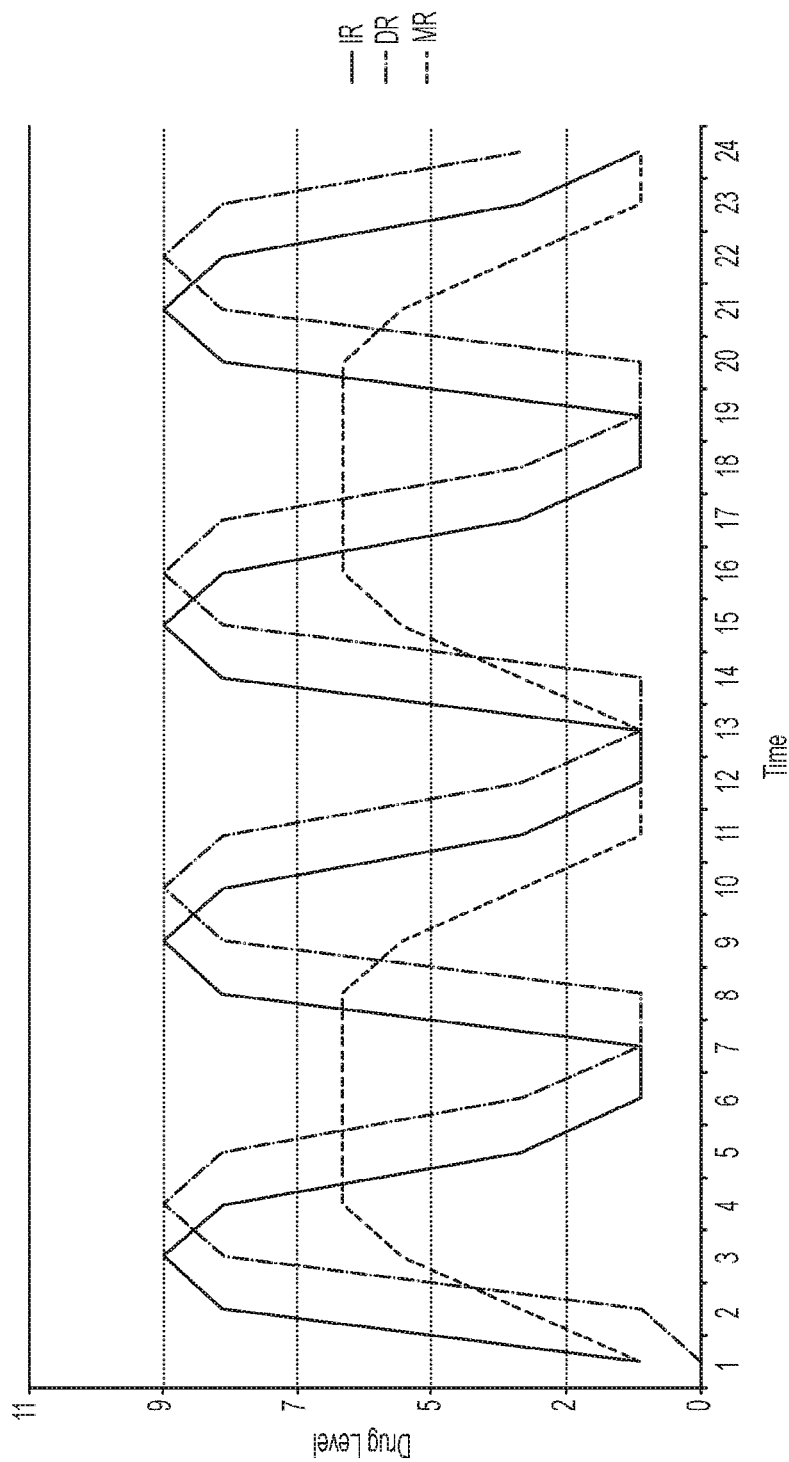
FIG. 1 depicts representative hypothetical plasma tiopronin levels of patients receiving a modified-release (MR) formulation of tiopronin, in accordance with the present invention, compared with plasma tiopronin levels of patients receiving immediate-release (IR) and delayed-release (DR) tiopronin formulations.

Other aspects, features and advantages of the invention will become apparent from the following detailed description and illustrative examples.

DETAILED DESCRIPTION

The present invention provides methods, compositions, devices, and kits for use in administration of tiopronin in modified-release formulations to treat metabolic disorders of the liver and kidneys, in particular to treat or prevent cystinuria, disorders related thereto, and symptoms thereof. Currently approved cystinuria medications result in high peak plasma levels and rapid clearance in the urine, leading to adverse side effects and the need for frequent dosing. The compositions, kits, devices, and methods of the present invention provide tiopronin in critically-spaced, repeated pulses over time, to achieve efficacy with lower peak plasma levels but consistently higher urinary levels of the drug, thereby allowing less frequent and/or lower total dosages, and leading to increased patient compliance and improved quality of life.

Cystinuria is an autosomal recessive genetic disease that is characterized by high concentration of the amino acid cysteine in the urine, leading to formation of cystine stones in the kidneys, ureter, and bladder. Mutations in either the SLC3A1 or SLC7A9 gene cause cystinuria, with the disease manifesting in patients with two copies of one of the defective genes. Due to the gene defects, a pump in the brush border membrane of the proximal renal tubules fails to reabsorb cysteine filtered out of the blood, as well as failing to absorb lysine, ornithine, and arginine (Eggermann et al., 2012, "Cystinuria: an inborn cause of urolithiasis," *Orphanet J Rare Dis* 7:19. In particular, accumulation of cysteine leads to abnormally high levels in the urinary tract, and subsequent formation and precipitation of cystine (the oxidized dimer of cysteine) as debilitating stones in the kidneys (nephrolithiasis) and ureters (ureterolithiasis). The disorder has a profoundly negative impact on the quality of life, causing excruciating pain as patients attempt to pass the frequent-forming and sometimes very large stones. Further, cystine stones are often difficult to fragment non-invasively, e.g., using non-invasive extracoporal lithothipsy. Rather, more invasive percutaneous nephrostomy often is required for stone removal. In severe cases, the patient's urine has the consistency of sand and the kidneys and surrounding organs become damaged, even to point of requiring renal transplant.

Cystinuria is a rare disease, affecting about 30,000 patients in the US and about 1 in 7,000 worldwide (Biyani et al., 2015, "Cystinuria—Diagnosis and Management" *EAU-EBU Update Series* 4(5): 175-183). Among adults, cystine stones account for about 1-2% of urinary nephrolithiasis patients; in children, 6-8% of urinary nephrolithiasis patients suffer from cystine stones (Stapleton et al., 1987, "Urolithiasis in children: the role of hypercalciuria" Pediatr Ann. 16(12): 980-981; 984-992). Of patients carrying two SLC3A1 mutations, two SLC7A9 mutations, or one copy of each mutation, more than 95% develop stones (Eggermann et al. 2012). Further, 62 out of 106 cystinuria patients are affected by recurrent cystine urolithiasis (Linari et al., 1981, "The natural history of cystinuria: a 15 year follow-up in 106 patients" in *Urolithiasis: Clinical and Basic Research*, Ed. L H Smith, Springer Science & Business Media). Cystinuria varies in severity, as scored primarily by frequency of stone formation. Nonetheless, at least half of all cases (or about 15,000 individuals in the US) require daily medication for the rest of their lives. Cystinuria also is a concern for dog owners, being a common disorder in certain dog breeds, in particular, Bulldogs, Newfoundlands, and Labrador Retrievers (Hoppe, 2001, "Cystinuria in the dog: clinical studies during 14 years of medical treatment" *J Vet Intern Med* 15(4): 361-367). Indeed, cystinuria is estimated to affect a considerable percentage of pet dogs in the US.

Treatment options aim to reduce cystine concentration in the kidneys and to increase its solubility, so as to reduce stone formation. Generally, the aim is to keep urinary cystine concentrations below 1,200 μmol/L (Lindell et al., "Clinical Course and Cystine Stone Formation During Tiopronin Treatment," *Urol. Res.*, 23, pp. 111-117, 1995); that is, below 250 mg/L. At or above this concentration, stone formation begins and, once started, is irreversible.

Options include hydration, alkalinization, and use of chelating agents. In terms of hydration, patients are told to drink 4-6 L of water per day, that is, drinking 240 mL of water every hour during the day and 480 mL before retiring for the night. The large quantities of water serve to reduce cystine concentration accumulating in urine. Regarding alkalinization, the pH and salinity of urine can be altered to keep cystine soluble, reducing stone formation. To this end, patients are advised to reduce salt intake and/or to take potassium nitrate supplements to raise the pH of urine.

Chelating agents are used to change the type of cystine to a more soluble form. Specifically, cystine can react with a thiol-binding compound (RS) to give cysteine and a mixed thiol, R-cysteine, both of which are more soluble in urine than cystine. First-generation medications for cystinuria used D-penicillamine that forms a di-sulfide complex 50 times more soluble than cystine. Bioavailability of D-penicillamine, however, dramatically decreases in patients with malabsorption states, or in the presence of antacids, or even after a large meal (see, Bergstrom et al., 1981, "Penicillamine Kinetics in Normal Subjects," *Penicillamine Kinetics,* 30(2):404-413; Ifan et al., 1986, "Short Communication, Pharmacokinetics of Oral 500-MG Penicillamine: Effect of Antacids on Absorption," *Biopharnaceutics & Drug Disposition,* 7:401-405; and Netter et al., 1987, "Clinical Pharmacokinetics of D-Penicillamine," *Clinical Pharmacokinetics* 13:317-333). Further, D-penicillamine has been associated with serious side effects, including rashes, arthralgia, leukopenia, gastrointestinal intolerance, nephritic syndrome, and vitamin B6 deficiency. Indeed, severe side effects in as many as 50-70% of patients limit the use of D-penicillamine.

In 1988, the FDA approved the use of tiopronin, alpha-mercaptopropionylglycine (alpha-MPG), as a second-generation chelating agent (sold under the tradename CAPOTEN®). Tiopronin is considered a hepatoprotective and anti-cataract agent, as well as being used in treating rheumatoid arthritis in Europe, where it is marketed as Acadione® tablets. For cystinuria, the drug is marketed by Retrophin in an immediate-release formulation (Thiola®), as 100 mg tablets of a racemic mixture of the (+) and (−) enantiomers of tiopronin. Prescribed average doses are 1,200 mg/day, taken in 400 mg doses, 3 times in a 24 hour period. Immediate-release tiopronin has two urine excretion waves, the primary one occurring 3-4 hours after oral administration (see, e.g., Hercelin et al., "The Pharmacokinetics of Tiopronin and its Principal Metabolite (2-mercaptopropionic acid) After Oral Administration to Healthy Volunteers," *Eur. J. Clin. Pharmacol.,* 43, pp. 93-95, 1992). Initial doses may start at 800 mg/day and adjusted upwards until an effective dose is determined for an individual patient. A typical recommended dose is 15 mg/kg/day for children and adults, which can be increased to, e.g., about 40 mg/kg/day for adults in severe cases of cystinuria. Urine excretion of free tiopronin and mixed-sulfide tiopronin mostly occurs 2-4 hours after administration and as much as 95% of free tiopronin is excreted in urine within 2 hours of Thiola® administration (see, e.g., Carlsson et al., 1993, "Pharmacokinetics of oral tiopronin," *European Journal of Clinical Pharmacology* 45:79-84; and Carlsson et al., 1994, "Pharmacokinetics of 2-Mercaptopropionylglycine (Tiopronin) in Patients with Impaired Renal Function," *Drug Invest.* 7(2): 101-112). Nonetheless, Thiola® is discontinued in about 30% of cases (Pak et al., 1986, Management of cystine nephrolithiasis with alpha-mercaptopropionylglycine, *J. Urol.* 136(5): 1003-1008), due to adverse reactions, the need for frequent dosing, and poor efficacy often due to uncontrolled cystine levels at night. That is, Thiola® is only effective in reducing cystine urine levels for short periods of time, not exceeding 2-4 hours, and thus requires frequent administration. Accordingly, the drug fails to address rising cystine levels during the night, between evening and morning doses, resulting in cystine crystals precipitating overnight, to form "seeds" that are irreversible and eventually grow to cystine stones. Further, when taken at higher doses, Thiola® can lead to even more serious adverse effects, with increased incidence, leading to poor compliance. Indeed, one study determined that only 15% of patients achieve and maintain therapeutic success with Thiola® (Pietrow et al., 2003, "Durability of the medical management of cystinuria" *J Urol.* 169(1):68-70). Delayed-release forms may fail to address these issues, as merely delaying the release of tiopronin, rather than providing extended duration of lower levels of the drug over longer time periods.

Strategies described herein provide benefits and advantages over other compositions and methods in which tiopronin is administered in immediate-release formulations, as well as advantages over compositions and methods using delayed-release formulations. FIG. 1, for example, depicts representative hypothetical results of plasma tiopronin levels of patients receiving a modified-release (MR) formulation of tiopronin, in accordance with the present invention, compared with plasma tiopronin levels of patients receiving immediate-release (IR) and delayed-release (DR) tiopronin formulations. As FIG. 1 illustrates, use of a delayed-release formulation may provide peak plasma levels similar to those using an immediate-release formulation; however, use of an modified-release formulation can dramatically decrease peak plasma levels of the drug.

Figure 2:
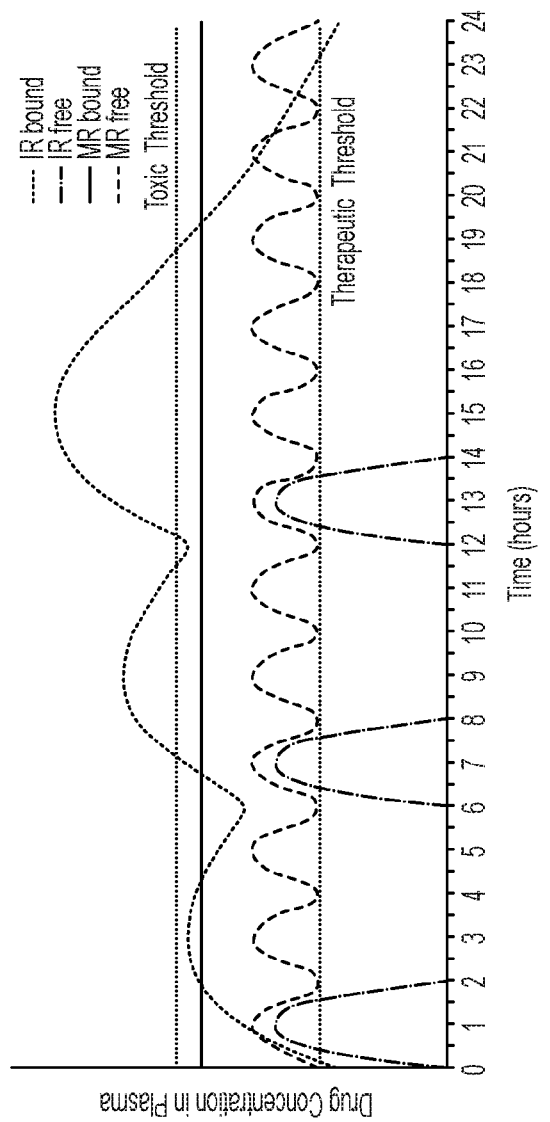
FIG. 2 depicts further details of representative hypothetical plasma tiopronin levels, distinguishing plasma levels of bound and free tiopronin for patients receiving a modified-release formulation (MR bound and MR free, respectively), in accordance with the present invention, compared with plasma levels of bound and free tiopronin for patients receiving immediate-release tiopronin formulations (IR bound and IR free, respectively), where the modified-release formulation increases availability of free tiopronin with lower total dose.

FIG. 2 depicts further details of representative hypothetical plasma tiopronin levels, distinguishing plasma levels of bound and free tiopronin for patients receiving a modified-release formulation (MR bound and MR free, respectively), in accordance with the present invention, compared with plasma levels of bound and free tiopronin for patients receiving immediate-release tiopronin formulations three times a day (IR bound and IR free, respectively), where the modified-release formulation increases availability of free tiopronin with lower total dose. As FIG. 2 illustrates, use of the modified-release formulation lowers and more consistently maintains levels of bound tiopronin in the plasma (compare the solid lines), e.g., maintaining plasma levels below a "toxic threshold," at or above which increased side effects occur. The modified-release formulation also increases and more consistently maintains free tiopronin in the plasma (compare the dotted lines), e.g., maintaining plasma levels above a "therapeutic threshold," below which increased stone formation resumes.

The present invention provides methods, compositions, devices, and kits for administering tiopronin according to a modified-release strategy to provide lower peak plasma levels, but consistently higher urinary levels of the drug, where it acts to reduce cystine concentrations and stone formation. "Consistently higher" urinary levels of the drug encompass situations where urinary levels are maintained at desired levels for longer periods of time compared to the same or similar desired levels of an immediate-release (or a delayed-release) version of the drug, e.g., maintaining urinary tiopronin levels within about 10%, within about 20%, within about 30%, within about 40%, or within about 50% of a target drug concentration; and/or providing urinary tiopronin recovery of about 20-70% of the total dose administered, for at least about 8-12 hours of extended duration of effect. Use of the present modified-release compositions or systems reduces side effects of tiopronin and enhances efficacy, allowing for less frequent administrations and/or lower total daily dosage, thereby improving patient compliance and overall quality of life.

Modified-Release Compositions and Systems

One aspect of the present invention provides compositions and systems (or articles of manufacture) for use in effecting modified-release of a therapeutic agent. Generally, the invention provides a pharmaceutical composition or other delivery system comprising the therapeutic agent and a pharmaceutically acceptable modified-release component for releasing the therapeutic in repeated, critically-spaced pulses over time, following administration or application of the composition or system to a subject. A "pulse" or "periodic pulse" can refer to a distinct bolus of drug delivered or released repeatedly over time, where less drug, preferably substantially less drug, or more preferably almost no drug is delivered or released between consecutive pulses during a critical interval of time. A "bolus" of a drug refers to a discrete amount of the drug released within a specific time, e.g., within about 1 second to about 30 min., preferably about 30 seconds to about 20 minutes, more preferably about 1 to about 15 minutes.

This approach contrasts with typical slow release or sustained release formulations, e.g., described in Chinese Application Publication No. CN1615835 A, entitled "Tiopronin Soft Capsules" (the '835 application). The '835 application teaches preparing a formulation of a highly dispersed tiopronin to be uniformly distributed in the gastrointestinal tract, for the express purpose of avoiding high local concentrations when contacting the gastrointestinal mucosa, indeed representing a teaching away from the present approach that delivers repeated, critically-spaced, distinct boluses of drug over time.

In particular embodiments, the therapeutic agent comprises tiopronin. The tiopronin may comprise a racemic or non-racemic mixture of tiopronin enantiomers; or may comprise substantially one or other of the (+) or (−) enantiomer of tiopronin. The structure of tiopronin is provided below, as Formula I. The structures of the (+) and (−) enantiomers are shown below, in Formula IIa and b, respectively.

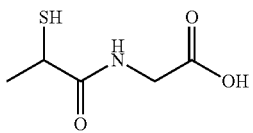

Formula I

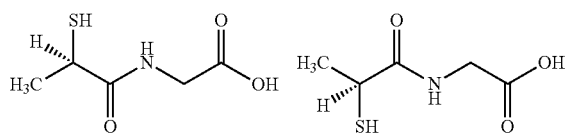

Formula II a & b

This disclosure is not limited with respect to tiopronin. The tiopronin may be a racemic mixture of tiopronin enantiomers or tiopronin derivatives; or a non-racemic mixture of tiopronin enantiomers or tiopronin derivatives, as well as substantially 100% of one or other specific tiopronin enantiomer or derivative thereof. While Thiola® is a racemic mixture, the (+) enantiomer and (−) enantiomer of tiopronin each has different pharmacokinetic parameters (Wang et al, 2008, *J. China Pharm University* 39(1):60-63). A "non-racemic mixture" of tiopronin enantiomers refers to a mixture having over 50% of one or other of the two enantiomers. In some embodiments, the non-racemic mixture contains at least about 55%, at least about 60%, at least about 70%, at least about 75%, at least about 80%, at least about 85%, at least about 90%, at least about 95%, at least about 98%, or more, or about 100% of the (+) enantiomer compared to the (−) enantiomer. In some embodiments, the non-racemic mixture contains at least about 55%, at least about 60%, at least about 70%, at least about 75%, at least about 80%, at least about 85%, at least about 90%, at least about 95%, at least about 98%, or more, or about 100% of the (−) enantiomer compared to the (+) enantiomer. In a particular embodiment, the tiopronin comprises a (+) enantiomer of tiopronin and substantially no (−) tiopronin enantiomer; or comprises a (−) enantiomer of tiopronin and substantially no (+) tiopronin enantiomer.

The modified-release component of the present invention provides pulses of the therapeutic agent, such as tiopronin, released to the subject at critically-spaced intervals, affording lower but more consistently-maintained plasma levels of the drug, as well as better urine recovery, that is, higher and more consistently-maintained urinary levels of the drug, compared to approaches with longer or shorter intervals between doses. Consistently higher tiopronin levels in urine result in lower and more consistently-maintained urinary cystine concentrations, compared to approaches with longer or shorter intervals between doses, thereby increasing efficacy. A "more consistently-maintained" or "more consistently lower" free (unbound) tiopronin level or concentration in the blood or plasma, means that preferred concentrations of free tiopronin in the blood or plasma vary within a plasma range of about 100 to about 10,000 ng/mL, about 200 to about 7,000 ng/mL, about 300 to about 6,000 ng/mL, about 400 to about 5,000 ng/mL, about 500 to about 5,000 ng/mL, about 600 to about 4,000 ng/mL, about 600 to about 3,000 ng/mL, for an extended period of therapeutic effect.

The pulses provide fractions of a total therapeutically effective amount of drug over a given period of time. It is generally believed that splitting a total dose into multiple smaller doses, individually administered over time, produces higher drug recovery in the urine as compared to giving a single large dose (Lindell et al., 1995, "Urinary excretion of free cystine and the tiopronin-cysteine-mixed disulfide during long term tiopronin treatment of cystinuria" *Nephron* 71(3):328-342), and further that with each smaller dose, delivered with increasing frequency, recovery in the urine increases further. Surprisingly, however, it has been found that this relationship is not linear, but bell-shaped. That is, for a given total dose for a given period of time, higher urine recovery of tiopronin occurs over a critical range of dosing frequency or interval length during that time period, whereas more and more frequent dosing beyond this window unexpectedly returns urine recovery to the lower levels expected with less frequent dosing. For example, for a given total daily dose, higher tiopronin urine recovery occurs when the total dose is delivered in fractions of that dose at intervals varying in length within a critical range, whereas using shorter and shorter intervals outside this window unexpectedly returns tiopronin urine recovery to the lower levels expected when using longer intervals.

In some embodiments, the modified-release component provides an interval between two consecutive pulses of about two to about six hours, preferably about three to about five hours, or more preferably about four hours apart. In some embodiments, the interval between two consecutive pulses is 1 hour, 1.5 hours, 2 hours, 2.5 hours, 3 hours, 3.5 hours, 4 hours, 4.5 hours, 5 hours, 5.5 hours, 6 hours, 6.5 hours, or 7 hours. In more preferred embodiments, the interval between two consecutive pulses is about 3 to about 5 hours, about 3.2 to about 4.8 hours, about 3.4 to about 4.6 hours, about 3.6 to about 4.4 hours, about 3.8 to about 4.2 hours, about 3.9 to about 4.1 hours, or about 4 hours.

In some embodiments, the modified-release component provides consecutive pulses that are regularly or approximately regularly spaced. That is, intervals between consecutive pulses may be the same or approximately the same, e.g., where the interval between the first and second pulse is about the same as the interval between the second and third pulse. In some embodiments, the intervals between consecutive pulses vary, e.g., where the interval between the first and second pulse is longer or shorter than the interval between the second and third pulse. In some embodiments, the intervals between consecutive pulses vary, e.g., where the interval between the first and second pulse is longer or shorter than, or the same as, the interval between the second and third pulse; and the interval between the second and third pulse is longer or shorter than, or the same as, the interval between the third and fourth pulse.

In some embodiments, the modified-release component provides pulses of equal or approximately equal fractions of a total therapeutically effective amount of drug over a given period of time. For example, for a composition comprising a total daily therapeutically effective amount of tiopronin, the drug may be released in four about equal fractions, spaced about six hours apart; or in five about equal fractions, spaced about five hours apart; or in six about equal fractions, spaced about four hours apart; or in eight about equal fractions, spaced about three hours apart; or in in twelve about equal fractions, spaced about two hours apart. In a particularly preferred embodiment, the pharmaceutical composition, or other delivery system, comprises a total daily therapeutically effective amount of tiopronin, released in six about equal fractions, spaced about four hours apart, providing higher total tiopronin urinary recovery compared to more rare or more frequent dosing. In some embodiments, the modified-release component provides pulses of unequal fractions of a total therapeutically effective amount of drug over a given period of time. In some embodiments, the modified-release component provides pulses of unequal, equal, or approximately equal, fractions of a total therapeutically effective amount of drug over a given period of time.

The modified-release component of the present invention is designed to release at least two pulses of drug, such as tiopronin. The number of pulses generally depends on the total amount of the drug used in the pharmaceutical composition or delivery system comprising the modified-release component and/or how often the composition or system is to be administered or applied to the subject. For example, in some embodiments, a first fraction is released at a first time point and a second fraction is released at a second time point after the first time point. Preferably, the modified-release component allows for more than two pulses of tiopronin, e.g., where a subsequent ($n^{th}$) fraction is released at a subsequent ($n^{th}$) time point after a preceding ($n-1^{th}$) time point. In some embodiments, a third faction is released at a third time point after the second time point; more preferably a fourth, fifth, and sixth fraction is released at a fourth, fifth, and sixth time point after the third, fourth, and fifth time point, respectively. The modified-release component is designed to space consecutive pulses according to intervals described herein.

In some embodiments, the modified-release component provides tiopronin in repeated pulses over a time period of about eight to about 48 hours, such as a period of about 12 hours, about 18 hours, about 24 hours, or about 36 hours. In some embodiments, the pharmaceutical composition or delivery system with the modified-release component comprises half a daily dose of tiopronin, fractions of which are delivered in repeated pulses about every two hours, three hours, four hours, five hours, or six hours for about 12 hours. In preferred embodiments, the pharmaceutical composition or delivery system comprises a daily dose of tiopronin, fractions of which are delivered in repeated pulses about every two hours, three hours, four hours, five hours, or six hours for about 24 hours.

Oral Delivery

In one approach, the pharmaceutical composition is formulated for oral delivery. The oral formulations generally comprise a therapeutically effective amount of tiopronin for oral delivery and a pharmaceutically acceptable modified-release component to achieve pulsed release of the therapeutic, in accordance with the present disclosures, upon passage through the gastrointestinal tract. One of skill in the art will envision various pharmaceutical formulation designs and/or arrangements that bring about the desired release schedule, including but not limited to, modified-release components comprising coatings, matrixes, beads, polymers, plugs, osmotic-push compartments, and the like, and any combinations thereof. In some embodiments, the modified-release component releases a first amount of the therapeutic agent when the composition reaches the stomach, a second amount of the therapeutic agent as the composition travels through the duodenum, a third amount of the therapeutic agent as the composition travels through the jejunum, a fourth amount of the therapeutic agent as the composition travels through the ileum; and/or a fifth amount of the therapeutic agent as the composition travels through the colon. In some embodiments, more, all, or none of the pulsed releases occur in the stomach; more, all, or none of the pulsed releases occur in the small intestine; more, all, or none of the pulsed releases occur in the duodenum; more, all, or none of the pulsed releases occur in the jejunum; more, all, or none of the pulsed releases occur in the ileum; and/or more, all, or none of the pulsed releases occur in the colon. In preferred embodiments, most or all of the pulsed releases occur in the small intestine, or at one or more locations in the tract beyond the stomach.

In some embodiments, the modified-release component comprises layers of coatings, e.g., arranged in a pill or tablet, where the different coatings dissolve in different areas of the gastrointestinal tract and/or at step-wise, staggered times, to release repeated pulses of tiopronin over time. For example, the layers of coatings may include a coating that dissolves or disintegrates when exposed to conditions in the stomach (a "stomach-dissolving coating"), and/or one or more coatings that dissolve along different parts of the tract, such as a duodenum-dissolving coating, a jejunum-dissolving coating, an ileum-dissolving coating, and/or a colon-dissolving coating. The coatings are designed to dissolve or disintegrate in respective locations in the gastrointestinal tract using, e.g., pH-dependent delivery, time-controlled delivery, microbially-targeted delivery polysaccharide based-delivery or other technology described herein, known in the art (see, e.g., Madhu, et al., 2011, "Colon Specific Delivery System: The Local Drug Targeting" Review Article, *International Research Journal of Pharmacy,* 2(12): 103-107), and/or to be developed especially in view of the present disclosures.

As used herein, the term "polymer" refers to synthetic homo- or copolymers, naturally occurring homo- or copolymers, as well as synthetic modifications or derivatives thereof having a linear, branched or star structure. Copolymers can be arranged in any form, such as, e.g., random, block, segmented, tapered blocks, graft, or triblock.

In preferred embodiments, the coatings dissolve sequentially over time, for example, to release an $n^{th}$ fraction of the tiopronin at an $n^{th}$ time point after a preceding $(n-1)^{th}$ time point, at critically-spaced intervals as described herein. This approach resembles a "jaw breaker" with a core and alternating layers of targeted coatings and drug. The coatings may be of similar or different composition, depending on the physiological environment in the area of the body that will dissolve the coating and trigger the release of drug, and/or may vary in thickness to help achieve release of the drug in repeated, critically-spaced pulses, as described herein.

Figure 3:
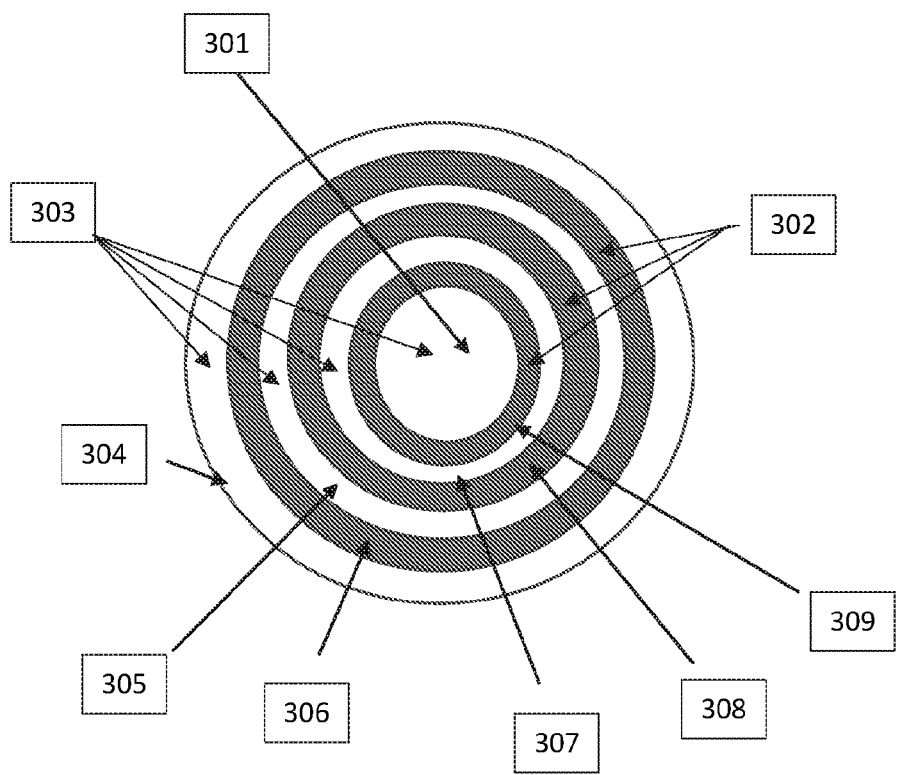
FIG. 3 depicts a representative modified-release component comprising layers of coatings, as seen in a cross-section of a pill or table, having a core of tiopronin (301) surrounded by alternating layers of differently-dissolving coatings (302) and tiopronin (303), where the different layers dissolve in different areas of the gastrointestinal tract and/or at step-wise, staggered times to release repeated pulses of tiopronin over time in accordance with the invention.

FIG. 3 depicts one example of a modified-release component comprising layers of coatings, as seen in a cross-section of a pill or table, having a core of tiopronin (301) surrounded by alternating layers of differently-dissolving coatings (302) and layers of tiopronin (303), where the different layers are arranged in roughly concentric spheres and dissolve in different areas of the gastrointestinal tract and/or at step-wise, staggered times to release repeated pulses of tiopronin over time in accordance with the invention. In this example, the outermost layer of tiopronin (304) is released in the stomach, the next layer (305) is released in the duodenum upon dissolution of a duodenum-dissolving coating (306); the next innermost layer (307) is released in the jejunum and/or ileum upon dissolution of a jejunum- and ileum-dissolving coating (308), and finally the core (301) is released in the large intestines upon dissolution of a colon-dissolving coating (309). One of skill in the art will readily envision variations of this arrangement in view of the present teachings, e.g., where the core comprises an inert material coated in a layer of tiopronin, followed by alternating layers of differently-dissolving coatings and tiopronin. In some embodiments, a "small-intestine-dissolving coating" may be used instead of, or with, the duodenum-, jejunum-, and/or ileum-dissolving coatings, where the small-intestine-dissolving coating dissolves or disintegrates to release repeated, critically-spaced pulses of drug over time in the small intestines, preferably independent of its position along the small intestines. Further, in some embodiments, additional layers may be used to achieve additional pulses in accordance with the invention.

The different coatings may be arranged so as to provide immediate and subsequent repeated release of the therapeutic. Delaying release of tiopronin, or fractions of tiopronin, past the stomach allows increased uptake in the small intestine, which increases bioavailability and distribution of tiopronin to the kidneys and urine. Release, for example, over the course of the small intestine, allows for extended duration of effect of smaller tiopronin amounts, reducing peak blood levels while increasing urinary levels of the therapeutic, and maintaining those levels more evenly throughout the day and night, which results in fewer adverse side effects and greater therapeutic efficacy.

A mixture of types of tablets also can be used, e.g., a first set that releases first and second critically-spaced pulses of tiopronin, e.g., in the stomach and duodenum, respectively; and a second set that can be administered at about the same time as the first set and that releases still later and also critically-spaced third and fourth pulses of tiopronin, e.g., in the jejunum/ileum and in the large intestines, respectively. In a preferred embodiment, the first and second sets are color-coded, differently-labelled, and/or differently-marked, e.g., to allow easy identification by the patient, pet-owner, and/or health practitioner. In some embodiments, a third set is used that can be administered at about the same time as the first and second sets, which releases still later and also critically-spaced fifth and sixth pulses of tiopronin. Preferably, the third set also is color-coded, differently-labelled, and/or differently-marked compared to the first and second sets.

In some embodiments, the modified-release component comprises a matrix of differently-dissolving segments, where the different segments dissolve in different areas of the gastrointestinal tract and/or at step-wise, staggered times, to release repeated pulses of tiopronin over time in accordance with the invention. For example, a pill/tablet with drug reservoirs that are exposed sequentially in intervals may be used, such as where the reservoirs are enclosed in segments of different thicknesses and/or segments made up of different types of polymers selected to disintegrate at different times or in different locations along the gastrointestinal tract.

Figure 4:
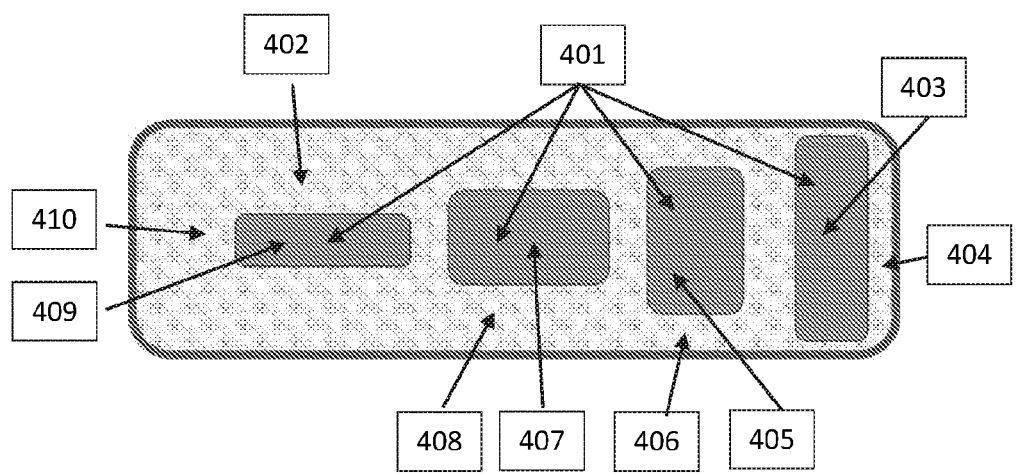
FIG. 4 depicts a representative modified-release component comprising a matrix of differently-dissolving segments, as seen in a cross-section of a pill or table, having multiple reservoirs of tiopronin (401) surrounded by different matrix thicknesses (402), where the different segments dissolve in different areas of the gastrointestinal tract and/or at step-wise, staggered times to release repeated pulses of tiopronin over time in accordance with the invention.

FIG. 4 depicts one example of a modified-release component comprising a matrix of differently-dissolving segments, as seen in a cross-section of a pill or table, having multiple reservoirs of tiopronin (401) surrounded by different matrix thicknesses (402). In this example, a first reservoir of tiopronin (403) is released in the stomach upon dissolution of a relatively thin matrix segment (404) that surrounds the first reservoir; a second reservoir (405) is released about four hours later upon dissolution of a thicker segment (406) that surrounds the second reservoir; a third reservoir (407) is released about a further four hours later upon dissolution of an even thicker segment (408) that surrounds the third reservoir; and finally a fourth reservoir (409) is released about another four hours later upon dissolution of the thickest segment (410) surrounding the fourth reservoir. One of skill in the art will readily envision variations of this arrangement in view of the present teachings. For example, in some embodiments, the intervals between periodic release may be more or less than about four hours, varying within the critical range, as taught herein. In some embodiments, additional reservoirs and segments may be used to achieve additional pulses, e.g., a fifth, sixth, seventh, and/or eight pulse, released at critically-spaced intervals in accordance with the invention.

In some embodiments, a capsule filled with beads or microbeads is used, for example, a capsule that contains beads with a combination of different coatings designed to dissolve in various portions of the gastrointestinal tract and/or at sequential times. For example, in some embodiments, the beads are coated with the same or similar type of coating, but with different thicknesses that disintegrate to release drug at the critically-spaced intervals of time.

Coatings may be selected for dissolution in particular environments of the gastrointestinal tract. For example, a "duodenum-dissolving coating" may comprise pH-sensitive materials, which remain intact at the lower pH environment of the stomach, but which disintegrate or dissolve at the pH commonly found in the small intestine of the patient. A coating may be selected of suitable thickness, to resist stomach acids for the length of time in the stomach. Typically, a substantial amount or all of a particular coating is dissolved before the therapeutic agent is released from the bead or compartment enveloped by that coating, thereby achieving pulsed release of the therapeutic agent.

Different pH-sensitive materials may be used in the different coatings, where the different materials disintegrate or dissolve over a range of increasing pH, preferably in a step-wise manner, corresponding to the increasing pH along the small intestines. The pH of the small intestine gradually increases from about 4.5 to about 6.5, in the duodenal bulb, to about 7.2 in the distal portions of the small intestine (ileum). In some embodiments, a "duodenum-dissolving coating" may be designed to disintegrate or dissolve at a pH between about 5 to about 5.5; a "jejunum-dissolving coating," at a pH between about 6 to about 6.5, and an "ileum-dissolving coating," at a pH between about 7 to about 7.2. The composition thus may disintegrates or dissolves while transiting the small intestine, in periodic pulses in accordance with the invention.

Nonlimiting examples of materials, and combinations of materials, suitable for use in some embodiments of the present compositions include beeswax and glyceryl monostearate; beeswax, shellac, and cellulose; cetyl alcohol, mastic, and shellac; shellac and stearic acid; polyvinyl acetate and ethyl cellulose; neutral copolymers of polymethacrylic acid esters; copolymers of methacrylic acid and methacrylic acid methylester, neutral copolymers of polymethacrylic acid esters containing metallic stearates; cellulose acid phthalates, and the like. Additional polymers for use in modified-release coatings are found, e.g., in Goodhart et al., Pharm. Tech., pp. 64-71, April 1984; and U.S. Pat. Nos. 2,809,918, 3,835,221, 4,432,966, 4,728,512, 4,794,001, and 5,225,202. Additional pH-sensitive materials for use in some embodiments of the present invention include those described in US 2010/0310541 to Kessler et al, entitled "Compositions and Methods for Reducing the Toxicity of Certain Toxins, e.g., ¶¶ [0058] and [0063]-[0065].

Figure 5:
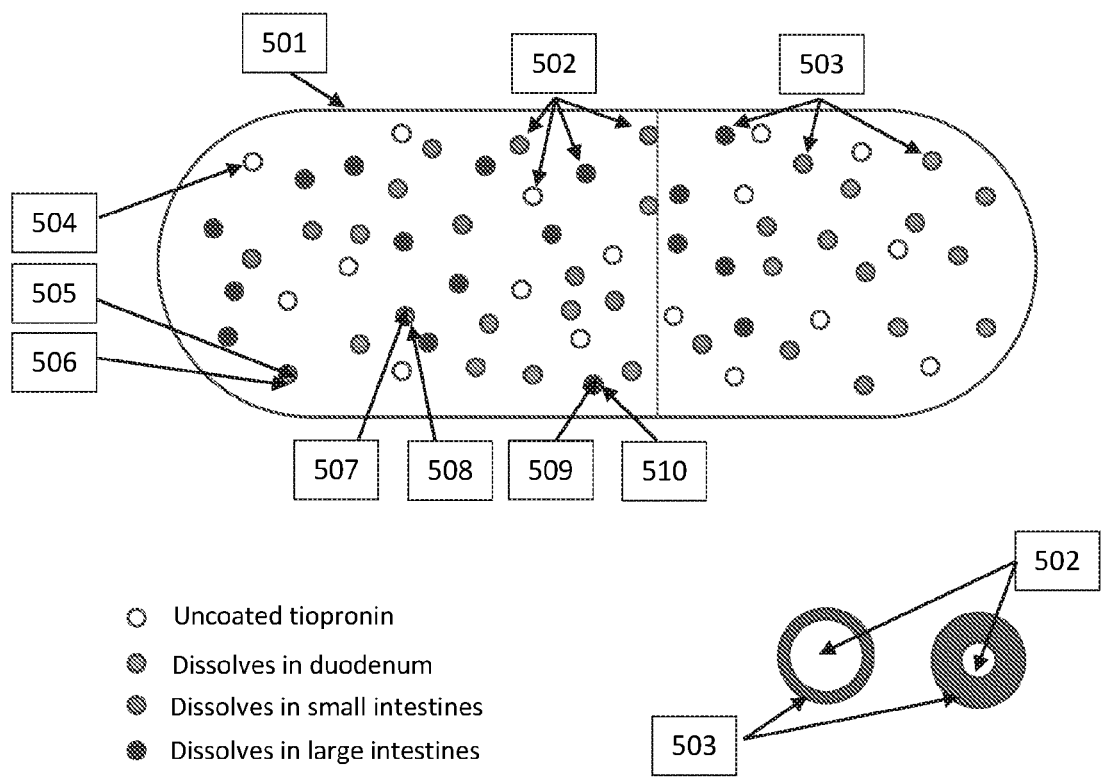
FIGS. 5A-5B depict a representative modified-release component comprising a capsule of differently-coated beads, as seen in a cross-section of the capsule (501), with multiple tiopronin-containing beads (502) having different coatings (503), where the different coatings dissolve in different areas of the gastrointestinal tract and/or at step-wise, staggered times to release repeated pulses of tiopronin over time in accordance with the invention.

FIGS. 5A-5B depict one example of a modified-release component comprising a capsule of differently-coated beads, as seen in a cross-section of the capsule (501), with multiple tiopronin-containing beads (502) having different coatings (503), where the different coatings dissolve in different areas of the gastrointestinal tract and/or at stepwise, staggered times to release repeated pulses of tiopronin over time in accordance with the invention. In the example shown in FIG. 5, a first set of beads (504) is uncoated to release tiopronin in the stomach; a second set of beads (505) releases drug in the duodenum upon dissolution of a duodenum-dissolving coating (506); a third set of beads (507) release drug in the jejunum and/or ileum upon dissolution of a jejunum- and ileum-dissolving coating (508), and finally a fourth set of beads (509) releases drug in the large intestines upon dissolution of a colon-dissolving coating (510). FIG. 5B shows an alternative arrangement where different sets of beads have coatings of different thicknesses, which dissolve at different times as the beads traverse the gastrointestinal tract. One of skill in the art will readily envision other variations of these arrangements in view of the present teachings. For example, in some embodiments, additional sets of beads may be used to achieve additional pulses, e.g., a fifth, sixth, seventh, and/or eight pulse, released at critically-spaced intervals in accordance with the invention. In some embodiments, a "small-intestine-dissolving coating" may be used instead of, or with, the duodenum-, jejunum-, and/or ileum-dissolving coatings, where the small-intestine-dissolving coating dissolves or disintegrates to release repeated, critically-spaced pulses of drug over time in the small intestines, preferably independent of its position along the small intestines.

The different coatings, as described herein, serve to effect "gastrointestinal targeting," that is, targeted release of contents that sequentially come into contact with particular regions of the gastrointestinal tract based on, e.g., respective prevailing pH ranges along the tract. In some embodiments, an anionic polymer or copolymer is used as the coating. Suitable anionic polymers or copolymers include, but are not limited to, cellulose glycolate (Duodcell®), cellulose acetate phthalate (CAP, cellulose acetate, cellulose acetate-phthalate), cellulose acetate succinate (CAS), cellulose acetate trimeliate (CAT), hydroxypropylmethylcellulose (HPMC), e.g., Methocell® E4M or Methocell® K100 available from Dow Chemical Co. of Midland, Mich.), hydroxypropylmethylcellulose phthalate (HPMCP, HP50, HP55), hydroxypropylmethyl cellulose acetate succinate (HPMCAS-LF, -MF, -HF), polyvinylacetate pthalate (PVAP, Sureteric®), vinyl acetate vinylpyrolidone-copolymer (PVAc, Kollidon® VA64), and Shell or varnish. The polymers or copolymers referred to can be formulated such that a pH-specific resolution is achieved.

In some embodiments, a capsule with variable dissolution rates in different regions of the capsule is used. For example, the capsule may comprise "rings" or "bands" that dissolve at different rates and/or in different locations along the gastrointestinal tract to achieve pulsed release of drug, as described herein. The dissolving segments are often separated by intervening rings that do not dissolve (or do not substantially dissolve) but serve to support the capsule as other parts disintegrate (referred to herein as "non-dissolving rings").

Figure 6:
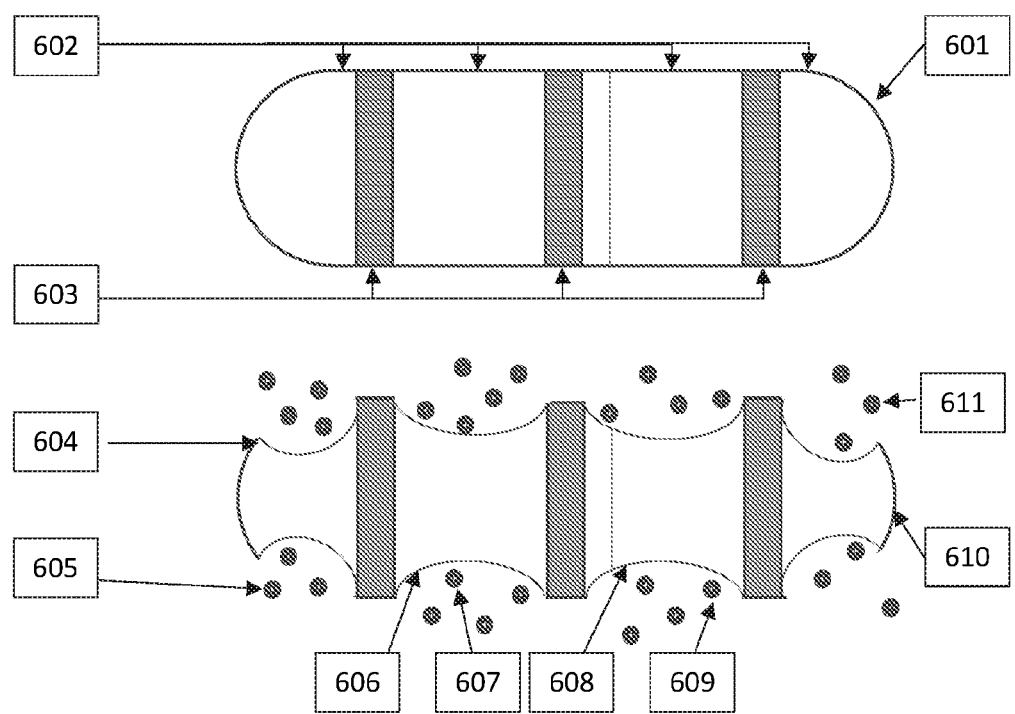
FIGS. 6A-6B depict a representative modified-release component comprising a capsule of differently-dissolving bands, as seen in a cross-section of the capsule (601), separated into multiple bands (602) by intervening non-dissolving rings (603), where the different bands dissolve in different areas of the gastrointestinal tract and/or at step-wise, staggered times to release repeated pulses of tiopronin over time in accordance with the invention.

FIGS. 6A-6B depict one example of a modified-release component comprising a capsule of differently-dissolving bands, as seen in a cross-section of the capsule (601), separated into multiple bands (602) by intervening non-dissolving rings (603), where the different bands dissolve in different areas of the gastrointestinal tract and/or at stepwise, staggered times to release repeated pulses of tiopronin over time in accordance with the invention. In this example, as seen in FIG. 6B, a first band of capsule (604) dissolves to release a first pulse of tiopronin (605); a second band (606) dissolves to release a second pulse of tiopronin (607) about four hours later; a third band (608) dissolves to release a third pulse of tiopronin (609) about a further four hours later; and finally a fourth band (610) dissolves to release a fourth pulse of tiopronin (611) about another four hours later. One of skill in the art will readily envision variations of this arrangement in view of the present teachings. For example, in some embodiments, the intervals between periodic release may be more or less than about four hours, varying within the critical range, as taught herein. Further, in some embodiments, additional bands (with intervening rings) may be used to achieve additional pulses, e.g., a fifth, sixth, seventh, and/or eight pulse, released at critically-spaced intervals in accordance with the invention.

In some embodiments, the modified-release component comprises delivery systems using a more active expulsion of drug, under selected physiological conditions, which can include pH, salinity, or simply expulsion over time. Nonlimiting examples include plugs and osmotic-push compartments. For example, a plug may be selected/designed that becomes unplugged specifically in the stomach ("a stomach-releasing plug") to release contents of the plugged compartment (or most or substantially all of the contents of the plugged compartment) while in the stomach. An osmotic-push compartment can be selected/designed that first expands in the stomach due to osmolality differences between that compartment and the stomach, to bring about release of contents of that compartment (or most or substantially all of the contents of that compartment) in the stomach. Plugs and push compartments that release contents in other location of the gastrointestinal tract can be similarly selected and/or designed. A device utilizing osmotic push compartments generally will comprise an osmotic agent that imbibes water from the surrounding environment via a semi-permeable membrane. The osmotic agent may be an aqueous-swellable hydrophilic polymer, as osmogen, or osmagent. Additional osmotic devices for use in some embodiments of the present invention include those described in US 2010/0310541 to Kessler et al, entitled "Compositions and Methods for Reducing the Toxicity of Certain Toxins, e.g., ¶¶ [0059], [0061], and [0077]-[0095].

Figure 7:
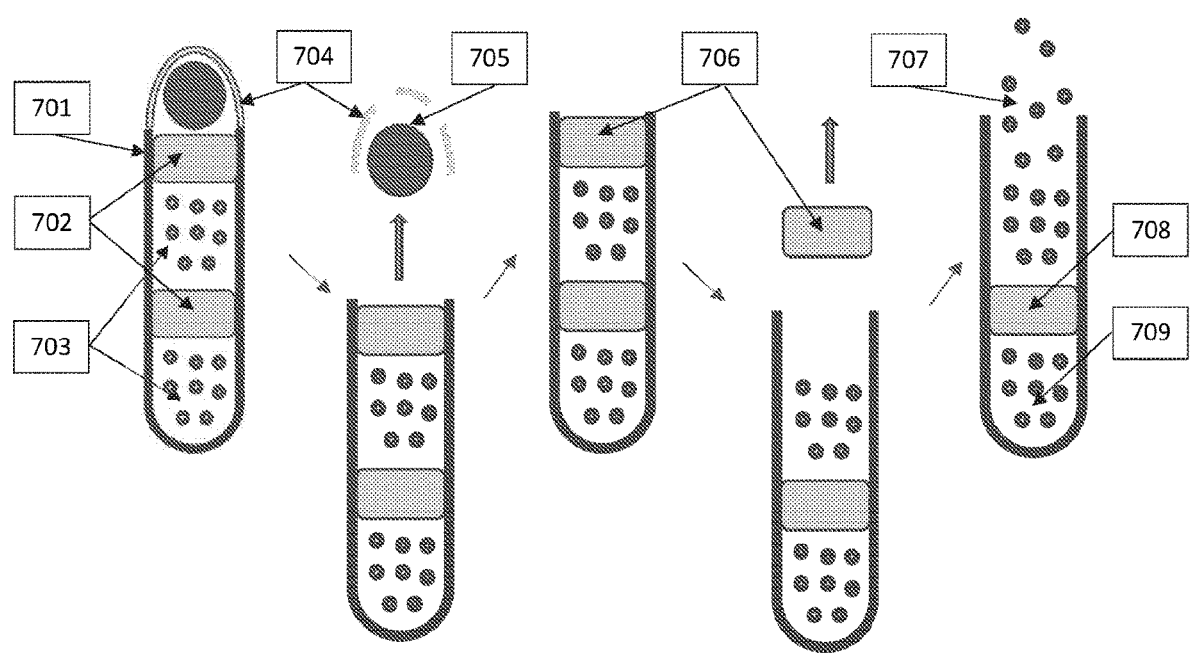
FIG. 7 depicts a representative modified-release component comprising a capsule with differently-releasing plugs, as seen in a cross-section of the capsule (701), where the different plugs (702) separate multiple compartments of tiopronin (703) and become unplugged in different areas of the gastrointestinal tract and/or at step-wise, staggered times to release repeated pulses of tiopronin over time in accordance with the invention.

FIG. 7 depicts one example of a modified-release component comprising a capsule with differently-releasing plugs, as seen in a cross-section of the capsule (701), where the different plugs (702) separate multiple compartments of tiopronin (703) and become unplugged in different areas of the gastrointestinal tract and/or at step-wise, staggered times to release repeated pulses of tiopronin over time in accordance with the invention. In this example, a cap (704) at one end of the capsule dissolves to release a first pulse (bolus) of tiopronin (705); unplugging of the first plug (706) then releases a second pulse of tiopronin (707) about four hours later; finally, unplugging of the second plug (708) releases a third pulse of tiopronin (709) about another four hours later. One of skill in the art will readily envision variations of this arrangement in view of the present teachings. For example, in some embodiments, the intervals between periodic release may be more or less than about four hours, varying within the critical range, as taught herein. Further, several of these systems can be stacked in the same capsule leading to multiple releases over time. For example, in some embodiments, additional plugs are used to achieve, e.g., a fourth, fifth, sixth, seventh, and/or eight pulse, released at critically-spaced intervals in accordance with the invention.

Another approach uses a capsule with individual packets, where a packet comprises drug and an osmotic-push compartment and the drug is "pushed" out of different packets at different times, e.g., based on changing osmolality at different locations along the gastrointestinal tract. For example, one push compartment may be first activated by absorption of fluid found in the small intestines and this fluid causes the push compartment to expand and eject drug from the packet. Delivery systems using this approach are commercially available, e.g., OROS™ (Osmotic controlled Release Oral delivery System) from Alza.

Moreover, one of skill in the art will appreciate that one or more approaches for modified release, described herein, known in the art, and/or to be developed especially in view of the present disclosures, can be combined to bring about the critically-spaced release of tiopronin pulses, in accordance with this invention.

Figure 8:
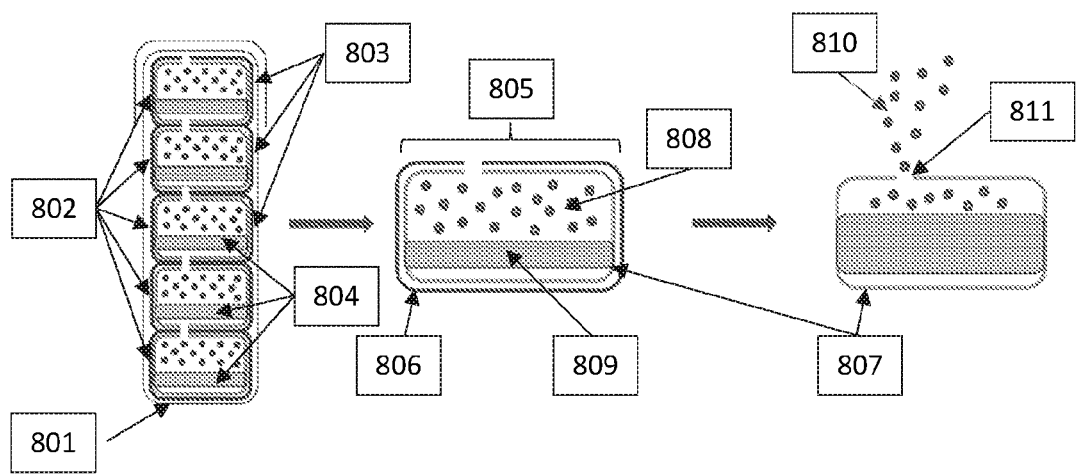
FIGS. 8A-8B depict a representative modified-release component comprising a capsule of packets with differently-dissolving coatings and differently-expanding osmotic-push compartments, as seen in a cross-section of the capsule (801) and packets (802), where the different coatings (803) dissolve in different areas of the gastrointestinal tract and/or at step-wise, staggered times, and the different osmotic-push compartments (804) expand in different areas of the gastrointestinal tract and/or at step-wise, staggered times, working together to release repeated pulses of tiopronin over time in accordance with the invention.

FIGS. 8A-8B depict one example of modified-release component combining approaches and comprising a capsule of packets with differently-dissolving coatings as well as differently-expanding osmotic-push compartments, as seen in a cross-section of the capsule (801) and packets (802). The different coatings (803) dissolve in different areas of the gastrointestinal tract and/or at step-wise, staggered times, and the different osmotic-push compartments (804) expand in different areas of the gastrointestinal tract and/or at step-wise, staggered times, working together to release repeated pulses of tiopronin over time in accordance with the invention. FIG. 8B is a blown-up view of one packet.

In the example shown in FIG. 8B, the capsule is composed of a gelatin that dissolves in the stomach, releasing five distinct packets. Individual packets have an external membrane or coating that dissolves in the appropriate part of the gastrointestinal tract. For example, the first packet (805) is enclosed by a first coating (806) that first dissolves in the stomach; the first packet also contains a first semi-permeable or osmotic membrane (807) surrounding a first tiopronin compartment (808) and a stomach-expanding osmotic-push compartment (809). The push compartment (809) first expands in the stomach, due to osmolality differences between the stomach-expanding compartment and the stomach, to release a first pulse (810) of tiopronin that is pushed through a first small orifice or aperture (811) in the first semi-permeable membrane.

The same or similar process occurs for remaining packets. For example, in this example, a second packet is enclosed by a second coating that first dissolves in the duodenum, the second packet also containing a second semi-permeable membrane surrounding a second tiopronin compartment and a duodenum-expanding osmotic-push compartment. This push compartment first expands in the duodenum, due to osmolality differences between the duodenum-expanding compartment and the duodenum, to release a second pulse of tiopronin that is pushed through a second small orifice or aperture found on the second semi-permeable membrane. Further, for example in this embodiment, a third packet is enclosed by a third coating that first dissolves in the jejunum, the third packet also containing a third semi-permeable membrane surrounding a third tiopronin compartment and a jejunum-expanding osmotic-push compartment, which first expands in the jejunum due to osmolality differences between the jejunum-expanding compartment and the jejunum, to release a third pulse of tiopronin that is pushed through a third small orifice or aperture found on the third semi-permeable membrane, and so on for fourth and fifth packets, having ileum-expanding and colon-expanding osmotic-push compartments, that expand to release fourth and fifth pulses of tiopronin in the ileum and colon, respectively. One of skill in the art will readily envision variations of this arrangement in view of the present teachings. For example, in some embodiments, additional packets are used to achieve additional pulses, released at critically-spaced intervals in accordance with the invention. In some embodiments, a "small-intestine-expanding" osmotic-push compartment may be used instead of, or with, a duodenum-, jejunum-, and/or ileum-expanding push compartments, where the small-intestine-expanding compartment expands to bring about release of drug in repeated, critically-spaced pulses over time in the small intestines, preferably independent of its position along the small intestines.

In some embodiments, the modified-release component comprises a matrix comprising differently-releasing polymers, where the different polymers release tiopronin in different areas of the gastrointestinal tract and/or at step-wise, staggered times in accordance with the invention. Matrices may be biodegradable or mineral-based and may comprise macro- or micro-porous systems. Varying geometry and permeability of a matrix allows for various types of drug release profiles. Generally speaking, the rate at which a drug is released from a matrix is proportional to the surface area exposed over time. Changing the surface area or changing the time of exposure can alter the amount of drug released and the timing thereof. For example, in some embodiments, a tablet is embedded with multiple reservoirs, containing the same or various amounts of drug, and coated with a polymer matrix comprising differently-releasing polymers through which the embedded drug leeches out over time, in accordance with the present disclosures.

In some embodiments, the modified-release component comprises a matrix of a "stomach-releasing polymer" that releases its cargo (or most or substantially all of its cargo) in the stomach; a "duodenum-releasing polymer" that releases its cargo (or most or substantially all of its cargo) in the duodenum; a "jejunum-releasing polymer" that releases its cargo (or most or substantially all of its cargo) in the jejunum; an "ileum-releasing polymer" that releases its cargo (or most or substantially all of its cargo) in the ileum; and/or "colon-releasing polymer" that releases its cargo (or most or substantially all of its cargo) in the colon. One of skill in the art can select matrix polymers to effect release of tiopronin (as the cargo) in specific regions of the gastrointestinal tract (see, e.g., Patel et al., 2011, "Matrix Type Drug Delivery System: A Review" *Journal of Pharmaceutical Science and Bioscientific Research,* 1(3): 143-151). In some embodiments, a "small-intestine-releasing polymer" may be used instead of, or with, the duodenum-, jejunum-, and/or ileum-releasing polymers, where the small-intestine-releasing polymer releases repeated, critically-spaced pulses of drug over time in the small intestines, preferably independent of its position along the small intestines.

The matrix polymers used may be hydrophilic polymers, hydrophobic polymers, lipids, plastics, or any combination thereof. Generally, drug is mixed with one or more polymer types, a variety of which are commercially available. Examples of hydrophilic polymers for use in the modified-release component include, but are not limited to, Hydroxypropylmethylcellulose (HPMC), Hydroxypropylcellulose (HPC), Hydroxyethyl cellulose (HEC), Xanthan gum, Sodium alginate, Poly (ethylene oxide) and cross-linked homopolymers and copolymers of Acrylic acid. Non-limiting examples of hydrophobic polymers include polyethylene, polyvinyl chloride, ethyl cellulose and acrylate polymers and their copolymers. Non-limiting examples of lipids include carnauba wax with stearyl alcohol or stearic acid. Other polymers for use in certain embodiments are those described in, e.g., US 2008/0255073 to Gallop et al., entitled "Compounds for sustained release of orally-delivered drugs;" U.S. Pat. No. 7,033,583 to Choe et al., entitled "Polymeric thiol-linked prodrugs;" U.S. Pat. No. 7,262,164 to Choe et al., entitled "Polymeric thiol-linked prodrugs employing benzyl elimination systems;" US 2010/0069293 to Bolotin et al., entitled "Polymeric carrier compositions for delivery of active agents methods of making and using the same;" US 2016/0279056 to Zhao et al., entitled "Liquisoft capsules;" WO 2013/004999 to Biocopea Ltd, entitled "Drug combinations and uses in treating a coughing condition." Additional polymeric matrixes for use in some embodiments of the present invention include those described in US 2010/0310541 to Kessler et al, entitled "Compositions and Methods for Reducing the Toxicity of Certain Toxins, e.g., ¶¶ [0060], [0062] (describing terpolymers), and [0069]-[0074] (describing erodible and nonerodible matrices).

Other approaches for controlling release of drug that may or may not be used with the compositions or delivery systems disclosed herein include, e.g., polymer coatings according to US 20070249735 to Chopdekar et al., entitled "Halide-free glucosamine-acidic drug complexes;" ionic liquids of US 20070093462 to Rogers et al., entitled "Multifunctional ionic liquid compositions for overcoming polymorphism and imparting improved properties for active pharmaceutical, biological, nutritional, and energetic ingredients;" or additional approaches described in US 2010/0310541 to Kessler et al., entitled "Compositions and Methods for Reducing the Toxicity of Certain Toxins;" US 2015/0328323 to Satyam, entitled "Nitric Oxide Releasing Pro-drugs of Therapeutic Agents;" and US 2017/0129867 to Nguyen et al., entitled "Tiopronin prodrugs, pharmaceutical compositions thereof, and methods of use."

In some embodiments, the modified-release component comprises a matrix comprising differently-adhering polymers, where the different polymers adhere to, and release tiopronin in, different areas of the gastrointestinal tract and/or at step-wise, staggered times in accordance with the invention. For example, an oral multiparticulate form may be used comprising pellets containing tiopronin, embedded in a matrix of polymers with different mucoadhesive effects, such as a "stomach-adhering polymer" that adheres to the stomach and releases its cargo (or most or substantially all of its cargo) in the stomach; a "duodenum-adhering polymer" that adheres to the duodenum and releases its cargo (or most or substantially all of its cargo) in the duodenum; a "jejunum-adhering polymer" that adheres to the jejunum and releases its cargo (or most or substantially all of its cargo) in the jejunum; an "ileum-adhering polymer" that adheres to the ileum and releases its cargo (or most or substantially all of its cargo) in the ileum; and/or "colon-adhering polymer" that adheres to and releases its cargo (or most or substantially all of its cargo) in the colon. One of skill in the art can select matrix polymers to adhere to (and effect release of tiopronin as the cargo) in specific regions of the tract. In some embodiments, a "small-intestine-adhering polymer" may be used instead of, or with, the duodenum-, jejunum-, and/or ileum-adhering polymers, where the small-intestine-adhering polymer releases repeated, critically-spaced pulses of drug over time in the small intestines, preferably independent of its position along the small intestines.

For example, one of the mucoadhesive polymers may be selected to bind at regions +/−0.5 pH units, preferably +/−0.3 pH units, relative to the pH at which an outer enteric coating starts to dissolve. The mucoadhesive polymers may be selected to have desired mucoadhesive effects, as described herein, based on parameters known in the art, e.g., having a water absorption of 10 to 750%, preferably 10 to 250%, more preferably 10 to 160% by weight in about 15 minutes (see, also e.g., WO 2005/007139 to Lizio et al., entitled "Multiparticle Pharmaceutical Dosage Form Containing A Mucoadhesively Formulated Peptide Or Protein Active Substances Method For Producing Said Pharmaceutical Dosage Form"). Suitable differently-adhering polymers include, but are not limited to, chitosan and derivatives thereof, (meth) acrylate copolymers, celluloses, in particular methyl celluloses such as sodium carboxymethylcellulose (e.g., Blanose, Methocel®), and the like, or combinations thereof. In preferred embodiments, the mucoadhering polymers comprise (meth) acrylate copolymers. Additional bioadhesive materials for use in some embodiments of the present invention include those described in US 2010/0310541 to Kessler et al, entitled "Compositions and Methods for Reducing the Toxicity of Certain Toxins, e.g., ¶ [0066]].

In a particular embodiment, the matrix of differently-adhering polymers itself is enterically coated, e.g., with an outer coating comprising an anionic polymer or copolymer, that releases pellets in the matrix beyond the stomach (e.g., based on the pH range of the stomach, thickness of the coating, choice of anionic polymer and/or additional excipients, etc.). For example, the outer coating may dissolve in area of pH 4.0 to 8.0 in the intestine, and/or within 15 to 60 min of being swallowed, releasing the matrix of mucoadhesive polymers that differentially bind along different regions of the intestinal mucosa, and there release the therapeutic (tiopronin). The outer coating preferably has little or no interactions with therapeutic (tiopronin) nor with the mucoadhesive polymer matrix. In some embodiments, multiple coatings are used, containing the same or different mucoadhesive polymer matrix, where the different coatings differentially dissolve in different areas of the gastrointestinal tract and/or at step-wise, staggered times in accordance with the invention and as described above.

In some embodiments, the modified-release component comprises an electronic device, a microfluidic device, a microprocessor, a nanotechnology device, and/or other device that is programmed/designed to facilitate timed release of a therapeutic agent. For example, microprocessors or other mechanical devices may be used to time delivery, in some cases providing precisely timed releases of drug. In a particular embodiment, the device used is a Intellicap Electronic Capsule, commercially available from Medimetrics (Eindhoven, The Netherlands), which comprises a microfluidic pump controlled by an integrated microprocessor and powered by an on-board battery. One of skill in the art will appreciate that developing technology is creating additional approaches for timing drug delivery, any of which may be used in the alternative or in combination with one or more modified-release components described herein.

Enteric-Coated Delivery

In another approach regarding modified-release, the compositions comprise a coating, encapsulating the therapeutic agent, to achieve a delayed or prolonged release of the therapeutic as the composition travels through the gastrointestinal tract. In particular embodiments, the coating delays release past the stomach, allowing increased uptake in the small intestines compared to the non-coated therapeutic. That is, in some embodiments, the extended-release approach prevents, substantially prevents, or reduces stomach uptake, leaving more of the therapeutic agent available for small intestine uptake, and then extends the period of release in the small intestine, preferably in repeated, critically-spaced pulses over a period of time, as described above. Increased uptake in the small intestine thus can refer to preferred or selective release in the small intestine, such as that effected by certain embodiments of the modified-release strategies described herein. Increased small intestine uptake of tiopronin, for example, surprisingly increases bioavailability and distribution of the drug to the kidneys and urine, leading to particularly higher and more consistently higher concentrations of tiopronin in the urine.

In preferred embodiments, delayed release is followed by prolonged and controlled release, for example, release of the therapeutic as the composition travels through the small intestines, preferably in repeated, critically-spaced pulses over a period of time, as described above. Small intestine controlled-release of tiopronin, for example, extends the duration of therapeutic effect of the drug, as small amounts are released over an extended period of time, preferably in critically-spaced pulses. Small intestine controlled-release also reduces peak blood levels and surprisingly increases urinary levels of the drug, where it acts to reduce cystine concentration and stone formation. In more preferred embodiments, the enteric-coated formulations of the invention dramatically reduce toxicity of tiopronin, reducing severity and/or incidence of adverse side effects. In even more preferred embodiments, the enteric-coated formulations of the invention dramatically improve therapeutic efficacy of tiopronin, for example, in reducing urinary cystine concentrations. In some embodiments the reduction in toxicity and/or increase in efficacy is statistically significant compared to immediate-release (or delayed-release) versions.

In some embodiments, the invention provides a composition comprising a coated therapeutic agent that has increased uptake in the small intestine compared to the non-coated therapeutic agent when administered orally.

Enteric-coated formulations of the invention release the therapeutic agent, e.g., tiopronin, upon dissolution or disintegration of a coating, typically a coating encapsulating a core of the therapeutic agent. In preferred embodiments, the therapeutic agent is enterically coated. An "enterically coated" drug refers to a drug that is coated with a substance, i.e., with a coating that remains intact, or substantially intact, in the stomach but dissolves or disintegrates to release the therapeutic agent once the small intestine is reached. An "enteric coating" refers to a material, usually one or more polymeric materials, that encases a core region containing the therapeutic agent (e.g., encasing tiopronin) for use in the modified-release formulations described herein, where the material remains intact, or substantially intact, in the stomach and then dissolves or disintegrates to release the therapeutic agent in a prolonged and/or controlled manner, over an extended period of time, generally over several hours, preferably in repeated, critically-spaced pulses, as described above.

In particular embodiments, enteric coating materials are selected such that the therapeutic agent is not released until the composition reaches the small intestine, or a region in which the pH is greater than pH 4.5. A suitable pH-sensitive material is one which will dissolve in intestinal juices at a higher pH than that typically found in the upper portion of the gastrointestinal tract, like the stomach, such that disintegration or dissolution occurs in the small intestine. Preferably, the pH-sensitive material does not undergo significant disintegration or dissolution until the dosage form has emptied from the stomach, such as after passing the pyloric sphincter. For example, the extended-release coating material may begin to dissolve in an aqueous solution at pH between about 4.5 to about 5.5, permitting release of the therapeutic agent beyond the stomach and in regions of the beginning of the small intestine.

In preferred embodiments, the selected coating materials begin to dissolve within the pH range of the upper part of the small intestines, such as the duodenum, and then different polymeric materials sequentially disintegrate or dissolve over increasing pH, ranging from about 4.5 to about 7.2, allowing release of the therapeutic agent at increasing pH ranges corresponding to the increase in pH along the jejunum and towards the ileum. The amount and types of enteric coatings, e.g., different polymer coatings, are selected to substantially dissolve at increasing pH over the approximate three hour transit time through the small intestine.

Preferably, the enteric coatings are selected and arranged so as to release repeated, critically-spaced pulses over time, once past the stomach, e.g., according to any of the examples described in FIG. 3-FIG. 8, above. For example, any of the modified-release components described herein, or variations thereof, may further be designed for small intestine delivery of tiopronin, e.g., by enclosing the pill, tablet, capsule, etc. in an enteric coating, and/or by omitting stomach-dissolving or stomach-releasing elements of the modified-release components.

In some embodiments, e.g., the modified-release component of FIG. 3 excludes the outermost layer of tiopronin (304); the modified-release component of FIG. 4 excludes the first reservoir (403) released in the stomach upon dissolution of the relatively thin matrix segment (404) surrounding it; the modified-release component of FIG. 5 excludes the first set of uncoated beads (504); in the modified-release component of FIG. 6B, the first band of capsule (604) dissolves to release a first pulse of tiopronin (605) beyond the stomach; in the modified-release component of FIG. 7, the cap (704) comprises an enteric-coating to delay release of a first pulse (bolus) of tiopronin (705) beyond the stomach; and the modified-release component of FIG. 8B excludes the first packet (805) enclosed by a first coating (806) that first dissolves in the stomach.

For compositions comprising tiopronin, the extended-release coating may comprise a polymeric material that prevents release of the tiopronin in the low pH environment of the stomach, but that ionizes at a slightly higher pH, typically at a pH of about 4 or about 5, and thus dissolves or disintegrates sufficiently in the small intestines to begin releasing tiopronin. In some particular embodiments, the extended-release coating comprises one or more polyacids having a $pK_a$ in the range of about 3 to about 5. Particular examples of suitable materials for extended-release coatings include polymerized gelatin, shellac, methacrylic acid copolymer type C NF, cellulose butyrate phthalate, cellulose hydrogen phthalate, cellulose proprionate phthalate, polyvinyl acetate phthalate (PVAP), cellulose acetate phthalate (CAP), phthalic acid methylcellulose (CMP), hydroxypropyl methylcellulose phthalate, starch acetate (SAP), alginic acid and its calcium salt, pectin, and a calcium salt, cellulose acetate trimellitate (CAT), hydroxypropyl methylcellulose phthalate, hydroxypropyl methylcellulose acetate, dioxypropyl methylcellulose succinate, carboxymethyl ethylcellulose (CMEC), hydroxypropyl methylcellulose acetate succinate (HPMCAS), and acrylic acid polymers and copolymers, typically formed from methyl acrylate, ethyl acrylate, methyl methacrylate and/or ethyl methacrylate with copolymers of acrylic and methacrylic acid esters (Eudragit NE, Eudragit NM, Eudragit RL, Eudragit RS). For example, in one embodiment, the extended-release coating comprises Eudragit L30D, triethylcitrate, and hydroxypropylmethylcellulose (HPMC), and either the (+) or (−) enantiomer of tiopronin, and the coating comprises less than about 15% of the composition.

Topical Delivery

In one approach, the pharmaceutical composition is formulated for topical delivery, e.g., in transdermal or transmucosal formulations. Transdermal formulations or systems generally comprise a therapeutically effective amount of tiopronin for transdermal delivery and a pharmaceutically acceptable modified-release component that achieves pulsed release of the drug, in accordance with the present disclosures, through the skin upon topical application of the formulation. One of skill in the art will envision various topical formulation designs and/or arrangements that bring about the desired release schedule.

In some embodiments, the modified-release component of the transdermal delivery system comprises reservoirs of different sizes, and/or different permeabilities, to release tiopronin at step-wise, staggered times in repeated pulses in accordance with the invention. For example, the drug may be held in reservoirs of different sizes, with an impermeable backing on one side and a membrane on the opposite side that allows drug to cross, at different rates, to contact the skin.

Figure 9:
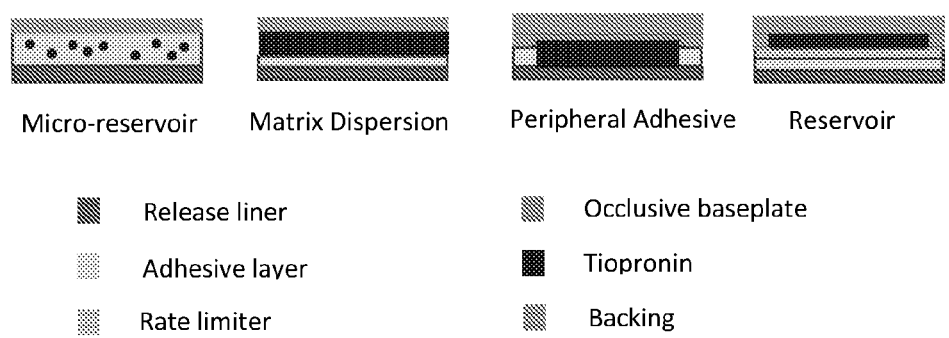
FIGS. 9A-9D depict representative transdermal delivery systems with modified-release components, including a system comprising micro-reservoirs (FIG. 9A), a matrix dispersion (FIG. 9B), a peripheral adhesive (FIG. 9C), and a single reservoir (FIG. 9D).

FIGS. 9A-9D depict particular examples of transdermal delivery systems with modified-release components, including a system comprising micro-reservoirs (FIG. 9A), a matrix dispersion (FIG. 9B), a peripheral adhesive (FIG. 9C), and a single reservoir (FIG. 9D). One of skill in the art will readily envision variations of these arrangements in view of the present teachings. For example, in some embodiments, two or more of these systems are combined to achieve, e.g., second, third, fourth, fifth, sixth, seventh, and/or eight pulses, released across the skin at critically-spaced intervals in accordance with the invention.

In a particularly preferred embodiment, the transdermal delivery system is provided in a skin patch (or dermal patch). The skin patch may comprise embedded drug along with one or more microneedles to aid delivery of tiopronin past the stratum corneum layer of the skin and into the dermis. Microneedle patches can deliver boluses of drug over time, using a mixed needle array. For example, the mixed needle array may comprise various microneedle types, some delivering drug immediately, some over an intermediate time, and some over a longer period of time, to release tiopronin at step-wise, staggered times in repeated pulses, in accordance with the invention.

Figure 10:
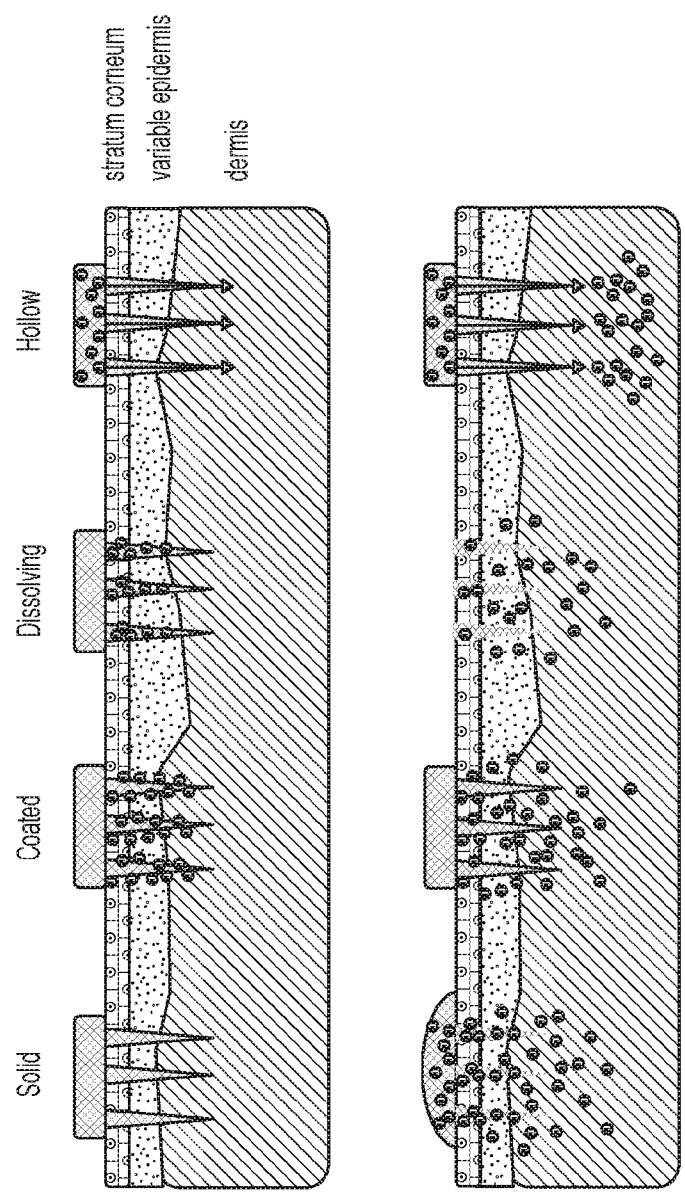
FIGS. 10A-10B depict additional representative transdermal delivery systems with modified-release components comprising microneedles, including systems with solid, coated, dissolving, or hollow microneedles.

FIGS. 10A-10B depict particular examples of transdermal delivery systems with modified-release components comprising microneedles, including systems with solid, coated, dissolving, or hollow microneedles. FIG. 10A depicts the systems before release; FIG. 10B depicts the systems during and after release of the drug. Where a solid microneedle is used, the microneedle creates holes in the top layers of skin into which drug is applied (as in a gel, cream, or lotion), increasing the permeability of skin and allowing the drug to penetrate. Where a coated microneedle is used, drug can be embedded on the exterior of microneedle array; once placed on the skin, drug migrates off the needle and into the skin. Where a dissolving microneedle is used, the needle may be made of various polymers, such as PLA, PGA, PLGA, PVP, and polycarbonate, which degrade over time, releasing embedded drug. Where a hollow microneedle is used, the drug is allowed to flow from a reservoir through the needle and through the skin. One of skill in the art will readily envision suitable variations of these arrangements in view of the present teachings. In a particular embodiment, the skin patch comprises differently-dissolving microneedles, where the different microneedles dissolve at step-wise, staggered times, to release tiopronin across the skin at critically-spaced intervals, in accordance with the invention.

Other transdermal approaches that may be used with the compositions and delivery systems disclosed herein include, e.g., thermal poration, hypodermic needles, iontophoresis, electroporation, ultrasound, sonophoresis, jet injection, or a combination thereof (Prausnitz et al. 2004, Nature Reviews Drug Discovery 3:115-124)). See also, WO 96/11705 and WO 89/04179, describing formulations containing plaster and the absorption promoter dimethylisosorbide.

The dermal patch may be applied to any suitable area of the subject's skin, such as but not limited to, the upper arm, axilla, shoulder, forearm, back of the head, chest, back, abdomen, buttocks, hip, thigh, behind the ear, and the like, or any combination thereof. Typically, the patch is applied to a clean, dry area of skin, more preferably to a hairless area.

In some embodiments, the pharmaceutical composition is formulated for buccal or sublingual delivery or delivery across other mucosal membranes. Buccal/Sublingual formulations or systems, for example, generally comprise a therapeutically effective amount of tiopronin for transmucosal delivery and a pharmaceutically-acceptable modified-release component that achieves pulsed release of the drug, in accordance with the present disclosures, through the oral mucosa upon application to a surface within the mouth cavity. One of skill in the art will envision various buccal formulation designs and/or arrangements the bring about the desired release schedule.

Preparation and use of compositions and delivery systems of the present invention are described in further detail in the sections below.

Preparation of Modified-Release Compositions and Systems

Another aspect of the present invention relates to methods of preparing the modified-release compositions and systems described herein. Generally, the modified-release formulations of the present invention are provided as pharmaceutical compositions, comprising the pharmaceutically-acceptable modified-release component, a suitable dose of the therapeutic, and a pharmaceutically acceptable carrier. The pharmaceutical compositions can be prepared by mixing the therapeutic agent, e.g., tiopronin, with one or more pharmaceutically acceptable carriers, such as pharmaceutically acceptable diluents, vehicles, or excipients.

In preferred embodiments, the modified-release formulations are for oral administration and the pharmaceutically acceptable carrier is a pharmaceutically acceptable diluent, vehicle, or excipient suitable for oral administration. In this context, the term "pharmaceutically acceptable carrier" refers to a material suitable for oral administration and not biologically, or otherwise, undesirable, i.e., a material that may be administered to a subject along with the therapeutic agent without causing undesirable biological effects, or undesirable side effects that outweigh the benefits of the therapeutic agent, and that does not interact in a deleterious manner with the therapeutic agent or with other components of the formulation or system in which it is contained.

For topical delivery, e.g., using transdermal or transmucosal formulations, the pharmaceutically acceptable carrier is a pharmaceutically acceptable diluent, vehicle, or excipient suitable for transdermal or transmucosal administration, i.e., a material that may be administered to the skin (or oral mucosa or other mucosal surface) of a subject along with the therapeutic agent without causing undesirable biological effects, or undesirable side effects that outweigh the benefits of the therapeutic agent.

A "pharmaceutically acceptable modified-release component," such as a "pharmaceutically acceptable coating" or a "pharmaceutically acceptable matrix," refers to a component comprising materials suitable for oral, transdermal, or buccal administration, or other suitable administration, that is not biologically, or otherwise, undesirable, i.e., a material that may be administered to a subject by the desired route, along with the therapeutic agent, without causing undesirable biological effects, or undesirable side effects that outweigh the benefits of the therapeutic agent, and that does not interact in a deleterious manner with the therapeutic agent or with other components of the formulation or system.

In pharmaceutical compositions, the therapeutic agent may be provided as a pharmaceutically acceptable salt, ester, or other derivative, comprising, for example, salts, esters, or other derivatives of the therapeutic agent that are not biologically or otherwise undesirable, or whose undesirable side effects do not outweigh the benefits of the therapeutic agent. For example, tiopronin may be administered in the form of a pharmacologically acceptable salt, ester, amide, prodrug, or analog, or as a combination thereof. Salts, esters, amides, prodrugs and analogs of the therapeutic agents may be prepared using standard procedures known to those skilled in the art of synthetic organic chemistry and described, for example, by J. March, "Advanced organic Chemistry: Reactions, Mechanisms and Structure," 4th Ed. (New York: Wiley-Interscience, 1992). For example, to prepare basic addition salts from the neutral drug, a reaction of one or more of the therapeutic agent's free hydroxyl groups can be reacted with a suitable base. The neutral form of the drug can be dissolved in a polar organic solvent, such as methanol or ethanol, and base then added. The resulting salt either precipitates or may be brought out of solution by adding a less polar solvent. Suitable bases for forming basic addition salts include, but are not limited to, inorganic bases such as ammonium hydroxide, calcium hydroxide, potassium hydroxide, sodium hydroxide, trimethylamine, and the like. Preparation of esters involves functionalization of hydroxyl groups present in the drug. Typically, esters are acyl-substituted derivatives of free alcohol groups, i.e., moieties which derived from carboxylic acids of the formula R—COOH where R is an alkyl, typically a lower alkyl. Esters can be reconverted to the free acids, if desired, by using conventional procedures, such as hydrogenolysis or hydrolysis. Preparation of amides and prodrugs can be carried out in a similar manner. Other derivatives and analogs of the therapeutic agents may be prepared using standard techniques known to those skilled in the art of synthetic organic chemistry, or may be deduced by reference to relevant literature.

Dosage Forms

The compositions of the present invention are formulated in various dosage forms, generally depending on the desired mode of administration. In preferred embodiments, the composition is formulated for oral administration and the dosage form is a tablet, pill, powder, troche, lozenge, minitable, or capsule, for example, a tablet or capsule providing a total therapeutically effective amount of tiopronin for pulsed release over an extended period of time, as described herein.

In some embodiments, tablets are manufactured by first coating the therapeutic agent, e.g., tiopronin. One method for forming tablets involves direct compression of powders containing a coated tiopronin, optionally in combination with diluents, binders, lubricants, disintegrants, colorants, stabilizers, and the like. As an alternative to direct compression, compressed tablets can be prepared using wet-granulation or dry-granulation processes. Tablets may also be molded rather than compressed, starting with a moist material containing a suitable water-soluble lubricant. Different coatings can be used for different layers of a given tablet or for different sets of tablets, e.g., to give one or more of the designs described herein, or variations thereof.

In some embodiments, a coated tiopronin is granulated and the granulation is compressed into a tablet or filled into a capsule. Capsule materials may be either hard or soft, and are typically sealed, such as with gelatin bands, or the like. In some embodiments, different coatings are used in different sets of beads for filling a given capsule, or for filling different sets of capsules; and/or the capsule material itself is composed of different segments, e.g., to give one or more of the designs described herein, or variations thereof.

Tablets and capsules for oral use will generally include one or more commonly used excipients. Nonlimiting examples of excipients include binders, bulking agents, diluents, disintegrants, lubricants, fillers, and the like, combined with the therapeutic agent (tiopronin) in the composition. Diluents are typically necessary to increase the bulk of the dosage form (e.g., a tablet or capsule) so that a practical size is provided for compression. Suitable diluents include dicalcium phosphate, calcium sulfate, lactose, cellulose, kaolin, mannitol, avicel, sodium chloride, dry starch, and powdered sugar. Some embodiments use Neusilin® as an excipient. Neusilin® is a magnesium aluminummetasilicate, which improves tabletting low molecular drugs. Neusilin® can be used in direct compression and wet granulation in formulating solid dosage forms, e.g., in tablets, powders, granules, and/or capsules. In a particular embodiment, Neusilin® helps to neutralize unpleasant odors that may be caused by tiopronin thiol groups.

In some embodiments, oral dosage forms also include binders, fillers, and/or lubricants. Binders can be included to impart cohesive qualities to a tablet formulation, helping the tablet remain intact after compression. Nonlimiting examples of materials suitable for use as binders include starch (including corn starch and pregelatinized starch), gelatin, sugars (including sucrose, glucose, dextrose and lactose), polyethylene glycol (e.g., PEG400), waxes, and natural and synthetic gums, e.g., acacia sodium alginate, polyvinylpyrrolidone, cellulosic polymers (including hydroxypropyl cellulose, hydroxypropyl methylcellulose, methyl cellulose, hydroxyethyl cellulose, and the like), and Veegum. In some embodiments, fillers are used that may be insoluble materials, such as silicon dioxide, titanium oxide, alumina, talc, kaolin, powdered cellulose, microcrystalline cellulose, and the like. Additionally or in the alternative, soluble fillers may be used, such as mannitol, urea, sucrose, lactose, dextrose, sodium chloride, sorbitol, and the like. In some embodiments, lubricants are used to facilitate tablet manufacture. Nonlimiting examples of materials suitable for use as lubricants include magnesium stearate, calcium stearate, stearic acid, and the like. Lubricant materials generally make up less than about 1% by weight of the final dosage form (e.g., of the final tablet).

In some embodiments, dosage forms for oral administration In preferred embodiments, dosage forms for oral administration include one or more disintegrants, that facilitate disintegration or "breakup" of the tablet or capsule after administration, more preferably during transit along the small intestines, as described herein. Nonlimiting examples of materials suitable for use as disintegrants include starches, clays, celluloses, algins, gums, cross-linked polymers, and the like.

Dosage forms for oral administration also may contain minor amounts of non-toxic auxiliary substances, such as wetting or emulsifying agents, pH buffering agents, and the like. Nonlimiting examples include sodium acetate, sorbitan monolaurate, triethanolamine sodium acetate, and triethanolamine oleate. In some embodiments, flavoring, coloring, and/or sweetening agents may be added as well. In some embodiments, the oral formulation may further comprise one or more preservatives, suspending agents, thickening agents, and the like.

In some embodiments, the pharmaceutical composition for modified release of tiopronin is stabilized. The composition may be stabilized by including one or more stabilizing agents in an oral formulation. "Stabilizing agents" refer to compounds that lower the rate at which the tiopronin degrades, particularly for oral dosage forms under typical conditions of storage. Nonlimiting examples of materials suitable for use as stabilizing agents include hydroxypropyl methylcellulose; polyvinylpyrrolidone; cellulosic polymers such as hydroxypropyl cellulose, hydroxyethyl cellulose, methyl cellulose, ethyl cellulose, cellulose acetate, cellulose acetate phthalate, cellulose acetate trimellitate, hydroxypropyl methylcellulose phthalate, microcrystalline cellulose, and carboxymethylcellulose sodium; vinyl polymers and copolymers, such as polyvinyl acetate, polyvinylacetate phthalate, vinylacetate crotonic acid copolymer, and ethylene-vinyl acetate copolymers; and the like. See also, U.S. Pat. No. 4,301,146. The stabilizing agent generally is present in an amount effective to provide the desired stabilizing effect. The stabilizing agent may be present in a ratio of tiopronin to stabilizing agent of at least about 1:500 w/w, about 1:400 w/w, about 1:200 w/w, or about 1:100 w/w. In some embodiments, the stabilizer is an antioxidant, e.g., oil-soluble antioxidants (e.g., butylated cresol, butylated hydroxytoluene, vitamin E, and the like); water-soluble antioxidants (e.g., methionine, sodium bisulfite, meta-bisulfite, sodium metabisulfite, sodium sulfite, sodium thiosulfate, thiourea, vitamin C, and the like); tert-butyl-hydroxy anisole, and the like.

In some embodiments, the tiopronin component further comprises one or more penetration enhancers, e.g., penetration enhancers designed to facilitate uptake at a particular region of the gastrointestinal tract. Examples of additional ingredients include plasticizers such as triethyl citrate, acetyltrietylcitrate, diethyl sebacate, dibutyl sebacate; polymers such as carbomer, chitosan, chitosan cysteine, sodium carboxymethyl cellulose, N-trimethylated chitosan, polycarbophil-cysteine, long chain fatty acids, their esters (for example, mono and diglycerides) and their salts such as lauric acid, sodium lauryl sulfate, palmitic acid, caprylic acid, capric acid, oleic acid, acylcamitine; chelating agents such as metal chelating agents, disodium edetate, citric acid, tartaric acid, EDTA, salicylates, cyclodextrins, polyacrylic acids; bile acids such as cholic acid, cholyltaurine, cholylsarcosine, chenodeoxycholic acid and its salts such as sodium cholate, sodium glycocholate, sodium taurocholate, sodium taurodihydrofusidate; surfactants and emulsifiers such as in particular polyethylene 660-12-hydroxy-stearate (Solutol® HS15) (Solutol HS15), polysorbate 80 (Tween 80), polyoxyethylated castor oil (Cremophor EL) Polyoxyethylene-polyoxypropylene glycol (Pluronic® F68), zonula occludens toxin, the toxin (ZOT); vitamins, such as vitamin E (tocopherol), vitamin B12, and the like or any combination thereof.

In some embodiments, the formulations of the present invention do not comprise tiopronin that is covalently attached to the polymer materials used to effect modified release. For example, in some embodiments, the formulations of the present invention do not comprise polyanhydride compositions described in U.S. Pat. No. 6,613,807, to Uhrich.

Some embodiments use minitablets as the dosage form. A "minitablet" is a compressed tablet that typically has a diameter of about 1-4 mm. In a particular embodiment, the minitablet is formulated to contain an appropriate dose per weight of patients in a capsule, providing patient-centric dosage forms, which may further encourage patient compliance. For example, minitablets are particularly useful for pediatric and veterinary uses. In some embodiments, the compositions are provided in the form of pharmaceutically acceptable nanoparticles, nanospheres, and nanoformulations (see, e.g., Delie et al, 2015, *Molecule*, 10:65-80). In some embodiments, the compositions are provided in the form of microparticulates, e.g., microparticulates ranging from about 10 µm to about 2 mm (e.g., described in US 2010/0310541 to Kessler et al, entitled "Compositions and Methods for Reducing the Toxicity of Certain Toxins, e.g., ¶¶ [0100]].

In some embodiments, the composition is formulated for topical administration and may be provided as a cream, ointment, lotion, gel, paste, spray, powder, suppositories, emulsions, aerosols, or any other form typically used for topical or transmucosal application. In a particular embodiment, the composition is provided as a gel with a therapeutically effective concentration of tiopronin for pulsed release over an extended period of time, as described herein, upon application to the skin or a mucosal surface.

The formulation for topical application may contain one or more materials typically used in dermatological formulations. For example, in some embodiments, the topical formulation includes one or more permeability enhancers, such as but not limited to, azone (1-dodecylazacycloheptan-2-one) and SEPA (2-n-nonyl-1,3dioxolane). In some embodiments, the topical formulation comprises a solvent or co-solvent, with or without a penetration enhancer, and/or with an emollient, spreading agent, and/or film-forming agent. Emollients, spreading agents, and/or film-forming agents for use in topical formulations include, but are not limited to, polyvinylpyrrolidone, polyvinyl alcohols, copolymers of vinyl acetate and vinylpyrrolidone, polyethylene glycols, benzyl alcohol, mannitol, glycerol, sorbitol, polyoxyethylenated sorbitan esters; lecithin, sodium carboxymethylcellulose, silicone oils, polydiorganosiloxane oils. Other ingredients may include anionic surfactants, like sodium, potassium, or ammonium stearates, calcium stearate, triethanolamine stearate, sodium abietate, alkyl sulphates, sodium dodecylbenzenesulphonate, sodium dioctylsulphosuccinate; cationic surfactants, such as water-soluble quaternary ammonium salts or cetyltrimethylammonium bromide; amine salts such as octadecylamine hydrochloride; nonionic surfactants like sorbitan esters, which are optionally polyoxyethylenated (e.g. polysorbate 80), polyoxyethylenated alkyl ethers, polyoxypropylated fatty alcohols such as polyoxypropylene-styrol ether, polyethylene glycol stearate, polyoxyethylenated derivatives of castor oil, polyglycerol esters, polyoxyethylenated fatty alcohols, polyoxyethylenated fatty acids, copolymers of ethylene oxide and propylene oxide; amphoteric surfactants; and the like, or any combination thereof.

Organic solvents that can be used include but are not limited to: acetyltributyl citrate, fatty acid esters like dimethyl ester, diisobutyl adipate, acetone, acetonitrile, benzyl alcohol, butyl diglycol, dimethylacetamide, dimethylformamide, dipropylene glycol n-butyl ether, ethanol, isopropanol, methanol, ethylene glycol monoethyl ether, ethylene glycol monomethyl ether, monomethylacetamide, dipropylene glycol monomethyl ether, liquid polyoxyethylene glycols, propylene glycol, 2-pyrrolidone (e.g. N-methylpyrrolidone), diethylene glycol monoethyl ether, ethylene glycol, diethyl phthalate, and the like, or any combination thereof.

Delivery Systems

Delivery systems of the invention further provide the pharmaceutical compositions incorporated within structures or devices that effect release at step-wise, staggered times to release repeated pulses of the therapeutic over time, in accordance with the invention. For example, an oral formulation may be incorporated in a delivery system comprising matrixes, beads, liposomes, vesicles, microcapsules, microspheres, solid particulate materials, microfluidic devices, microprocessors, and the like, as described herein. For example, in some embodiments, a layered tablet structure is used that can release the drug over time, in a step-wise fashion, as described herein. In some embodiments, microbeads of tiopronin are coated and the coated beads contained within a capsule, for release over time in a step-wise fashion, e.g., as described herein. In some embodiments, the drug is embedded in a waxy matrix, which releases the drug over time in a step-wise fashion, e.g., again as described herein, and the matrix subsequently is excreted in the patient's feces. One of skill in the art will readily be able to construct such delivery systems based on technology in the art and the disclosures herein.

A topical formulation may be incorporated in a delivery system suitable for application to the skin or mucosal surface, such as a delivery system comprising reservoirs, matrices, microneedles, materials typically used in skin patches, and the like. One of skill in the art will readily be able to construct such delivery systems based on technology in the art and the disclosures herein.

For example, in some embodiments, a patch is designed to contain a tiopronin-containing pharmaceutical composition in a compartment, where the tiopronin is suspended or dissolved in solvent to form a liquid or a gel to give a liquid or gel reservoir. The liquid or gel reservoir may be separated from a continuous adhesive layer by a permeable membrane that controls the release of tiopronin from the device. In some embodiments, the tiopronin is incorporated into the adhesive backing of the patch without a distinct drug-containing reservoir. In some embodiments, various patch designs are used, including but not limited to, matrix patches, patches with active delivery systems, microneedle patches with cutaneous solutions, metered-dose systems, and the like, or any combination thereof (see, e.g., Pastore, et al., 2015, "Review—Transdermal patches: history, development and pharmacology," *British J. of Pharmacol* 172: 2179-2209).

Manufacture of a given skin patch largely is determined by the type of patch. Reservoir patches generally are produced by aa form-filling and sealing process or a coating-drying process (see, e.g., U.S. Pat. No. 3,797,494, to Zaffaroni, entitled "Bandage For The Administration Of Drug By Controlled Metering Through Microporous Materials;" and U.S. Pat. No. 4,460,372, to Campbell et al., entitled "Percutaneous absorption enhancer dispenser for use in coadministering drug and percutaneous absorption enhancer").

In some embodiments, a microneedle array is used to effect transdermal delivery, generally in combination with a skin patch. In some embodiments, a microneedle array is used to puncture the skin, and then removed and replaced with a drug-containing patch. In some embodiments, the microneedle is coated with a solution, suspension, or gel comprising tiopronin and left in place for a period of time. In some embodiments, the microneedle array left in place comprises hollow-bore microneedles, through which a tiopronin-containing composition is allowed to diffuse or is driven by pressure through a central lumen.

Microneedle arrays may be manufactured by, e.g., lithography and etching, hot melts, micromolding, and the like. In some embodiments, micromolding of metals is used, such as but not limited to, silicon, stainless steel, titanium, palladium, palladium-cobalt alloys, nickel, and the like, and combinations thereof. In some embodiments, ceramic slurries are used, e.g., by being cast into a micromold. Biocompatible ceramics may comprise one or more of alumina, gypsum, brushite, and/or other materials currently used as bone cements. In some embodiments, biopolymers are used to form a matrix with tiopronin for casting into a micromold. Biopolymers include, but are not limited to, carboxymethylcellulose, amylopectin, dextrin, hydroxypropyl cellulose, alginate, hyaluronic acid, and the like, or a combination thereof.

Differently-dissolving and/or differently-biodegrading microneedles may be manufactured for use in certain embodiments of the invention. For example, in a preferred embodiment, an array of differently-biodegrading microneedles is constructed, where different sets of microneedles comprise different materials that biodegrade in skin layers, at step-wise, staggered times, to release repeated pulses of tiopronin over time. In a particularly preferred embodiment, an array of differently-dissolving microneedles is constructed, where different sets of microneedles comprise different polymer make-ups that dissolve at step-wise, staggered times, to release repeated pulses of tiopronin over time. Biodegradable and/or polymeric microneedle arrays can be made by preparing slurries or hot melts of tiopronin and carbohydrates, which then can be cast into a micromold. Carbohydrates for use in slurries or hot melts with tiopronin, e.g., for biodegradable microneedles, include, but are not limited to, maltose, trehalose, sucrose, mannitol, xylitol, galactose, and the like, or combinations thereof. Polymers for use in slurries or hot melts with tiopronin, e.g., for dissolving microneedles, include, but are not limited to, poly(methyl methacrylate) (PMMA) polylactic acid, poly(carbonate), cyclic-olefin copolymer, poly(vinylpyrrolidone) (PVP), poly(vinylalcohol) PVA, polystyrene (PS) [97], poly(methyl vinyl ether-co-maleic anhydride), poly(methyl vinyl ether-co-maleic acid), and the like, or combinations thereof. See also, e.g., Larraneta, et al., 2016, "Review—Microneedle arrays as transdermal and interadermal drug delivery systems: Materials science, manufacture and commercial development," *Materials Sci. and Eng. R* 104: 1-32.

Use of the modified-release pharmaceutical compositions, delivery systems, and dosage forms of the present invention is described in the sections below.

Methods and Uses of Modified-Release Compositions and Systems

Still another aspect of the present invention relates to methods of using the modified-release compositions and systems described herein for delivering an effective amount of a therapeutic agent (tiopronin) to achieve an extended duration of effect following administration to a subject in need thereof. In particular, the present extended-release compositions find use in treating cystinuria, a disorder related thereto, or a symptom thereof.

The "subject" referred to herein means a mammalian subject, including a human patient and mammals typically kept as pets, such as dogs, cats, hamsters, rabbits, mice, and the like. In particular, the subject will be a human patient or a dog, such as a pet dog with cystinuria. In preferred embodiments, the dog is a breed of dog known to affected by cystinuria, e.g., Bulldogs, Newfoundlands, and Labrador Retrievers. The mammalian subject also may be an animal typically farmed, such as cows, horses, goats, sheep, pigs, and the like.

As discussed above, cystinuria patients accumulate cysteine and other amino acids in their urine, leading in the case of cysteine to formation and precipitation of cystine and painful cystine stones. Cystinuria patients face a life-long risk of stone formation, as well as impaired renal function and repeated surgeries, and require life-long treatment (Andreassen et al., 2016, "How should patients with cystine stone disease be evaluated and treated in the twenty first century?," *Urolithiasis,* 44:65-76). Current tiopronin medications fail 85% of cystinuria patients, who continue forming stones, largely due to short duration of efficacy and uncontrolled, rising cystine levels in the urine overnight.

Delivery approaches of the present invention provide a strategy for improving pharmacokinetics of tiopronin to achieve higher efficacy, longer duration, and less adverse effects, using fewer administrations and/or lower total daily dosing. The modified-release tiopronin compositions and systems described herein can surprisingly provide clinically-superior treatment compared to immediate-release (or delayed-release) versions of the drug. In particular, dosage compliance is critical to efficacy in rare diseases, where patients require life-long treatment. In preferred embodiments, the modified-release formulations of the present invention allow less frequent dosing, encouraging compliance. Additionally, whereas immediate release formulations fail to address cystine accumulation overnight, formulations described herein can allow better and more consistent cystine stone control. The present modified-release approaches thus can decrease, and preferably prevent, cystine stone formation, improving overall quality of life of cystinuria patients.

In particular embodiments, the present modified-release compositions deliver tiopronin over an extended period of time in repeated, critically-spaced pulses, which dramatically reduces peak plasma concentrations while achieving higher and more consistent urine concentrations of the drug, which in turn reduces urinary cystine concentrations and consequent stone formation. The reduction in peak plasma concentrations can be statistically significant compared to immediate-release (or delayed-release) versions. The tiopronin delivery methods provided herein thus can surprisingly maintain consistent, predictable low urinary cystine concentrations, effectively reducing or preventing formation of cystine crystals that otherwise serve as seeds for cystine stones.

As discussed above, the modified-release compositions and systems comprise a modified-release component that releases the drug in repeated pulses over time, where a first faction is released at a first time point and a second fraction is released at a second time point about two to about six hours after the first time point after an interval that surprisingly gives higher tiopronin recovery in the urine, compared to longer or shorter intervals. With regard to compositions comprising tiopronin, this release strategy surprisingly leads to increased amounts of the drug in the urine, as well as increased urinary excretion of the drug, compared to immediate-release (or delayed-release) formulations. Higher, and more consistently high, tiopronin urinary concentrations result in improved therapeutic efficacy, by more consistently and effectively controlling urinary cystine concentration, as well as reduced side effects.

In some embodiments, the compositions comprise a coating that begins to disintegrate or dissolve after passage of the composition through the stomach, and continues to disintegrate or dissolve as it travels along the small intestine, moving along the duodenum, followed by the jejunum, and eventually the ileum. The continued disintegration or dissolution of the coating releases the therapeutic, e.g., tiopronin, in repeated small amounts, preferably in critically-spaced pulses over time, as described herein. In a particular example, the coating releases a first amount of the therapeutic, e.g., tiopronin, when the composition passes the stomach. In preferred embodiments, the coating releases a second amount of the therapeutic, e.g., tiopronin, as the composition travels along the duodenum. In more preferred embodiments, the coating releases a third amount of the therapeutic agent, e.g., tiopronin, as the composition travels along the jejunum. In this simple example, it can be seen that the total amount of therapeutic, e.g., tiopronin, is released as fractions of the total amount present in the composition, at different time points, throughout the passage of the composition through the small intestine. With regard to compositions comprising tiopronin, small intestine uptake, of smaller doses at a time, surprisingly leads to increased amounts of the drug in the urine, as well as increased urinary excretion of the drug, compared to immediate-release (or delayed-release) formulations. Higher, and more consistently high, tiopronin urinary concentrations result in improved therapeutic efficacy, by more consistently and effectively controlling urinary cystine concentration.

It will be understood by the skilled artisan, based on the above disclosures, that modified-release approaches of the present invention also provide a strategy for improving efficacy and reducing side effects in other disorders, where low peak plasma levels, high urine levels, and/or high urine excretion of the drug are desirable. A disorder sharing pharmacokinetic characteristics of cystinuria, as described herein, and benefitting from similar extended-release approaches, is referred to as a "cystinuria-related disorder," "disorder relating to cystinuria," or a "disorder relating thereto," e.g., where high urine excretion and/or low blood levels of a therapeutic agent result in improved efficacy and/or reduced toxicity. Examples of cystinuria-related disorders are other metabolic disorders of the liver and/or kidneys, where at least one physiological symptom of the disorder is reduced, delayed, or ameliorated by a thiol-binding chelating agent, such as tiopronin, and/or where thiol reduction is beneficial. Other examples of cystinuria-related disorders may include disorders where is it desirable to remove a metabolite or other substance, such as a different amino acid, present in the blood through urinary excretion to reduce or correct excess accumulation of the metabolite or substance from the blood.

In some embodiments, the invention provides methods of administering tiopronin to achieve an extended duration therapeutic effect in a subject with cystinuria, a disorder relating thereto, or a symptom thereof. The mode of administration used may be enteral or paraenteral; or may be oral, topical, transdermal, intradermal, intramuscular, intraperitoneal, transmucosal, sublingual, buccal, rectal, intravaginal, intranasal, subcutaneous, intravenous, by inhalation, and the like, or any combination thereof. Preferably, oral administration is used; in some embodiments, topical administration is used, such as by applying the composition or system to the skin, buccal mucosa, or other mucosal surface.

The methods generally comprise administering to the subject a composition comprising a modified-release component and tiopronin in a first treatment dose, where dosing is repeated in critically-spaced pulses to provide a total daily dose of 1,200 mg or less (or an average total daily dose of 1,200 mg or less), such as about 1,000 mg or less, about 800 mg or less, about 600 mg or less, about 500 mg or less, about 400 mg or less, about 300 mg or less, or about 200 mg, as the total daily dose (or average total daily dose); and where the first treatment dose achieves the extended duration therapeutic effect having at least about an 8-hour duration of effect, such as at least about 10 hours, at least about 12 hours, at least about 14, hours, at least about 18, hours, at least about 20 hours, or about 24 hours duration of effect, or longer, preferably before a second or subsequent treatment dose is administered. In some embodiments, the subject is administered a composition comprising a modified-release component and tiopronin in a first treatment dose, where dosing is repeated in critically-spaced pulses to provide a total daily dose of 40 mg/kg/day or less (or an average total daily dose of 40 mg/kg/day or less), such as about 35 mg/kg/day or less, about 30 mg/kg/day or less, about 25 mg/kg/day or less, about 20 mg/kg/day or less, about 15 mg/kg/day or less, about 12 mg/kg/day or less, about 10 mg/kg/day or less, about 8 mg/kg/day or less, or about 6 mg/kg/day or less, as the total daily dose (or average total daily dose); and where the first treatment dose achieves the extended duration therapeutic effect having at least about an 8-hour duration of effect, such as at least about 10 hours, at least about 12 hours, at least about 14, hours, at least about 18, hours, at least about 20 hours, or about 24 hours duration of effect, or longer, preferably before a second or subsequent treatment dose is administered. Generally, the therapeutic effect lasts up to about 10 hours, up to about 12 hours, up to about 14 hours, up to about 16 hours, up to about 18 hours, up to about 20 hours, up to about 22 hours, up to about 24 hours, up to about 30 hours, up to about 36 hours, up to about 40 hours, or up to about 48 hours.

Generally, the therapeutic effect is a reduction in the cystine concentration in the urine or kidneys, compared to that before treatment. In particular embodiments, the therapeutic effect is a urinary cystine concentration below about 250 mg/L or a urinary cystine concentration effectively below about 250 mg/L. Achieving urinary cystine concentration "effectively below" a certain threshold means maintaining a urinary cystine concentration almost continuously below this threshold, even if there are intermittent and/or brief peaks above the threshold, where such peaks are generally not high and/or not long enough to result in stone formation to the same extent as if an immediate-release tiopronin formulation were used. In some embodiments, the therapeutic effect is a urinary tiopronin recovery above about 30% of the total dose administered, preferably above about 40%, more preferably above about 50%, or still more preferably about 60% of the total dose administered.

In preferred embodiments, following administration of a first treatment dose of the modified-release composition or delivery system, the therapeutic effect lasts for a period of several hours. For example, the therapeutic effect may last for at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, at least about 15 hours, at least about 16 hours, at least about 17 hours, at least about 18 hours, at least about 19 hours, at least about 20 hours, at least about 22 hours, or about 24 hours or longer. In a particular embodiment, the modified-release formulation provides about 12 hours of controlled release, providing repeated, critically-spaced release of smaller amounts of the total tiopronin, at specified time points, during the extended period. Accordingly, in such preferred embodiments, a single treatment affords longer duration, thus allowing a dosing schedule with longer periods between administrations, and fewer doses per day that require action on the part of the subject.

In particularly preferred embodiments, an evening dose of the modified-release composition or delivery system provides therapeutic effects through all or most of the night, typically when the patient sleeps, maintaining higher, and consistently higher, levels of tiopronin in urine, which in turn maintains lower and, importantly, consistently lower, cystine levels in the urine, when compared to non-coated tiopronin (such as Thiola®). As discussed above, the therapeutic action of Thiola® diminishes significantly 2-4 hours after administration, leaving the patient unprotected for most of the night when urinary cystine levels rise and the seeds of cystine stones form. Modified-release compositions and systems of the invention, in preferred embodiments, thus provide better control of cystine stone formation, resulting in fewer and/or less frequent and/or smaller cystine stones compared to those experienced by cystinuria patients taking a non-coated tiopronin (such as Thiola®). For example, patients forming at least one stone per week, while taking non-coated tiopronin, may experience a reduction to no more than one stone per month, one stone in six months, one stone per year, one stone in five years, or no more than one stone in ten years, using a modified-release composition or system of the present invention. As another example, patients forming several stones per week, while taking non-coated tiopronin, may experience a reduction to no more than 2-3 stones a week, one stone a week, one stone per month, one stone a year, or no more than one stone in five years, using an modified-release composition or system of the present invention.

A dosing schedule, as described herein, refers to frequency of administering or applying the pharmaceutical composition or delivery system, and generally requires some action, or conscious action, on the part of the subject. Actions may include, for example, swallowing a modified-release tablet, applying a modified-release skin patch to an appropriate part of the body, or placing a modified-release wafer to the inside of the cheek. Administration or application requiring such conscious action is generally distinguished from release of the drug that occurs following such administration/application, such as the repeated, critically-spaced pulses released by the modified-release components described herein (and which do not require a conscious action on the part of the subject).

In preferred embodiments, the modified-release composition or system is administered/applied no more than twice a day. Generally, twice a day administration/application will involve dosing once in the morning, e.g., to protect against high urinary cystine during the day; and once in the evening, e.g., to protect against high urinary cystine during the night. In a particular embodiment, the modified-release composition or system is administered/applied twice a day. In more preferred embodiments, the modified-release composition or system is administered/applied once a day. Thus, the present delivery methods achieve less frequent dosing that requires any conscious action on the part to the subject, such as dosing 1 or 2 times/day versus 3 or more times/day, as in the case of current tiopronin medications. In other embodiments, the modified-release composition or system is administered/applied three or four times a day, preferably less than four times a day, but at lower individual and/or lower total daily doses compared to current treatments.

Modified-release compositions or systems of the invention are administered/applied so as to deliver an effective amount of a therapeutic agent, e.g., a therapeutically effective amount of tiopronin. A "therapeutically effective amount" or an "effective amount" of tiopronin refers to a dose of tiopronin that brings about at least one therapeutic, desired, or positive benefit, such as reducing, alleviating, decreasing, diminishing, ameliorating, or curing at least one symptom of cystinuria or a disorder related thereto in a subject in need thereof. The term therapeutically effective amount also implies a safe amount, i.e. one low enough to avoid serious adverse effects or to avoid adverse effects that are not outweighed by therapeutic benefit achieved. In particular embodiments, therapeutic effects include lowered urinary cystine concentrations and reduction, preferably elimination and/or prevention, of cystine stone formation, such as reducing stone formation from at least one stone per week to no more than one stone per month, one stone in six months, one stone per year, one stone in five years, or no more than one stone in ten years; or reducing stone formation from several stones per week to no more than 2-3 stones a week, one stone a week, one stone per month, one stone a year, or no more than one stone in five years, as described above. One or more other symptoms of cystinuria or a disorder related thereto include, e.g., blood in the urine, severe pain in the side or the back, nausea, vomiting, and/or pain near the groin, pelvis, or abdomen.

The modified-release compositions or systems of the invention generally contain an appropriately effective amount of tiopronin to provide a treatment dose in a single administration/application of a dosage form. Alternatively, the modified-release compositions or systems can provide a half, a third, or a quarter of the single treatment dose, e.g., so that 2, 3, or 4 tablets or capsules are taken at a given time.

Exact effective amounts may vary from subject to subject, depending on the age, weight, and general condition of the subject, severity of the condition being treated, treatment history, and the like. An important factor determining the specific tiopronin dose is the untreated (baseline) urinary cystine concentrations in a given patient. For example, consider patient A, having an untreated urinary cystine concentration of 400 mg/L and needing X mg/L of tiopronin in the urine to keep cystine levels at 250 mg/L or less. Patient B, having untreated urinary cystine concentrations of 1,200 mg/L would need 3X mg/L of tiopronin in urine to keep cystine levels at 250 mg/L or less. A suitable effective amount for an individual may be determined by techniques known in the art and/or described herein, e.g., measuring urinary cystine concentrations, such as measuring urinary cystine concentrations over a 24 hour period and using the urinary concentration of free cystine to adjust the dose. One approach calculates total urinary excretion of cystine as the sum of free cystine and the amount of cystine of the tiopronin-cysteine mixed disulfide (see, e.g., Lindell et al., 1995, "Urinary Excretion of Free Cystine and the Tiopronin-Cysteine-Mixed Disulfide During Long-Term Tiopronin Treatment of Cystinuria," Nephron, 71:328-342). Another method for measuring urinary cystine involves "cystine capacity" (https://www.ncbi.nlm.nih.gov/pubmed/15865542). Other approaches measure urinary tiopronin using HPLC based on post-column reaction with dithionitrobenzene (DTNB) (see, e.g., Matsuura et al., 1999, "Pharmacokinetics of Tiopronin after Oral Administration in Healthy Volunteers," Pharm. Pharmacol. Commun., 5:345-347). Blood levels of tiopronin also can be measured, e.g., using specific and sensitive gas chromatography-mass spectrometry (Matsuura et al., 1993, "Gas chromatographic-mass spectrometric determination of tiopronin in human blood using acrylic acid esters as a derivatization reagent for the thiol group," J. Chromatogr, 616:229-234). Doses also may be considered in terms of mg tiopronin/kg or mg tiopronin/$m^2$, considering respectively the body weight or body surface area of the patient. Similar dosing considerations, as described above, apply to dogs, or other mammals, suffering from cystinuria.

In preferred embodiments, use of the modified-release composition or system improves efficacy and reduces the total daily dose of tiopronin compared to the average prescribed daily dose of tiopronin in Thiola®. That is, the present approaches may achieve efficacy using a lower total daily dose than that used in current treatments, e.g., an average total daily dose lower than about 1,200 mg tiopronin/day, or lower than about 15 mg/kg/day. In more preferred embodiments, use of the modified-release composition or system reduces toxicity and decreases severity and/or incidence of adverse side effects compared to those typically experienced by patients taking Thiola®.

As discussed above, repeated, critically-spaced release of smaller doses, over an extended period of time, decreases peak blood levels and increases urinary concentrations and urine excretion of the drug, as well as altering its distribution, preferably to statistically significant extents and/or surprising extents compared to immediate-release (or delayed-release) versions. Decreased blood levels and distribution in turn reduce adverse side effects of the drug. Also as discussed above, pulsed delivery according to the invention improves absorption and bioavailability compared to use of only immediate-release formulations. Moreover, increased urinary excretion provides higher concentrations of tiopronin in urine, where it acts to reduce cystine levels, allowing for use of a lower total daily dose. Indeed, urine excretion of the mixed tiopronin-cysteine disulfide, as well as of total cystine, has been found to be higher using certain lower doses of tiopronin (see, e.g., Lindell et al., 1995, "Urinary Excretion of Free Cystine and the Tiopronin-Cysteine-Mixed Disulfide During Long-Term Tiopronin Treatment of Cystinuria," *Nephron,* 71(3):328-342), showing that tiopronin interferes with cystine metabolism in a more complex way than through a simple disulfide exchange reaction with urinary cystine. For example, tiopronin urine excretion may be lower using higher doses and/or on obtaining higher blood plasma levels of the drug. The present invention provides a surprising critical range for interval lengths between consecutive pulses of the drug, that unexpectedly maintains higher and more consistently higher urinary tiopronin concentrations, compared with intervals longer or shorter than those within the critical range. The modified-release strategies of the present invention thus allow use of lower doses, surprisingly increasing tiopronin efficacy. Lower doses further reduce adverse side effects, as well as improving patient compliance and quality of life.

In particular embodiments, the total daily dose used is less than about 1,200 mg/day or less than about 15 mg/kg/day. For example, one dosing schedule comprises treatment doses of about 500 mg each, or about 6 mg/kg each, administered or applied twice a day. In another example, the dosing schedule comprises doses of about 400 mg each, or about 5 mg/kg each, administered or applied twice a day; in another example, the dosing schedule comprises doses of about 300 mg each, or about 4 mg/kg each, administered or applied twice a day. In a preferred embodiment, the dosing schedule comprises a single administration or application a day of a treatment dose of about 1,200 mg, about 1,000 mg, about 800 mg, or about 600 mg; or of about 15 mg/kg/day, about 12 mg/kg/day, about 10 mg/kg/day, or about 8 mg/kg/day. In various embodiments, the total daily dose may range from about 500 mg to about 1,200 mg, with individual doses ranging from about 250 mg to about 600 mg, for twice daily dosing, or from about 500 mg to about 1,200 mg for once daily dosing. In various embodiments, In some embodiments, the total daily dose may range from about 6 mg/kg/day to about 15 mg/kg/day, with individual doses ranging from about 3 mg/kg to about 7.5 mg/kg for twice daily dosing, or from about 6 mg/kg to about 15 mg/kg for once daily dosing.

Oral dosage forms generally comprise as a tablet or capsule of a tiopronin providing about 100 mg-1,000 mg tiopronin. Depending on the unit dosage of a given dosage form, the appropriate number of tablets can be taken to provide effective doses according to the dosing schedule being followed. In some embodiments, the delivery methods of the present invention allow lower doses compared to those required when using an immediate-release formula, such as Thiola®. For example, the daily dose, or average daily dose, for a given patient may be reduced by at least about 80%, at least about 70%, at least about 60%, at least about 50%, at least about 40%, at least about 30%, or at least about 20% of the dose administered when using an immediate-release formula. In some embodiments, the daily dose, or average daily dose, for a given patient is reduced by about 80%, about 70%, about 60%, about 50%, about 40%, about 30%, or about 20% of the dose administered when using an immediate-release formula.

In some embodiments, the delivery methods of the present invention achieve lower peak blood levels of tiopronin compared to immediate-release (or delayed-release) formulations, such as achieving peak blood levels of no more than about 10 µmol/L, preferably no more than about 5 µmon. For example, in some embodiments, the delivery methods achieve total tiopronin peak blood levels of less than about 20,000 ng/mL, less than about 15,000 ng/mL, less than about 13,000 ng/mL, or less than about 12,000 ng/mL. Preferably, in some embodiments the delivery methods achieve a total tiopronin peak blood level of a value between about 5,000 and about 20,000 ng/mL; between about 7,000 and about 18,000 ng/mL; between about 8,000 and about 15,000 ng/mL; between about 8,000 and about 10,000 ng/mL; or between about 10,000 and about 13,000 ng/mL. In some embodiments, the delivery methods achieve free (unbound) tiopronin peak blood levels of less than about 10,000 ng/mL, less than about 9,000 ng/mL, less than about 7,000 ng/mL, or less than about 5,000 ng/mL. Preferably, in some embodiments the delivery methods achieve a free tiopronin peak blood level of a value between about 2,000 and about 8,000 ng/mL; between about 3,000 and about 7,000 ng/mL; between about 4,000 and about 6,000 ng/mL; or between about 3,000 and about 5,000 ng/mL.

Lower peak blood levels of tiopronin result in fewer side effects, generally seen with use of tiorponin and/or other cystinuria drugs. In preferred embodiments, the methods, compositions, and/or delivery systems described herein result in fewer of at least one of the following side effects: gastrointestinal side-effects (anorexia, abdominal pain, bloating, diarrhea, emesis, flatus, nausea, soft stools); taste/smell impairment; dermatologic complications (ecchymosis, elastosis perforans serpiginosa, oral ulcers, pemphigus, pharyngitis, prurites, rash, uritcaria, warts, wrinkling); hypersensitivity reactions (adenopathy, arthralgia, chills, dyspnea, fatigue, fever, laryngeal edema, myalgia, respiratory distress, weakness); hematologic abnormalities (anemia, eosinophilia, increased bleeding, leukopenia, thrombocytopenia); renal complications (hematuria, nephrotic syndrome, proteinuria); pulmonary manifestations (bronchiolitis, dyspnea, hemoptysis, pulmonary infiltrates); neurologic complications (myasthenic syndrome); pain, such as renal colic, urinary urgency, sore throat, bleeding, easy bruisability, agranulocytosis, Goodpasture's syndrome, myasthenia gravis, proteinuria, nephrotic syndrome, and membranous glomerulopathy. A reduction in side effects can refer to less of a particular side effect (e.g., fewer occurences of no occurences of nauseous episodes for a given patient over a given time frame); to less severe manifestations of a particular side effect (e.g., less severe nausea for a given patient for each, some, or most occurences of nausea); or a combination thereof. In more preferred embodiments, the side effects are sufficiently mild and/or infrequent to allow patients to continue treatment, or to allow more patients to continue treatment than seen with other cystinuria treatments, such as Thiola®. In most preferred embodiments, the side effects are sufficiently mild and/or infrequent to allow at least about 50 to about 60%, at least about 60 to about 70%, at least about 70 to about 80%, or at least about 80 to about 90% to continue treatment for at least about a year, at least about 5 to about 10 years, at least about 10 to about 20 years, or for the remainer of the patient's life.

In some embodiments, the delivery methods of the present invention achieve lower, and more consistently lower, free tiopronin plasma concentrations compared to immediate-release (or delayed-release) formulations. For example, in some embodiments, the delivery methods achieve free tiopronin concentrations in the plasma between about 100 and about 10,000 ng/mL, for the at least about 8 hours, at least about 10 hours, or preferably for at least about 12 hours of extended duration of effect; between about 200 and about 7,000 ng/mL, for the at least about 8 hours, at least about 10 hours, or preferably for at least about 12 hours of extended duration of effect; between about 300 and about 6,000 ng/mL, for the at least about 8 hours, at least about 10 hours, or preferably for at least about 12 hours of extended duration of effect; between about 400 and about 5,000 ng/mL, for the at least about 8 hours, at least about 10 hours, or preferably for at least about 12 hours of extended duration of effect; between about 500 and about 5,000 ng/mL, for the at least about 8 hours, at least about 10 hours, or preferably for at least about 12 hours of extended duration of effect; between about 600 and about 4,000 ng/mL, for the at least about 8 hours, at least about 10 hours, or preferably for at least about 12 hours of extended duration of effect; or between about 600 and about 3,000 ng/mL, for the at least about 8 hours, at least about 10 hours, or preferably for at least about 12 hours of extended duration of effect. Generally, the lower, and more consistently lower, free tiopronin plasma concentrations are maintained up to about 10 hours, up to about 12 hours, up to about 16 hours, up to about 20 hours, up to about 22 hours, or up to about 24 hours.

In some embodiments, the delivery methods of the present invention achieve higher, and more consistently higher, total tiopronin in the urine compared to immediate-release (or delayed-release) formulations, which translates to lower, and more consistently lower, cystine in the urine. The specific tiopronin dose may be selected based on the untreated urinary cystine concentrations in a given patient. In any case, the present delivery methods give tiopronin urinary recovery above about 20% of the total dose administered for the at least about 8 hours, at least about 10 hours, or preferably for at least about 12 hours of extended duration of effect, or longer; preferably above about 30% of the total dose administered for the at least about 8 hours, at least about 10 hours, or preferably for at least about 12 hours of extended duration of effect, or longer; more preferably above about 40% of the total dose administered for the at least about 8 hours, at least about 10 hours, or for at least about 12 hours of extended duration of effect, or longer; still more preferably above about 50% of the total dose administered for the at least about 8 hours, at least about 10 hours, or for at least about 12 hours of extended duration of effect, or longer; yet still more preferably above about 60% of the total dose administered for the at least about 8 hours, at least about 10 hours, or for at least about 12 hours of extended duration of effect, or longer; and even yet still more preferably above about 70% of the total dose administered for the at least about 8 hours, at least about 10 hours, or for at least about 12 hours of extended duration of effect, or longer. To illustrate, a tiopronin urinary recovery above about 50% means that, if a half-daily dose of 500 mg tiopronin is administered, in accordance with a strategy of the invention, total tiopronin recovered in the urine, over the 12 hour time period following administration, would be about 250 mg or more. In some embodiments, tiopronin urinary recovery may be up to about 40%, about 50%, about 60%, about 65%, or about 70%, of the total dose administered. Generally, the higher, and more consistently higher, urinary total tiopronin concentrations are maintained up to about 10 hours, up to about 12 hours, up to about 16 hours, up to about 20 hours, up to about 22 hours, or up to about 24 hours.

In some embodiments, the delivery methods achieve lower, and more consistently lower, urinary cystine concentrations compared to immediate-release (or delayed-release) formulations, such as keeping urinary cystine below, or effectively below, a "baseline level" for a particular patient, that is, below that patient's untreated urinary cystine level, down to about normal urinary cystine concentrations for the at least about 8 hours, at least about 10 hours, or preferably for at least about 12 hours of extended duration of effect. In some embodiments, the delivery methods achieve lower, and more consistently lower, urinary cystine concentrations compared to immediate-release (or delayed-release) formulations, such as keeping urinary cystine below, or effectively below, about 250 mg/L and down to about normal urinary cystine concentrations for the at least about 8 hours, at least about 10 hours, or preferably for at least about 12 hours of extended duration of effect; preferably below, or effectively below, about 200 mg/L and down to about normal urinary cystine concentrations for the at least about 8 hours, at least about 10 hours, or for at least about 12 hours of extended duration of effect; more preferably below, or effectively below, about 150 mg/L and down to about normal urinary cystine concentrations for the at least about 8 hours, at least about 10 hours, or for at least about 12 hours of extended duration of effect; and even more preferably at or below, or effectively below, about 100 mg/L and down to about normal urinary cystine concentrations for the at least about 8 hours or for at least about 12 hours of extended duration of effect. In more preferred embodiments, urinary cystine is kept effectively below about 250 mg/L, about 200 mg/L, about 150 mg/L, or about 100 mg/L, and down to about normal urinary cystine concentrations, for greater than 12 hours, such as for at least about 14 hours, at least about 16 hours, at least about 18 hours, at least about 20 hours, or at least about 24 hours, or longer. Generally, the lower, and more consistently lower, urinary cystine concentrations are maintained up to about 10 hours, up to about 12 hours, up to about 16 hours, up to about 20 hours, up to about 22 hours, or up to about 24 hours. Normal cystine concentrations are about 10 to about 250 mg/L, e.g., about 20 to about 200 mg/L, or about 50 to about 150 mg/L. Generally, the lower, and more consistently lower, urinary cystine concentrations are maintained up to about 10 hours, up to about 12 hours, up to about 16 hours, up to about 20 hours, up to about 22 hours, or up to about 24 hours.

Extended release strategies of the present invention can be used in combination with one or more other therapies useful for treating cystinuria and related disorders. A nonlimiting example is use of agents to increase pH of urine, alkali metal salts of citric acid, alkaline-earth metal salts of citric acid, potassium citrate, potassium nitrate, and/or sodium bicarbonate, in conjunction with a modified-release composition or system described herein. Additional approaches from increasing alkalinity of urine are described, e.g., in US 2017/0172960 A1, to Saadeh et al., entitled "Pharmaceutical formulations for Treating Kidney Stones and Methods for Fabricating and Using Thereof."

Methods and Uses Regarding Dosing Schedules

Still another aspect of the invention provides methods and uses of pharmaceutical compositions according to a dosing schedule that provides repeated, critically-spaced pulses of a therapeutic agent, in accordance with aspects of the invention. In some embodiments, where the therapeutic is tiopronin, tiopronin-containing pharmaceutical compositions are administered to a subject in need thereof at critically-spaced intervals that provide consistently higher tiopronin levels in the urine than more or less frequent intervals. In the simplest case, the pharmaceutical composition comprises a pharmaceutically acceptable carrier and tiopronin, but not necessarily a modified-release component.

For example, the tiopronin can be provided in a treatment dose for repeated administration to the subject in intervals according to the present teachings, for example, with about two to about six hours between consecutive administrations. Generally, the composition is administered no more frequently than every three hours, that is no more than about eight times a day, so that the interval is no less than about three hours. In a preferred embodiment, the interval is about four hours and the composition is administered about six times a day. In some embodiments, administration provides a total daily dose of about 1,200 mg or less, or of about 15 mg/kg or less; or an average total daily dose of about 1,200 mg or less, or of about 15 mg/kg or less, where the dosage indicates the amount of active ingredient (tiopronin). Accordingly, the invention provides methods of administering a therapeutically effective amount of tiopronin to achieve a therapeutic effect in a subject with cystinuria, a disorder relating thereto, or a symptom thereof, by administering a pharmaceutical composition comprising tiopronin, in a treatment dose, and a pharmaceutically acceptable carrier; re-administering said pharmaceutical composition about two to about six hours after said first administration; and repeating these administering steps to provide a total daily dose of 1,200 mg or less (or of 15 mg/kg/day or less).

In some embodiments, the composition is an immediate-release composition for oral administration. In some embodiments, the composition is provided as an immediate-release transdermal or transmucosal formulation. For buccal or sublingual delivery, in some embodiments, tiopronin is embedded in a dissolving wafer placed either between the teeth and cheek or under the tongue, respectively, allowing for easy repeated administration. In preferred embodiments, five wafers are administered approximately five hours apart for a 24-hour period, to deliver a total daily therapeutic dose of tiopronin in repeated pulses, thereby achieving higher and more consistently higher urinary concentration of tiopronin, than more or less frequent dosing schedules. In a particularly preferred embodiment, six wafers are administered approximately four hours apart over a 24 hour period, to deliver a total daily therapeutic dose of tiopronin in repeated pulses. The present dosing schedules differ from those prescribing administration a given number of times a day, which do not specify intervals of time between consecutive administrations.

Kits for Use with Modified-Release Compositions and Systems

Yet another aspect of the invention provides kits for use with the compositions, systems, and methods described herein. In some embodiments, the kit provides one or more formulations or systems described herein for use in a method of the invention. For example, kits may provide dosage forms, grouped by doses to taken at a particular time, and over a day; and/or organized to aid compliance with a particular dosing regimen, throughout a period of time, e.g., for a day, a week, a month, or a year of treatment. Kits for administering the compositions or delivery systems of the invention may also include instructions for use.

It will be understood that the following examples and embodiments described herein are for illustrative purposes and that various modifications or changes in light thereof will be suggested to persons skilled in the art and are to be included within the spirit and purview of this application and scope of the appended claims.

All publications, patents, and published patent applications cited herein are hereby incorporated by reference in their entireties for all purposes.

EXAMPLES

Example 1

Cystine Concentration in Urine of Cystinuria Patients Over 2-Day Oral Administration of Extended-Release Tiopronin (Simulated) Compared with that Over 2-Day Standard Dosing This Example describes a study to confirm the feasibility of reducing cystine levels in the urine of cystinuria patients receiving more frequent and lower doses of tiopronin, in a dosing schedule designed to simulate the extended release formulations of the present invention, compared to urine cystine levels in cystinuria patients receiving standard Thiola® doses.

Study Design: The study identifies and groups patients as "good responders" to Thiola® (Group I) and "poor responders" to Thiola® (Group II), each having 4 cystinuria patients. Good responders are people who achieve 250 mg/L or less cystine urine concentration with tiopronin usage, for example, having a baseline without tiopronin of 1,200 mg/L, which falls to 250 mg/L following tiopronin treatments. Poor responders are people who do not achieve 250 mg/L or less cystine urine concentration with tiopronin usage, for example, having a baseline without tiopronin of 1,200 mg/L, which only falls to 1,000 mg/L even following treatments with tiopronin. Another example of a poor responder is a person having a baseline cystine urine concentration of 2,000 mg/L, which only falls to 1,000 mg/L after treatments with tiopronin. The patients of each Group are dosed as follows:

Day 1: 400 mg tiopronin is administered orally 3 times a day (standard Thiola® prescription that does not include a night dose); also, 24 hour urine cystine capacity is measured, that is, all urine over a 24-hour period, starting from the time of the first dose, is collected and used to measure urinary cystine concentration.

Day 2: Repeat Day 1

Day 3: No treatment

Day 4: No treatment

Day 5: To simulate extended-release, enterically-coated tiopronin is orally administered at 100 mg×12 times/day (i.e., every two hours). A simple enteric coating is used that avoids release in the stomach. Also, 24 hour urine cystine capacity is measured, that is, all urine over a 24-hour period, starting from the time of the first dose, is collected and used to measure urinary cystine concentration.

Day 6: Repeat Day 5

If effective, results will be as follows. Urine cystine levels will be consistently lower over Days 5-6 (using a simulated extended-release dosing regimen) compared with those over Days 1-2 of standard Thiola® dosing. Further, plasma levels of the drug will be consistently lower over Days 5-6 (using a simulated extended-release dosing regimen) compared with those over Days 1-2 of standard Thiola® dosing. For example, the cystine concentration in the urine may remain within a range of 100 mg/L to 250 mg/L, demonstrating more consistent cystine excretion, without periods of accumulation. Further, Cmax of the drug would not exceed 10 µmol/L; reduced peak plasma levels translate to fewer unwanted side effects.

Example 2

Cystine Stone Formation in Cystinuria Patients Following Oral Administration of Extended-Release Tiopronin (Simulated) for about 1 Week This Example describes a study to confirm the improved efficacy of reducing cystine stone formation in cystinuria patients who develop at least one stone per week using standard Thiola® dosing.

Study Design: The study identifies 2-3 patients currently taking Thiola® but who still develop at least one cystine stone per week. The patients are dosed as follows:

Day 1: No treatment; an X-ray is taken of the kidney and bladder.

Days 2-8: To simulate extended release, enterically-coated tiopronin is orally administered at 100 mg×12 times/day (i.e., every two hours). A simple enteric coating is used that avoids release in the stomach. Also, 24 hour urine cystine capacity is measured, that is, all urine over a 24-hour period, starting from the time of the first dose, is collected and used to measure urinary cystine concentration.

Day 8: X-ray examination of Day 1 is repeated.

If effective, results will be as follows. The X-ray of Day 8 will show no additional stones in addition to those, if any, observed on Day 1 for each patient in the study, or for one or more patients in the study.

Example 3

Cystine Stone Formation in Cystinuria Patients Following Oral Administration of Extended-Release Tiopronin (Simulated) for about 1 Month This Example describes a study to confirm the improved efficacy of reducing cystine stone formation in cystinuria patients who develop at least one stone, e.g., about 2-3 stones, per month using standard Thiola® dosing.

Study Design: The study identifies 2-3 patients currently taking Thiola® but who still develop about 2 to 3 stones a month. The patients are dosed as follows:

Day 1: No treatment; an X-ray is taken of the kidney and bladder.

Days 2-31: To simulate extended release, enterically-coated tiopronin is orally administered at 100 mg×12 times/day (i.e., every two hours). A simple enteric coating is used that avoids release in the stomach. Also, 24 hour urine cystine capacity is measured, that is, all urine over a 24-hour period, starting from the time of the first dose, is collected and used to measure urinary cystine concentration.

Day 31: X-ray examination of Day 1 is repeated.

If effective, results will be as follows. The X-ray of Day 31 will show no additional stones in addition to those, if any, observed on Day 1 for each patient in the study, or for one or more patients in the study; or will show only 1-2 additional stones compared to Day 1, for each patient in the study or for one or more patients in the study.

Example 4

Total and Free Tiopronin Concentration in Plasma and Tiopronin Recovery in Urine of Dogs Following Oral Administration According to Dosing Schedules Simulating Modified-Release Tiopronin The objective of this study was to evaluate total and free plasma tiopronin, and total urinary tiopronin, in an animal model (male Beagle dogs) following oral administration of tiopronin, according to various dose regimens, to determine whether different regimens, simulating modified release, would improve drug pharmacokinetics. Specifically, tiopronin formulations were administered to deliver 30 mg/kg per dog via single or multiple doses divided over a 12-hour period; and blood and urine samples then collected at different times post-dose.

These measurements allow an evaluation of the different dosing regimens, and thus of the modified-release formulations described herein, in treating cystinuria or related disorder. Free tiopronin (non-protein bound tiopronin) represents the portion of drug in the body that can interact with cystine, that is, the free tiopronin is excreted into urine via the kidney and, in the kidney, tiopronin reacts with cystine to decrease urine cystine concentration, thereby preventing or reducing cystinuria's hallmark cystine uroliths (kidney stones). Too high levels of tiopronin in the blood, however, have been associated with unwanted side-effects. The following demonstrates a tiopronin delivery approach that surprisingly maintains low but effective levels of free tiopronin in the blood, and further demonstrates that these correlate with higher total tiopronin levels in the urine, the most therapeutically relevant pharmacokinetic parameter. Indeed, an ideal pharmacokinetic profile is one that affords high levels of drug in the urine.

Study Design

Tiopronin formulations were administered to provide 30 mg/kg per dog according to four different dosage regimes (Leg 1, Leg 2, Leg 3, and Leg 4), as set forth in the table below. Leg 2, Leg 3, and Leg 4 (also referred to as Q6H, Q3H, and Q2H respectively) were designed to simulate modified-release formulations, in accordance with certain embodiments of the present invention. Following administration, blood and urine samples were collected at the time points, or over the time intervals, also as indicated below.

TABLE 1

| Leg # | Test Article | Dosing Route | N= | Dose (mg/kg) | Formulation | Dose Regimen | Blood Sampling Time Points (hours) | Urine Sampling Time Points (hours) |
|---|---|---|---|---|---|---|---|---|
| 1 | Tiopronin | PO | 3 | 30 | Tiopronin 40%, Mannitol 30%, Avicel 30% | Single Dose 0 hr (Q12H) | 2 hours pre-dose, 1, 2, 3, 4, 5, 6, 7, 8, 9, 10, 11, 12, and 24 hours post dose | 2 hours pre-dose, 0-4, 4-8, 8-12, and 12-24 hours |
| | | | | | Minimum 7 Days Washout | | | |
| 2 | Tiopronin | PO | 3 | 15 | Tiopronin 40%, Mannitol 30%, Avicel 30% | Two Doses 0 and 6 hr (Q6H) | | |
| | | | | | Minimum 7 Days Washout | | | |

TABLE 1-continued

| Leg # | Test Article | Dosing Route | N= | Dose (mg/kg) | Formulation | Dose Regimen | Blood Sampling Time Points (hours) | Urine Sampling Time Points (hours) |
|---|---|---|---|---|---|---|---|---|
| 3 | Tiopronin | PO | 3 | 7.5 | Tiopronin 20%, Mannitol 40%, Avicel 40% | Four Doses 0, 3, 6, and 9 hr. (Q3H) | | |
| | | Minimum 7 Days Washout | | | | | | |
| 4 | Tiopronin | PO | 3 | 5 | Tiopronin 20%, Mannitol 40%, Avicel 40% | Six Doses 0, 2, 4, 6, 8, and 10 hr. (Q2H) | | |

Preparation of Dosing Formulations: Capsules for Legs 1-4 were prepared and filled on the day of dosing, as follows. For Legs 1 and 2, tiopronin was dry mixed with avicel and mannitol to make a 40:30:30 mixture of tiopronin to avicel to mannitol, respectively; for study Legs 3 and 4, a 20:40:40 mixture of tiopronin to avicel to mannitol, respectively, was prepared. The dry mixes were custom filled with the appropriate amount of powder to deliver the specified doses to each dog based, on their respective body weights.

Animal Dosing and Sample Collection: This non-clinical study followed established practices and standard operating procedures of Absorption Systems and Absorption Systems Inc., as well as the study protocol. Study groups each included three dogs. The dogs were housed one per cage. The dogs were fasted for at least six hours prior to each administration of the formulation. Food was given approximately ten hours post initial dosing. Animals had free access to water throughout the study.

Following dosing, blood and urine samples were collected according to the schedule in Table 1.

Blood samples were collected via direct venipuncture of the jugular vein or other accessible vein of the dog, and placed in chilled polypropylene tubes containing sodium heparin as an anticoagulant. Samples were maintained chilled throughout processing. Blood samples were centrifuged at 4° C. and 3,000 rpm (revolutions per minute) for 5 minutes. The first aliquot of plasma was precipitated with methanol by combining 200 µL of plasma with 600 µL of methanol in a centrifuge tube. The samples were mixed, centrifuged at 3,000 rpm for 5 minutes. The resulting supernatant was decanted into clean, labeled polypropylene tubes. The remaining plasma volume was transferred to a chilled, labeled polypropylene tube, placed on dry ice, and stored in a freezer maintained at −60° C. to −80° C. Following taking each blood sample, 15 mL of water was given to the dog via syringe.

For study Leg 1, pre-dose urine samples were collected via free catch approximately 2 hours pre-dose. For study Legs 2, 3 and 4, pre-dose urine samples were collected via catheter approximately 2 hours pre-dose. Other urine samples were collected via free catch in the cages during the indicated interval, collected into clean bottles, and kept on cold packs. Cold packs were replenished as needed during the day. At the end of each interval, the total volume of urine was collected and recorded. Each sample was well mixed and divided into two aliquots: an approximately 5 mL first aliquot, and a second aliquot of the remaining volume. Additionally, for Leg 4 only, each dog received a 60 mL subcutaneous injection of saline (2×30 mL injections at two different sites) approximately 30 minutes prior to dosing and, if urine was not present in the animal's cage at the end of the final collection interval, the final urine sample was collected by catheter. All urine samples were stored in a freezer maintained at −60° C. to −80°.

Sample Analysis: Plasma concentrations of total and free tiopronin were determined by an LC-MS/MS method; urinary total tiopronin also was determined by LC-MS/MS method, following by HPLC and mass spectrometry.

A specific LC-MS/MS method for determining tiopronin in plasma and urine of Beagle dogs was developed for this study. The method was developed to distinguish total tiopronin and free (not protein bound) tiopronin, since tiopronin has a propensity to bind with protein thiols, other small molecule thiols, or with other tiopronin molecules.

For the analysis, analytical stock solutions (1.00 mg/mL of the free drug) were prepared in DMSO. Also, three standards for use in the analysis were prepared in each of the following media, as follows: (1) in male Beagle plasma containing sodium heparin as the anticoagulant, (2) in Beagle plasma that had previously been treated with acetonitrile to precipitate and remove plasma proteins; the plasma-free supernatant was diluted with methanol (3:1 methanol:plasma supernatant) to give pre-crashed Beagle plasma supernatant; and (3) in 10× diluted Beagle urine, diluted in water. The term "pre-crashed plasma" refers to plasma supernatant, obtained in the centrifugation step described above.

For plasma and urine calibration standards, working solutions were prepared in 50:50 acetonitrile:water. Working solutions were then added to plasma to make calibration standards to final concentrations of 1000, 500, 100, 50.0, 10.0, 5.00, 2.50 and 1.00 ng/mL. Standards in pre-crashed plasma were prepared by serial dilution into the plasma supernatant matrix to the same final concentrations. Samples were manually prepared for analysis in a 96-well plate format. Table 2 summarizes steps of the procedure for analyzing total or free plasma tiopronin, or total urinary tiopronin.

TABLE 2

| Step | Procedure Followed |
|---|---|
| 1 | For Standards: Add 10 µL of appropriate working solution to 50 µL of blank plasma in a 96 well plate. For Samples for determining Total Plasma Tiopronin, Total Urine Tiopronin, and Controls (Blanks): Aliquot 50 µL of plasma sample or blank plasma in a 96 well plate. Add 10 µL 50:50 acetonitrile:water containing 10 mM DTT to each sample. For Samples for determining Free Plasma Tiopronin and Controls (Blanks): Aliquot 150 µL of sample supernatant or blank supernatant in a 96 well plate. Add 10 µL 50:50 acetonitrile:water containing 10 mM DTT to each sample. Cap and mix |

TABLE 2-continued

| Step | Procedure Followed |
|---|---|
| 2 | Add 20 µL of 1M DTT to each sample and standard. Mix plate for 5 minutes. |
| 3 | For determining Total Plasma Tiopronin: Add 150 µL of 300 ng/mL Tiopronin-d₃ as an internal standard. Cap and vortex well. For determining Free Plasma Tiopronin: Add 20 µL of 300 ng/mL Tiopronin-d₃ as an internal standard. Cap and vortex well. |
| 4 | Cap plate and mix well for 5 minutes. Centrifuge plate at 3000 rpm for 5 minutes. |
| 5 | Transfer and inject supernatant into HPLC. |

The HPLC conditions use were as follows:
Instrument: Waters Acquity UPLC
Column: Waters Acquity HSS T3, 50×2.1 mm id, 1.7 µm
Aqueous Reservoir (A): 0.1% Formic Acid in Water
Organic Reservoir (B): 0.1% Formic Acid in Acetonitrile
Gradient Program: As indicated in Table 3.

TABLE 3

| Time (min) | Grad. Curve | % A | % B |
|---|---|---|---|
| 0.00 | 6 | 99.9 | 0.1 |
| 0.75 | 6 | 0.1 | 99.9 |
| 0.80 | 6 | 99.9 | 0.1 |
| 1.00 | 6 | 99.9 | 0.1 |

Flow Rate: 800 µL/min
Injection Volume: 10 µL
Run Time: 1.0 min
Column Temperature: 40° C.
Sample Temperature: 8° C.
Strong Autosampler Wash: 1:1:1(v:v:v) water:methanol:isopropanol with 0.2% formic acid
Weak Autosampler Wash: 4 mM ammonium formate
Following HPCL, the samples were subject to mass spectrometry to confirm their compositions. The Mass Spectrometer Conditions were as follows:
Instrument: PE Sciex API4000
Interface: Electrospray ("Turbo Ion Spray")
Mode: Multiple Reaction Monitoring (MRM)
Gases: CUR 30, CAD 10, GS1 50, GS2 50
Source Temperature: 500° C.
Voltages and Ions Monitored: As indicated in Table 4 (all settings are in volts)

TABLE 4

| Analyte | Polarity | Precursor Ion | Product Ion | IS | DP | EP | CE | CXP |
|---|---|---|---|---|---|---|---|---|
| Tiopronin | Negative | 161.8 | 104.8 | −4500 | −58 | −10 | −15 | −4 |
| Tiopronin-d3 (Internal Standard) | Negative | 164.8 | 104.8 | −4500 | −58 | −10 | −15 | −4 |

The following abbreviations are used: IS: Ion Spray Voltage; DP: Declustering Potential; EP: Entrance Potential; CE: Collision Energy; CXP: Collision Cell Exit Potential. Pharmacokinetic analysis was conducted by a non-compartmental model using Phoenix WinNonlin v.8.0 software.

Stability Testing: Finally, short term and long term stability of tiopronin in beagle dog plasma, pre-crashed plasma (plasma supernatant), and urine were assessed using two tiopronin concentrations (50 ng/mL or 500 ng/mL) under each of the following two conditions: (1) storage on the bench top for 4 hours and (2) frozen at −80° C. for up to one month. Samples were considered stable if their concentrations were within ±20% of nominal. These samples met acceptable criteria for stability and results are presented below, in Tables 5, 6, and 7, showing the % tiopronin remaining in Beagle dog plasma (Table 5), plasma supernatant (Table 6), and urine (Table 7).

TABLE 5

| | % Tiopronin Remaining in Beagle Dog Plasma High or Low Tiopronin Concentration | |
|---|---|---|
| | 50 ng/mL (low) | 500 ng/mL (high) |
| Bench top (RT) for 4 hours | 109 | 87.0 |
| −80° C. Freezer for: 1 week | 110 | 95.4 |
| 2 weeks | 112 | 92.8 |
| 4 weeks | 95.6 | 90.4 |

TABLE 6

| | % Tiopronin Remaining in Beagle Dog Plasma Supernatant High or Low Tiopronin Concentration | |
|---|---|---|
| | 50 ng/mL (low) | 500 ng/mL (high) |
| Bench top (RT) for 4 hours | 113 | 105 |
| −80° C. Freezer for: 1 week | 118 | 112 |
| 2 weeks | 105 | 105 |
| 4 week | 113 | 116 |

TABLE 7

| | % Tiopronin Remaining in Beagle Dog Urine High or Low Tiopronin Concentration | |
|---|---|---|
| | Low (250 ng/mL) | High (2500 ng/mL) |
| Bench top (RT) for 4 hours | 113 | 84.9 |
| −80° C. Freezer for: 1 week | 106 | 107 |
| 2 week | 119 | 90.9 |
| 4 week | 112 | 96.6 |

Results

Results of this study surprisingly demonstrate that there is an optimum dosing frequency range, or critical range for interval lengths between doses, that results in both lower but continuous levels of free tiopronin in the blood, and higher total tiopronin in the urine, compared to a less or more frequent dosing schedule. Specifically, there is surprisingly a non-linear relationship between dosing frequency and more constant and lowered free tiopronin levels in the blood, and this non-linear relationship surprisingly extends to total tiopronin levels in the urine, where a particular window of interval lengths between doses maintains higher urinary total tiopronin. Lower but continuous plasma levels, and higher urinary levels, represent desirable pharmacokinetics of a tiopronin formulation for reducing side effects and improving efficacy. The present results surprisingly demonstrate that optimal pharmacokinetics are obtained using a modified-release approach that provides fractions of the total daily tiopronin dose about every 2 to 6 hours, and preferably about every 4 hours (rather than more or less frequent dosing). Greater amounts of the drug are available in the urine to bind cystine, achieving equivalent cystine binding while administering less drug, and affording advantages over current approaches, such as greater molar potency, reduced side effects, and greater efficacy with less frequent dosing in treating cystinuria.

Total Tiopronin Plasma Concentration: Total tiopronin concentration in the plasma was measured as described above. Results for each of Legs 1-4 are provided below and FIG. 11.

Leg 1 (Q12H): Following PO dosing of tiopronin at 30 mg/kg, using a single dose, maximum plasma concentrations of total tiopronin (average of 27900±8122 ng/mL) were observed between 1 and 2 hours post dosing.

Leg 2 (Q6H): Following PO dosing of tiopronin at 30 mg/kg, using two 15 mg/kg doses at 0 and 6 h, maximum plasma concentrations (average of 23833±5829 ng/mL) of total tiopronin were observed between 7 and 8 hours post dosing.

Leg 3 (Q3H): Following PO dosing of tiopronin at 30 mg/kg, using four 7.5 mg/kg doses at 0, 3, 6, and 9 h, maximum plasma concentrations (average of 10437±1201 ng/mL) of total tiopronin were observed between 4 and 7 hours post dosing.

Leg 4 (Q6H): Following PO dosing of tiopronin at 30 mg/kg, using six 5 mg/kg doses at 0, 2, 4, 6, 8, and 10 h, maximum plasma concentrations (average of 10297±2199 ng/mL) of total tiopronin were observed between 7 and 9 hours post dosing.

Figure 11:
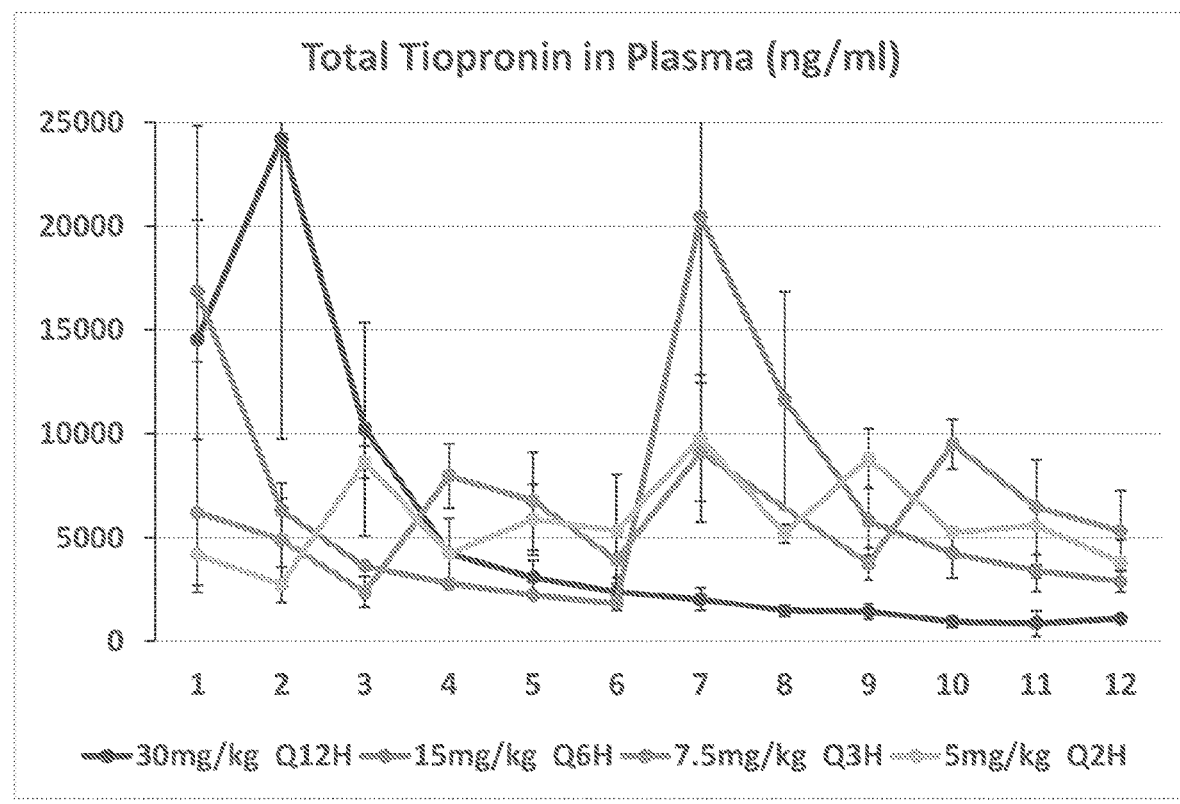
FIG. 11 depicts total tiopronin concentration in plasma (ng/mL) at different times post-dosing, using an animal model of Beagle dogs orally administered 30 mg/kg tiopronin according to 4 dosage regimens: a single 30 mg/kg dose (Q12H, Leg 1); two 15 mg/kg doses 6 hours apart (Q6H, Leg 2); four 7.5 mg/kg doses, every 3 hours (Q3H; Leg 3); and six 5 mg/kg doses, every 2 hours (Q2H, Leg 4). Values are averaged; bars represent standard deviation (n=3 dogs).

FIG. 11 shows the total concentration of tiopronin in plasma at various time points post-dosing for the four different dosing regimens. Values are averaged; bars represent standard deviation (n=3). Regarding plasma levels of the drug, FIG. 11 shows that Q12H and Q6H dosing regimens (using higher drug amounts per dosing event than Q3H or Q2H) give higher average plasma concentrations and greater plasma Cmax. Spikes in Cmax are often correlated with drug-related adverse events. Moderating the Cmax by dividing the same total daily dose into smaller portions reduces drug-related adverse events by reducing Cmax, as discussed above.

Free Tiopronin Plasma Concentration: Free tiopronin concentration in the plasma was measured as described above. Results for each of Legs 1-4 are provided below and FIG. 12.

Leg 1 (Q12H): After PO dosing of tiopronin at 30 mg/kg, using a single dose, maximum plasma concentrations (average of 11063±3598 ng/mL) of free tiopronin were observed between 1 and 2 hours post dosing.

Leg 2 (Q6H): After PO dosing of tiopronin at 30 mg/k, using two 15 mg/kg doses at 0 and 6 h, maximum plasma concentrations (average of 8177±2237 ng/mL) of free tiopronin were observed between 7 and 8 hours post dosing.

Leg 3 (Q3H): After PO dosing of tiopronin at 30 mg/kg, using four 7.5 mg/kg doses at 0, 3, 6, and 9 h, maximum plasma concentrations (average of 3143±624 ng/mL) of free tiopronin were observed between 4 and 10 hours post dosing.

Leg 4 (Q6H): After PO dosing of tiopronin at 30 mg/kg, using six 5 mg/kg doses at 0, 2, 4, 6, 8, and 10 h, maximum plasma concentrations (average of 2323±589 ng/mL) of free tiopronin were observed at 3 hours post dosing.

Figure 12:
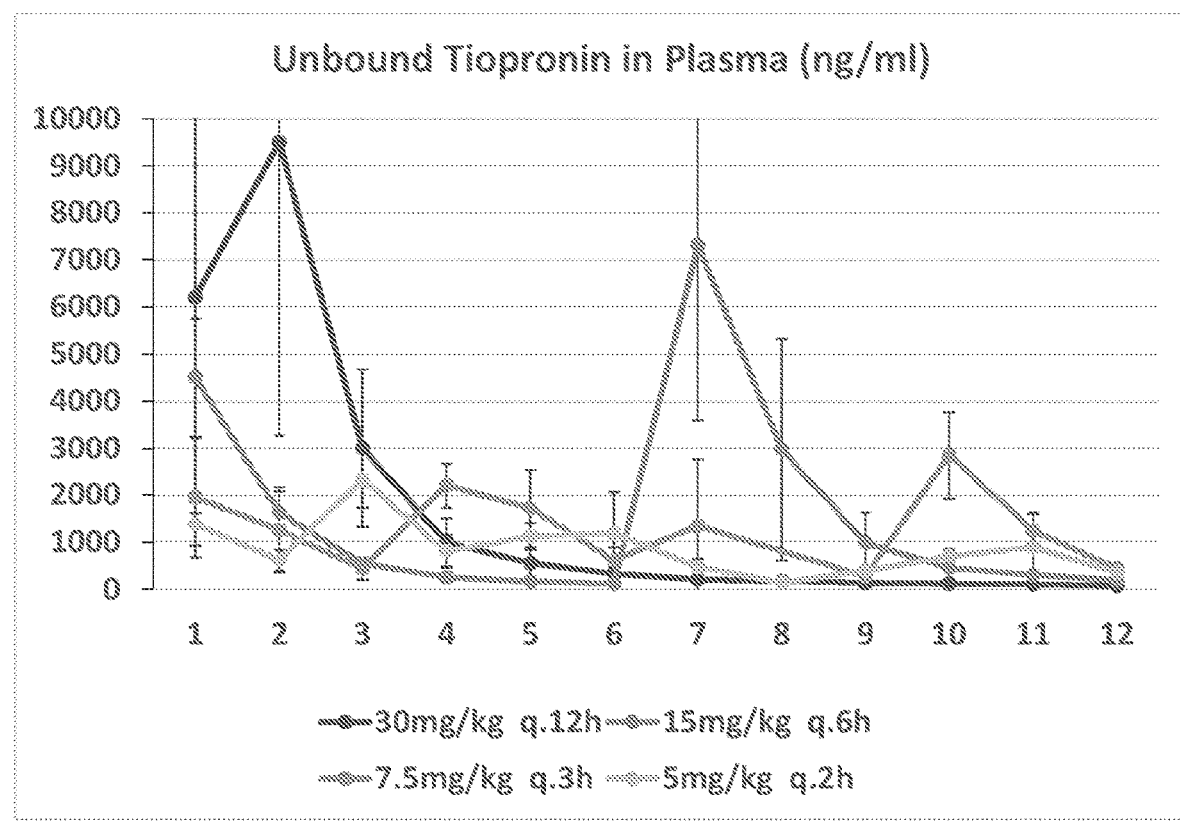
FIG. 12 depicts free tiopronin concentration in plasma (ng/mL) at different times post-dosing, using an animal model of Beagle dogs orally administered 30 mg/kg tiopronin according to 4 dosage regimens: a single 30 mg/kg dose (Q12H, Leg 1); two 15 mg/kg doses 6 hours apart (Q6H, Leg 2); four 7.5 mg/kg doses, every 3 hours (Q3H, Leg 3); and six 5 mg/kg doses, every 2 hours (Q2H, Leg 4). Values are averaged; bars represent standard deviation (n=3 dogs).

FIG. 12 shows free (unbound) tiopronin concentration in the plasma at various time points post dosing for the four different dosing regimens. Values are averaged; bars represent standard deviation (n=3). In Legs 1 and 2 (using the dosage regimens Q12H and Q6H, respectively), unbound tiopronin is seen to disappear from the plasma after a short period of time. In contrast, in Legs 3 and 4 (using the dosage regimens Q3H and Q2H, respectively), free tiopronin levels in the plasma are maintained.

Total Tiopronin Urinary Concentration: Total tiopronin concentration in the urine was measured as described above and reported as % of dose (unchanged drug). Results for each of Legs 1-4 are provided below and FIG. 13.

Leg 1 (Q12H): Following PO dosing of tiopronin at 30 mg/kg, using a single dose, on average, 19.9±8.51% of the dose (unchanged drug) was found in urine after oral dosing.

Leg 2 (Q6H): Following PO dosing of tiopronin at 30 mg/kg, using two 15 mg/kg doses at 0 and 6 h, on average, 37.5±14.5% of the dose (unchanged drug) was found in urine after oral dosing.

Leg 3 (Q3H): Following PO dosing of tiopronin at 30 mg/kg, using four 7.5 mg/kg doses at 0, 3, 6, and 9 h, on average, 50.6±14.0% of the dose (unchanged drug) was found in urine after oral dosing.

Leg 4 (Q6H): Following PO dosing of tiopronin at 30 mg/kg, using six 5 mg/kg doses at 0, 2, 4, 6, 8, and 10 h, on average, 32.7±5.90% of the dose (unchanged drug) was found in urine after oral dosing.

Figure 13:
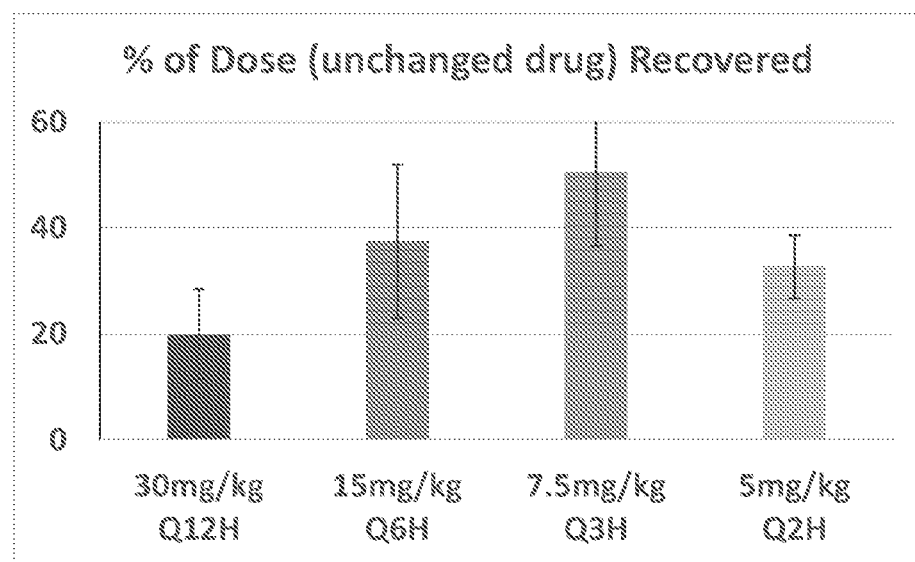
FIG. 13 depicts total tiopronin in urine, as a % of dose (unchanged drug), at different times post-dosing, using an animal model of Beagle dogs orally administered 30 mg/kg tiopronin according to 4 dosage regimens: a single 30 mg/kg dose (Q12H, Leg 1); two 15 mg/kg doses 6 hours apart (Q6H, Leg 2); four 7.5 mg/kg doses, every 3 hours (Q3H, Leg 3); and six 5 mg/kg doses, every 2 hours (Q2H, Leg 4). Values are averaged; bars represent standard deviation (n=3 dogs).

FIG. 13 shows urinary recovery of tiopronin, reported as % of dose recovered, for the four different dosing regimens. Values are averaged; bars represent standard deviation (n-=3). Of the four dosing schedules tested, Q3H showed the best tiopronin recovery in urine. Since the formation of cystine uroliths in cystinuria and related disorders is the direct result of saturation of cystine in urine, tiopronin levels in the urine are a therapeutically relevant parameter in demonstrating efficacy, that is, in demonstrating the drug's ability to decrease cystine concentration in the urine via formation of a more soluble the tiopronin-cysteine mixed disulfide, which then is excreted.

DISCUSSION

These results surprisingly demonstrate an optimum dosing frequency range, or critical range for interval lengths between doses, that produces lower peak levels but more consistent levels of free tiopronin in the blood, as well as higher and more consistently higher total tiopronin in the urine, compared to less or more frequent dosing, reducing side effects, increasing efficacy, and improving patient quality of life. Importantly, this study identifies that critically-spaced, repeated boluses of tiopronin reduce plasma $C_{max}$ and increase urine concentration of tiopronin, as compared to approaches currently used to treat cystinuria.

Higher and more consistently higher levels of urinary tiopronin demonstrate improved efficacy in treating cystinuria. That is, higher urinary tiopronin results in lower urinary cystine, thus reducing or eliminating cystine stone formation for subjects with cystinuria (see, e.g., Koide et al., 1994, "A new therapeutic agent for cystinuria," *Urolithiasis* 2:571-574; and Goldfarb et al., 2006, "Urinary cystine excretion and capacity in patients with cystinuria," *Kidney Int.* 69(6): 1041-1047). It follows that the dose-frequency administration parameters shown here to give higher tiopronin urine excretion, also represent a strategy to lower cystine concentration in urine, thereby enhancing efficacy, as well as one to reduce side effects (based on the significantly decreased peak plasma concentrations ($C_{max}$) and increased urinary excretion of the drug), thereby also enhancing patient compliance and outcomes.

Example 5

Total and Free Tiopronin Concentration in Plasma and Tiopronin Recovery in Urine of Dogs Following Intraduodenal Administration The objective of this study was to evaluate total and free plasma tiopronin, and total urinary tiopronin, in an animal model (male Beagle dogs) following intraduodenal administration of tiopronin, to determine whether small intestine administration, would improve drug pharmacokinetics. Specifically, tiopronin formulations were administered to deliver 30 mg/kg per dog via single dose; and blood and urine samples then collected at different times post-dose.

These measurements allow an evaluation of small intestine administration, and thus of the enteric coated formulation described herein, in treating cystinuria or related disorder. Free tiopronin (non-protein bound tiopronin) represents the portion of drug in the body that can interact with cystine, that is, the free tiopronin excreted into urine via the kidney, where tiopronin reacts with cystine to decrease urine cystine concentration, thereby preventing or reducing cystinuria's hallmark cystine uroliths (kidney stones). Too high levels of tiopronin in the blood, however, have been associated with unwanted side-effects. The following demonstrates a tiopronin small intestine delivery approach that surprisingly maintains higher total tiopronin levels in the urine, the most therapeutically relevant pharmacokinetic parameter. Indeed, an ideal pharmacokinetic profile is one that affords high levels of drug in the urine.

Study Design

Tiopronin formulations were administered to provide 30 mg/kg per dog as one single intraduodenal dose. Following administration, blood and urine samples were collected at the time points, or over the time intervals, indicated below.

The dogs were fasted for at least sixteen hours prior to each administration of the formulation. Food was given approximately eight hours post initial dosing. Animals had free access to water throughout the study.

Intraduodenal (ID) administration: Animals were anesthetized by a slow IV infusion of Propofol (6-10 mg/kg) or with an intramuscular injection of a cocktail containing ketamine (approximately 10-20 mg/kg), diazepam (3 mg/kg), and acepromazine (0.05 mg/kg) given IM about 5-10 minutes before intubation. Once animals were confirmed adequately anesthetized they were intubated and maintained using isoflurane (approximately 1-5% in oxygen 1 to 4 L/min) as necessary until dosing is complete. Formulations were administered into the proximal duodenum via endoscopic guidance to verify the dosing site. The endoscope first was maneuvered into the pyloric sphincter with camera visualization of the proximal duodenum. Once there was confirmation that the endoscope was placed between the pylorus and proximal duodenum, the test article was delivered to the proximal duodenum followed by a 5 mL flush. Upon completion of the dosing, the animals were taken off the isoflurane and allowed to recover from anesthesia. Time points began upon completion of the entire dose procedure. Following each blood sampling time point, 15 mL of water was given to each dog via syringe. Approximately 30 minutes prior to the 0 hour blood collection, each dog received a subcutaneous injection of 60 mL of saline (30 mL injection into two sites).

Following dosing, blood and urine samples were collected according to the schedule in Table 8.

Blood samples were collected via direct venipuncture of the jugular vein or other accessible vein of the dog, and placed in chilled polypropylene tubes containing sodium heparin as an anticoagulant. Samples were maintained chilled throughout processing. Blood samples were centrifuged at 4° C. and 3,000 rpm (revolutions per minute) for 5 minutes. The first aliquot of plasma was precipitated with methanol by combining 200 µL of plasma with 600 µL of methanol in a centrifuge tube. The samples were mixed, centrifuged at 3,000 rpm for 5 minutes. The resulting supernatant was decanted into clean, labeled polypropylene

TABLE 8

| Leg # | Test Article | Dosing Route | N= | Dose (mg/kg) | Formulation | Dose Regimen | Blood Sampling Time Points (hours) | Urine Sampling Time Points (hours) |
|---|---|---|---|---|---|---|---|---|
| 1 | Tiopronin | PO | 3 | 30 | Tiopronin 40%, Mannitol 30%, Avicel 30% | Single Dose 0 hr (Q12H) | 2 hours pre-dose, 1, 2, 3, 4, 5, 6, 7, 8, 9, 10, 11, 12, and 24 hours post dose | 2 hours pre-dose, 0-4, 4-8, 8-12, and 12-24 hours |

Preparation of Dosing Formulations: Capsules were prepared and filled on the day of dosing, as follows. Tiopronin was dry mixed with avicel and mannitol to make a 40:30:30 mixture of tiopronin to avicel to mannitol, respectively. The dry mixes were custom filled with the appropriate amount of powder to deliver the specified doses to each dog based, on their respective body weights.

Animal Dosing and Sample Collection: This non-clinical study followed established practices and standard operating procedures of Absorption Systems and Absorption Systems Inc., as well as the study protocol. Study groups each included three dogs. The dogs were housed one per cage.

tubes. The remaining plasma volume was transferred to a chilled, labeled polypropylene tube, placed on dry ice, and stored in a freezer maintained at −60° C. to −80° C. Following taking each blood sample, 15 mL of water was given to the dog via syringe.

Pre-dose urine samples were collected via catheter approximately 2 hours pre-dose. Other urine samples were collected via free catch in the cages during the indicated interval, collected into clean bottles, and kept on cold packs. Cold packs were replenished as needed during the day. At the end of each interval, the total volume of urine was collected and recorded. Each sample was well mixed and divided into two aliquots: an approximately 5 mL first aliquot, and a second aliquot of the remaining volume. If urine was not present in the animal's cage at the end of the final collection interval, the final urine sample was collected by catheter. All urine samples were stored in a freezer maintained at −60° C. to −80°.

Sample Analysis: Plasma concentrations of total and free tiopronin were determined by an LC-MS/MS method; urinary total tiopronin also was determined by LC-MS/MS method, following by HPLC and mass spectrometry.

A specific LC-MS/MS method for determining tiopronin in plasma and urine of Beagle dogs was developed for this study. The method was developed to distinguish total tiopronin and free (not protein bound) tiopronin, since tiopronin has a propensity to bind with protein thiols, other small molecule thiols, or with other tiopronin molecules.

For the analysis, analytical stock solutions (1.00 mg/mL of the free drug) were prepared in DMSO. Also, three standards for use in the analysis were prepared in each of the following media, as follows: (1) in male Beagle plasma containing sodium heparin as the anticoagulant, (2) in Beagle plasma that had previously been treated with acetonitrile to precipitate and remove plasma proteins; the plasma-free supernatant was diluted with methanol (3:1 methanol: plasma supernatant) to give pre-crashed Beagle plasma supernatant; and (3) in 10× diluted Beagle urine, diluted in water. The term "pre-crashed plasma" refers to plasma supernatant, obtained in the centrifugation step described above.

For plasma and urine calibration standards, working solutions were prepared in 50:50 acetonitrile: water. Working solutions were then added to plasma to make calibration standards to final concentrations of 1000, 500, 100, 50.0, 10.0, 5.00, 2.50 and 1.00 ng/mL. Standards in pre-crashed plasma were prepared by serial dilution into the plasma supernatant matrix to the same final concentrations. Samples were manually prepared for analysis in a 96-well plate format. Table 9 summarizes steps of the procedure for analyzing total or free plasma tiopronin, or total urinary tiopronin.

TABLE 9

| Step | Procedure Followed |
|---|---|
| 1 | For Standards: Add 10 μL of appropriate working solution to 50 μL of blank plasma in a 96 well plate.<br>For Samples for determining Total Plasma Tiopronin, Total Urine Tiopronin, and Controls (Blanks): Aliquot 50 μL of plasma sample or blank plasma in a 96 well plate. Add 10 μL 50:50 acetonitrile:water containing 10 mM DTT to each sample. |

TABLE 9-continued

| Step | Procedure Followed |
|---|---|
|  | For Samples for determining Free Plasma Tiopronin and Controls (Blanks): Aliquot 150 μL of sample supernatant or blank supernatant in a 96 well plate. Add 10 μL 50:50 acetonitrile:water containing 10 mM DTT to each sample. Cap and mix |
| 2 | Add 20 μL of 1M DTT to each sample and standard. Mix plate for 5 minutes. |
| 3 | For determining Total Plasma Tiopronin: Add 150 μL of 300 ng/mL Tiopronin-$d_3$ as an internal standard. Cap and vortex well.<br>For determining Free Plasma Tiopronin: Add 20 μL of 300 ng/mL Tiopronin-$d_3$ as an internal standard. Cap and vortex well. |
| 4 | Cap plate and mix well for 5 minutes. Centrifuge plate at 3000 rpm for 5 minutes. |
| 5 | Transfer and inject supernatant into HPLC. |

The HPLC conditions use were as follows:
Instrument: Waters Acquity UPLC
Column: Waters Acquity HSS T3, 50×2.1 mm id, 1.7 μm
Aqueous Reservoir (A): 0.1% Formic Acid in Water
Organic Reservoir (B): 0.1% Formic Acid in Acetonitrile
Gradient Program: As indicated in Table 10.

TABLE 10

| Time (min) | Grad. Curve | % A | % B |
|---|---|---|---|
| 0.00 | 6 | 99.9 | 0.1 |
| 0.75 | 6 | 0.1 | 99.9 |
| 0.80 | 6 | 99.9 | 0.1 |
| 1.00 | 6 | 99.9 | 0.1 |

Flow Rate: 800 μL/min
Injection Volume: 10 μL
Run Time: 1.0 min
Column Temperature: 40° C.
Sample Temperature: 8° C.
Strong Autosampler Wash: 1:1:1(v:v:v) water:methanol: isopropanol with 0.2% formic acid
Weak Autosampler Wash: 4 mM ammonium formate
Following HPCL, the samples were subject to mass spectrometry to confirm their compositions. The Mass Spectrometer Conditions were as follows:
Instrument: PE Sciex API4000
Interface: Electrospray ("Turbo Ion Spray")
Mode: Multiple Reaction Monitoring (MRM)
Gases: CUR 30, CAD 10, GS1 50, GS2 50
Source Temperature: 500° C.
Voltages and Ions Monitored: As indicated in Table 11 (all settings are in volts)

TABLE 11

| Analyte | Polarity | Precursor Ion | Product Ion | IS | DP | EP | CE | CXP |
|---|---|---|---|---|---|---|---|---|
| Tiopronin | Negative | 161.8 | 104.8 | −4500 | −58 | −10 | −15 | −4 |
| Tiopronin-d3 (Internal Standard) | Negative | 164.8 | 104.8 | −4500 | −58 | −10 | −15 | −4 |

The following abbreviations are used: IS: Ion Spray Voltage; DP: Declustering Potential; EP: Entrance Potential; CE: Collision Energy; CXP: Collision Cell Exit Potential. Pharmacokinetic analysis was conducted by a non-compartmental model using Phoenix WinNonlin v.8.0 software.

Stability Testing: Finally, short term and long term stability of tiopronin in beagle dog plasma, pre-crashed plasma (plasma supernatant), and urine were assessed using two tiopronin concentrations (50 ng/mL or 500 ng/mL) under each of the following two conditions: (1) storage on the bench top for 4 hours and (2) frozen at −80° C. for up to one month. Samples were considered stable if their concentrations were within ±20% of nominal. These samples met acceptable criteria for stability and results are presented below, in Tables 12, 13, and 14, showing the % tiopronin remaining in Beagle dog plasma (Table 12), plasma supernatant (Table 13), and urine (Table 14).

TABLE 12

| | % Tiopronin Remaining in Beagle Dog Plasma High or Low Tiopronin Concentration | |
| --- | --- | --- |
| | 50 ng/mL (low) | 500 ng/mL (high) |
| Bench top (RT) for 4 hours | 109 | 87.0 |
| −80° C. Freezer for: 1 week | 110 | 95.4 |
| 2 weeks | 112 | 92.8 |
| 4 weeks | 95.6 | 90.4 |

TABLE 13

| | % Tiopronin Remaining in Beagle Dog Plasma Supernatant High or Low Tiopronin Concentration | |
| --- | --- | --- |
| | 50 ng/mL (low) | 500 ng/mL (high) |
| Bench top (RT) for 4 hours | 113 | 105 |
| −80° C. Freezer for: 1 week | 118 | 112 |
| 2 week | 105 | 105 |
| 4 week | 113 | 116 |

TABLE 14

| | % Tiopronin Remaining in Beagle Dog Urine High or Low Tiopronin Concentration | |
| --- | --- | --- |
| | Low (250 ng/mL) | High (2500 ng/mL) |
| Bench top (RT) for 4 hours | 113 | 84.9 |
| −80° C. Freezer for: 1 week | 106 | 107 |
| 2 week | 119 | 90.9 |
| 4 week | 112 | 96.6 |

Results

Results of this study surprisingly demonstrate that there is higher urine recovery after administration to the small intestine compared to oral administration of the same amount of drug as a single dose, while the level of free (unbound) tiopronin in plasma is higher for oral compared to small intestine administration. Specifically, there is surprisingly no direct correlation between free tiopronin in blood and percent of urine recovery, or this correlation is a reverse correlation. Additionally, we surprisingly observed that small intestine administration provides better urine recovery of tiopronin, likely due to faster absorption and/or faster urine excretion. Higher urinary levels represent desirable pharmacokinetics of a tiopronin formulation for reducing side effects and improving efficacy. Greater amounts of the drug are available in the urine to bind cystine, achieving equivalent cystine binding while administering less drug, and affording advantages over current approaches, such as greater molar potency, reduced side effects, and greater efficacy with less frequent dosing in treating cystinuria. Further, Cmax of the total tiopronin in plasma is lower using small intestine administration compared to oral administration. Spikes in Cmax are often correlated with drug-related adverse events.

Total Tiopronin Plasma Concentration: Total tiopronin concentration in the plasma was measured as described above. Results are provided below and FIG. 14.

Figure 14:
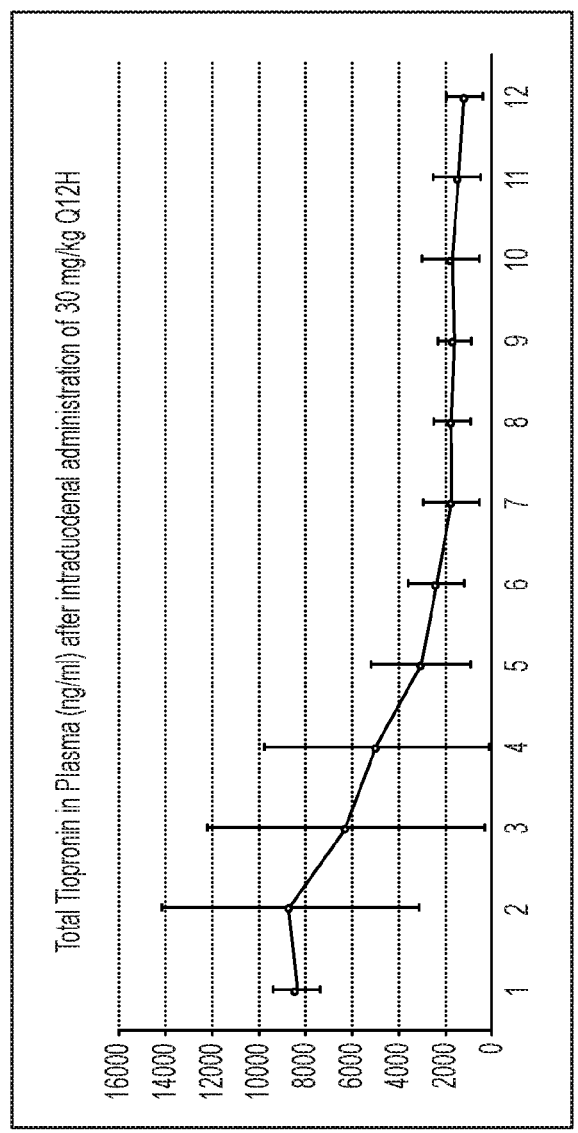
FIG. 14 depicts total tiopronin concentration in the plasma (ng/mL) at different times post-dosing, using an animal model of Beagle dogs administered tiopronin via the duodenum in a single 30 mg/kg dose (Q12H, Leg 1). Values are averaged; bars represent standard deviation (n=3 dogs).

FIG. 14 depicts total tiopronin concentration in the plasma (ng/mL) at different times post-dosing, using an animal model of Beagle dogs administered tiopronin via the duodenum in a single 30 mg/kg dose (Q12H, Leg 1). Values are averaged; bars represent standard deviation (n=3 dogs). After intraduodenal dosing of tiopronin at 30 mg/kg, using a single dose, maximum plasma concentrations of total tiopronin (average of 8640±5522 ng/mL) were observed between 1 and 2 hours post dosing. Regarding plasma levels of the drug, FIG. 11 and FIG. 14 show that oral administration gives higher average plasma concentrations and greater plasma Cmax compared to intraduodenal administration (ID). Spikes in Cmax are often correlated with drug-related adverse events. Therefore, administering, e.g., the same total daily dose, directly to the small intestine can reduce Cmax and drug-related adverse events.

Free Tiopronin Plasma Concentration: Free tiopronin concentration in the plasma was measured as described above. Results are provided below and FIG. 15.

Figure 15:
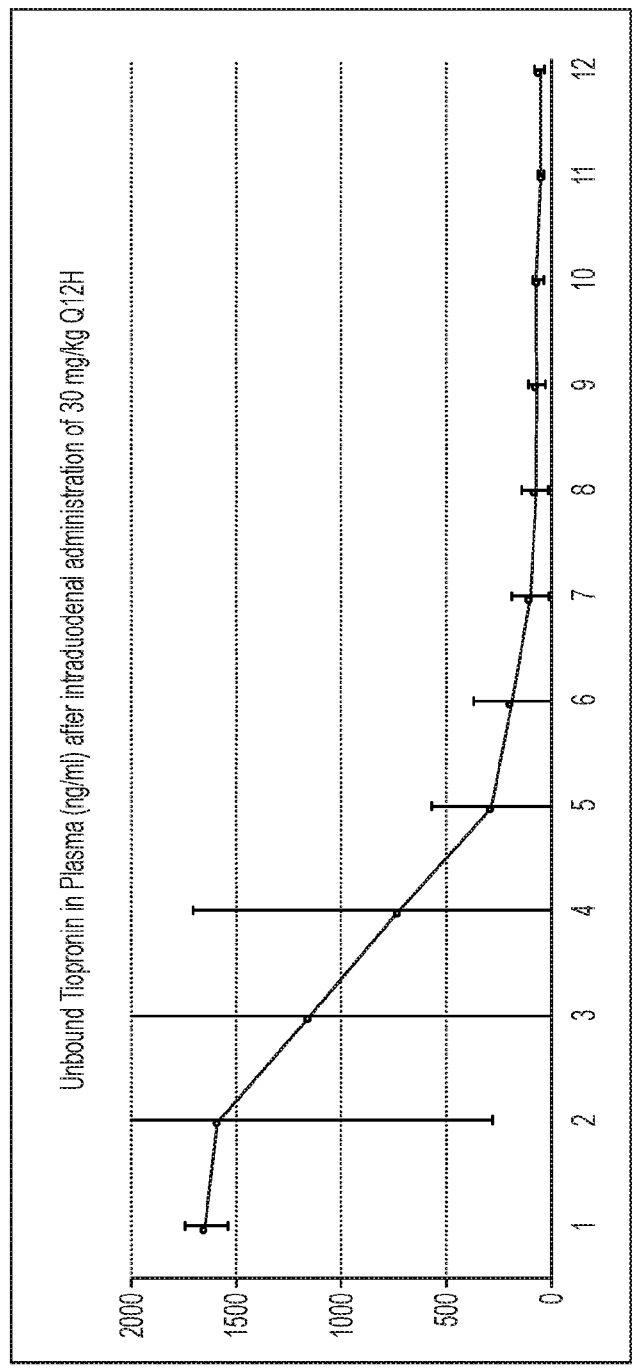
FIG. 15 depicts free (unbound) tiopronin concentration in plasma (ng/mL) at different times post-dosing, using an animal model of Beagle dogs administered tiopronin via the duodenum in a single 30 mg/kg dose (Q12H, Leg 1). Values are averaged; bars represent standard deviation (n=3 dogs).

FIG. 15 depicts free (unbound) tiopronin concentration in plasma (ng/mL) at different times post-dosing, using an animal model of Beagle dogs administered tiopronin via the duodenum in a single 30 mg/kg dose (Q12H, Leg 1). Values are averaged; bars represent standard deviation (n=3 dogs). After intraduodenal dosing of tiopronin at 30 mg/kg, using a single dose, maximum plasma concentrations (average of 1643±105 ng/mL) of free tiopronin were observed between 1 and 2 hours post dosing. FIG. 12 and FIG. 15 show that the level of free tiopronin in plasma is lower after ID administration compared to oral (PO) administration. This difference may account for the higher tiopronin urinary recovery achieved with ID administration compared to oral (PO) dosing.

Total Tiopronin Urinary Concentration: Total tiopronin concentration in the urine was measured as described above and reported as % of dose (unchanged drug). Results are provided below and FIG. 16.

Figure 16:
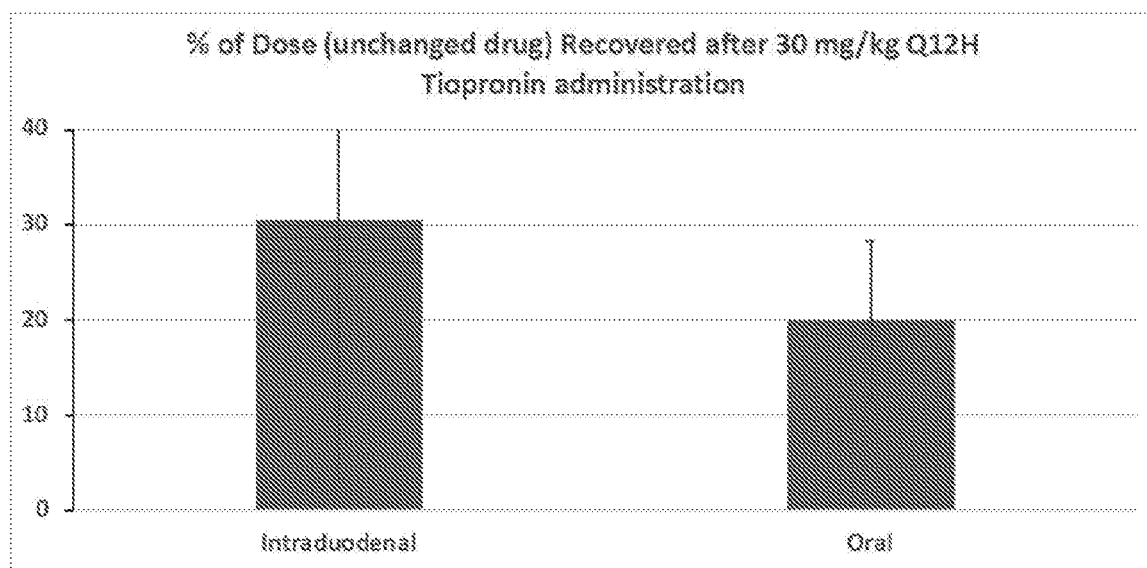
FIG. 16 depicts total tiopronin in urine, as a % of dose (unchanged drug), at different times post-dosing, using an animal model of Beagle dogs either administered tiopronin via the duodenum in a single 30 mg/kg dose; or orally administered a single 30 mg/kg dose. Values are averaged; bars represent standard deviation (n=3 dogs).

FIG. 16 depicts total tiopronin in urine, as a % of dose (unchanged drug), at different times post-dosing, using an animal model of Beagle dogs either administered tiopronin via the duodenum in a single 30 mg/kg dose; or orally administered a single 30 mg/kg dose. Values are averaged; bars represent standard deviation (n=3 dogs). Following ID dosing of tiopronin at 30 mg/kg, using a single dose, on average, 30.5±19.9% of the dose (unchanged drug) was found in urine. FIG. 16 shows urinary recovery of tiopronin, reported as % of dose recovered for intraduodenal and oral administrations, where the oral data taken from FIG. 13.

Small intestine administration showed better tiopronin recovery in urine. Since the formation of cystine uroliths in cystinuria and related disorders is the direct result of saturation of cystine in urine, tiopronin levels in the urine are a therapeutically relevant parameter in demonstrating efficacy, that is, in demonstrating the drug's ability to decrease cystine concentration in the urine via formation of a more soluble the tiopronin-cysteine mixed disulfide, which then is excreted

DISCUSSION

These results surprisingly demonstrate small intestine administration produces lower peak levels of free and total tiopronin in the blood, as well as higher and more consistently higher total tiopronin in the urine, compared to oral administration, reducing side effects, increasing efficacy, and improving patient quality of life. Importantly, this study identifies that small intestine administration of tiopronin reduce plasma $C_{max}$ and increase urine concentration of tiopronin, as compared to approaches currently used to treat cystinuria.

Higher and more consistently higher levels of urinary tiopronin demonstrate improved efficacy in treating cystinuria. That is, higher urinary tiopronin results in lower urinary cystine, thus reducing or eliminating cystine stone formation for subjects with cystinuria (see, e.g., Koide et al., 1994, "A new therapeutic agent for cystinuria," *Urolithiasis* 2:571-574; and Goldfarb et al., 2006, "Urinary cystine excretion and capacity in patients with cystinuria," *Kidney Int.* 69(6): 1041-1047). It follows that the small intestine administration shown here to give higher tiopronin urine excretion, also represent a strategy to lower cystine concentration in urine, thereby enhancing efficacy, as well as one to reduce side effects (based on the significantly decreased peak plasma concentrations ($C_{max}$) and increased urinary excretion of the drug), thereby also enhancing patient compliance and outcomes.

What is claimed is:

1. A method of treating cystinuria in a subject in need thereof comprising administering a pharmaceutical composition comprising:
   a therapeutically effective amount of tiopronin; and
   a pharmaceutically acceptable modified-release component for releasing the tiopronin in repeated pulses,
   wherein the tiopronin is released in repeated pulses-every two to six hours for about 12 to about 24 hours,
   wherein a first fraction of the tiopronin is released at a first time point and a second fraction of the tiopronin is released at a second time point about two to about six hours after said first time point,
   wherein the first fraction is released in 1 second to 30 minutes and the second fraction is released in 1 second to 30 minutes.

2. The method according to claim 1, wherein a third fraction of the tiopronin is released at a third time point about two to about six hours after said second time point or wherein the therapeutically effective amount is a daily dose of tiopronin and the tiopronin is released in repeated pulses about every four hours for about 24 hours, wherein the third fraction is released in 1 second to 30 minutes and the fourth fraction is released in 1 second to 30 minutes.

3. The method according to claim 1, wherein the composition is formulated for oral administration, wherein the modified-release component of the oral formulation is at least one selected from the group consisting of: layers of coatings, a matrix comprising differently-dissolving segments, a capsule comprising differently-coated beads, a capsule comprising differently-dissolving bands, a capsule comprising differently-releasing plugs, a capsule comprising differently-expanding osmotic-push compartments, a matrix comprising differently-releasing polymers; a matrix comprising differently-adhering polymers; and a timed microprocessor.

4. The method according to claim 3, wherein the layers of coatings comprise at least one coating selected from the group consisting of a stomach-dissolving coating, a small-intestine-dissolving coating, a duodenum-dissolving coating, a jejunum-dissolving coating, an ileum-dissolving coating, and a colon-dissolving coating or
   wherein the matrix of differently-dissolving segments comprises at least one segment selected from the group consisting of a stomach-dissolving segment, a small-intestine-dissolving segment, a duodenum-dissolving segment, a jejunum-dissolving segment, an ileum-dissolving segment, and a colon-dissolving segment or wherein the differently-coated beads comprise at least one bead coating selected from the group consisting of a stomach-dissolving bead coating, a small-intestine-dissolving coating, a duodenum-dissolving bead coating, a jejunum-dissolving bead coating, an ileum-dissolving bead coating, and a colon-dissolving bead coating or wherein the differently-dissolving bands comprise at least one band selected from the group consisting of a stomach-dissolving band, a small-intestine-dissolving band, a duodenum-dissolving band, a jejunum-dissolving band, an ileum-dissolving band, and a colon-dissolving band or wherein the differently-releasing plugs comprise at least one plug selected from the group consisting of a stomach-releasing plug, a small-intestine-releasing plug, a duodenum-releasing plug, a jejunum-releasing plug, an ileum-releasing plug, and a colon-releasing plug or wherein the differently-expanding osmotic-push compartments comprise at least one compartment selected from the group consisting of a stomach-expanding compartment, small-intestine-expanding compartment a duodenum-expanding compartment, a jejunum-expanding compartment, an ileum-expanding compartment, and a colon-expanding compartment or wherein the differently-releasing polymers comprise at least one polymer selected from the group consisting of a stomach-releasing polymer, a small-intestine-releasing polymer, a duodenum-releasing polymer, a jejunum-releasing polymer, an ileum-releasing polymer, and a colon-releasing polymer or wherein the differently-adhering polymers comprise at least one polymer selected from the group consisting of a stomach-adhering polymer, a small-intestine-adhering polymer, a duodenum-adhering polymer, a jejunum-adhering polymer, an ileum-adhering polymer, and a colon-adhering polymer.

5. The method according to claim 3, wherein the layers of coatings comprise a first coating that releases a first fraction of the tiopronin at a first time point and a second coating that releases a second fraction of the tiopronin at a second time point about two to about six hours after said first time point or wherein the matrix of differently-dissolving segments comprises a first segment that dissolves to release a first fraction of the tiopronin at a first time point and a second segment that dissolves to release a second fraction of the tiopronin at a second time point about two to about six hours after said first time point or wherein the differently-coated beads comprise a first bead coating that releases a first fraction of the tiopronin at a first time point and a second bead coating that releases a second fraction of the tiopronin at a second time point about two to about six hours after said first time point or wherein the differently-dissolving bands comprise a first band that releases a first fraction of the tiopronin at a first time point and a second band that releases a second fraction of the tiopronin at a second time point about two to about six hours after said first time point or wherein the differently-releasing plugs comprise a first plug that releases a first fraction of the tiopronin at a first time point and a second plug that releases a second fraction of the tiopronin at a second time point about two to about six hours after said first time point or wherein the differently-expanding osmotic-push compartments comprise a first osmotic-push compartment that releases a first fraction of the tiopronin at a first time point and a second osmotic-push compartment that releases a second fraction of the tiopronin at a second time point about two to about six hours after said first time point or wherein the differently-releasing polymers comprise a first polymer that releases a first fraction of the tiopronin at a first time point and a second polymer that releases a second fraction of the tiopronin at a second time point about two to about six hours after said first time point or wherein the differently-adhering polymers comprise a first polymer that releases a first fraction of the tiopronin at a first time point and a second polymer that releases a second fraction of the tiopronin at a second time point about two to about six hours after said first time point.

6. The method according to any claim 3, wherein the first release occurs past the stomach.

7. The method according to claim 1, wherein the composition is formulated for transdermal delivery or transmucosal delivery.

8. The method according to claim 1, wherein the tiopronin comprises a (+) enantiomer of tiopronin and substantially no (−) tiopronin enantiomer or wherein the tiopronin comprises a (−) enantiomer of tiopronin and substantially no (+) tiopronin enantiomer.

9. A method of treating Cystinuria in a subject comprising administering a therapeutically effective amount of tiopronin to achieve an extended duration therapeutic effect in the subject, said composition comprising tiopronin, in a first treatment dose, and a pharmaceutically acceptable modified-release component that releases distinct fractions of the tiopronin in repeated pulses over time at intervals of two to six hours, wherein each distinct fraction releases in 1 second to 30 minutes;

wherein dosing is repeated to provide an average total daily dose of 15 mg/kg or less; and wherein said first treatment dose achieves the extended duration therapeutic effect in reducing urinary cystine concentration effectively below about 250 mg/L for at least about an 8-hour duration of effect to about 14-hour duration of effect.

10. The method according to claim 9, wherein the composition achieves a peak blood level of free tiopronin of no more than about 3,000 ng/mL.

11. The method according to claim 9, wherein the composition achieves urinary tiopronin recovery of about 30% to about 50% of the administered tiopronin over about 12 hours of extended duration of effect.

12. The method according to claim 9, wherein said composition is formulated for oral delivery.

13. The method according to claim 9, wherein the composition comprises an enteric coating.

14. The method according to claim 9, wherein the composition comprises a duodenum-dissolving coating.

15. The method according to claim 3, wherein the composition comprises an enteric coating.

16. The method according to claim 3, wherein the composition comprises a duodenum-dissolving coating, a jejunum-dissolving coating, an ileum-dissolving coating, a small-intestine-dissolving coating.

17. The method according to claim 1, wherein a first fraction of the tiopronin is released at a first time point and a second fraction of the tiopronin is released at a second time point two to four hours after said first time point.

18. The method according to claim 1, wherein a first fraction of the tiopronin is released at a first time point and a second fraction of the tiopronin is released at a second time point about three hours after said first time point.

19. The method according to claim 1, wherein the first fraction is released in 30 seconds to 20 minutes and the second fraction is released in 30 seconds to 20 minutes.

20. The method according to claim 1, wherein the first fraction is released in 1 minute to 15 minutes and the second fraction is released in 1 minute to 15 minutes.

21. The method according to claim 9, wherein each distinct fraction releases in 1 second to 15 minutes.

* * * * *